(12) United States Patent
Nemavat et al.

(10) Patent No.: US 10,219,174 B2
(45) Date of Patent: Feb. 26, 2019

(54) CAPACITY ESTIMATION OF A WIRELESS LINK

(71) Applicant: Aruba Networks, Inc., Sunnyvale, CA (US)

(72) Inventors: Pradeep Nemavat, Cupertino, CA (US); Bernd Bandemer, Sunnyvale, CA (US); Jose Tellado, Mountain View, CA (US); Arogyaswami Paulraj, Stanford, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 292 days.

(21) Appl. No.: 14/994,026

(22) Filed: Jan. 12, 2016

(65) Prior Publication Data

US 2016/0269932 A1    Sep. 15, 2016

Related U.S. Application Data

(63) Continuation-in-part of application No. 14/827,282, filed on Aug. 15, 2015, which is a
(Continued)

(51) Int. Cl.
*H04L 1/00* (2006.01)
*H04W 28/02* (2009.01)
(Continued)

(52) U.S. Cl.
CPC ....... *H04W 28/0268* (2013.01); *H04L 1/0002* (2013.01); *H04L 47/25* (2013.01);
(Continued)

(58) Field of Classification Search
CPC ......... H04J 3/22; H04J 14/026; H04L 1/0002; H04L 12/2671; H04N 21/6373; H04W 76/025; H04W 76/15
See application file for complete search history.

(56) References Cited

U.S. PATENT DOCUMENTS 7,177,311 B1    2/2007  Hussain et al.
7,456,596 B2   11/2008  Goodall et al.
(Continued)

OTHER PUBLICATIONS

Paulraj, A.; "Non-Final Office Action cited in U.S. Appl. No. 14/720,755"; dated Oct. 20, 2016; 30 pages.
(Continued)

*Primary Examiner* — Salvador E Rivas
(74) *Attorney, Agent, or Firm* — Rasa Networks, Inc.

(57) ABSTRACT

Systems, methods and apparatuses estimating a capacity of a least one stream of a wireless link, are disclosed. One method includes obtaining capabilities of a transmitter and of a receiver of the wireless link, collecting information of a wireless transmission, wherein the wireless transmission comprises at least a portion of a transmission signal with electromagnetic energy above a certain threshold within a frequency band of the wireless link, estimating transmission opportunities available for the transmitter to transmit wireless communications to the receiver based on the obtained capabilities and the collected information, estimating an achievable transmission rate by the transmitter based on the determined capabilities and the collected information, and estimating the capacity of the at least one wireless stream of the wireless link based on the estimated transmission opportunities and the estimated achievable transmission rate.

29 Claims, 30 Drawing Sheets

Related U.S. Application Data continuation-in-part of application No. 14/720,755, filed on May 23, 2015, now Pat. No. 9,720,760, which is a continuation-in-part of application No. 14/643,332, filed on Mar. 10, 2015.

(51) Int. Cl.
*H04W 76/15* (2018.01)
*H04L 12/825* (2013.01)
*H04W 84/12* (2009.01)

(52) U.S. Cl.
CPC ....... *H04W 28/0231* (2013.01); *H04W 76/15* (2018.02); *H04W 28/0215* (2013.01); *H04W 84/12* (2013.01)

(56) References Cited

U.S. PATENT DOCUMENTS

| | | | |
|---|---|---|---|
| 7,460,837 | B2 | 12/2008 | Diener |
| 8,022,822 | B2 | 9/2011 | Liang et al. |
| 8,386,593 | B1 | 2/2013 | Gao et al. |
| 9,203,563 | B2 | 12/2015 | Etemad et al. |
| 2005/0078968 | A1 | 4/2005 | Ohta |
| 2008/0086236 | A1 | 4/2008 | Saito |
| 2008/0151761 | A1 | 6/2008 | Theisen et al. |
| 2008/0151762 | A1 | 6/2008 | Armstrong et al. |
| 2008/0267145 | A1 | 10/2008 | Vangati |
| 2009/0097468 | A1 | 4/2009 | Yi et al. |
| 2009/0254216 | A1 | 10/2009 | Matsushima |
| 2009/0260083 | A1 | 10/2009 | Szeto et al. |
| 2009/0328219 | A1 | 12/2009 | Narayanaswamy |
| 2010/0030417 | A1 | 2/2010 | Fang |
| 2011/0188415 | A1 | 8/2011 | Graziano |
| 2011/0252079 | A1 | 10/2011 | Werner et al. |
| 2012/0182886 | A1* | 7/2012 | Ong .................. H04W 74/0816 370/252 |
| 2012/0250546 | A1 | 10/2012 | Hamida et al. |
| 2013/0084984 | A1 | 4/2013 | Gagner |
| 2013/0227689 | A1 | 8/2013 | Pietrowicz |
| 2013/0316738 | A1 | 11/2013 | Noonan |
| 2014/0089513 | A1* | 3/2014 | Adachi .................. H04W 76/02 709/227 |
| 2014/0112131 | A1* | 4/2014 | Todaka ............... G06F 13/4022 370/230 |
| 2014/0159729 | A1 | 6/2014 | Olsson et al. |
| 2014/0253295 | A1 | 9/2014 | Roberts |
| 2015/0015895 | A1 | 1/2015 | Bridges et al. |
| 2015/0032258 | A1 | 1/2015 | Passot et al. |
| 2015/0094852 | A1 | 4/2015 | Laurent et al. |
| 2015/0208444 | A1* | 7/2015 | Park .................. H04W 74/0808 370/329 |
| 2016/0037559 | A1 | 2/2016 | Malik et al. |

OTHER PUBLICATIONS

Tellado, J., et al.; "Non-Final Office Action cited in U.S. Appl. No. 14/643,332"; dated Sep. 7, 2016; 16 pages.

* cited by examiner

Obtaining, by a network service engine, a plurality of link quality signatures, wherein each of the plurality of link quality signatures includes link qualities between a network node and a plurality of network sensors

2910

Estimating, by the network service engine, link qualities between a plurality of network nodes based on the plurality of link quality signatures and a network estimation model.

CAPACITY ESTIMATION OF A WIRELESS LINK

RELATED APPLICATIONS

This patent application is a continuation-in-part (CIP) of U.S. patent application Ser. No. 14/827,282, filed Aug. 15, 2015, which is continuation-in-part (CIP) of U.S. patent application Ser. No. 14/720,755, filed May 23, 2015, which is continuation-in-part (CIP) of U.S. patent application Ser. No. 14/643,332, filed Mar. 10, 2015, which are herein incorporated by reference.

FIELD OF THE DESCRIBED EMBODIMENTS

The described embodiments relate generally to wireless communications. More particularly, the described embodiments relate to systems, methods and apparatuses for capacity estimation of at least one steam of a wireless link.

BACKGROUND

Wireless networks are being widely deployed due to the convenience of tether-less communications. The wireless networks are operable to support fixed or mobile/nomadic applications. The wireless network can be deployed indoors and outdoors. Further, such wireless networks can range from optical or near optical spectrum bands to radio frequencies from terahertz to megahertz bands.

Wireless networks have been witnessing increasing capacity/data rates, coverage and seamless connectivity. Wireless networks span wide area including satellite networks to wide area mobile networks to local area WiFi (Wireless Fidelity) to restricted (room) or personal area networks. These WiFi networks offer a low cost way of achieving high data throughput rates. Some of these networks, such as cellular, use licensed frequency bands, while others operate in unlicensed bands. More recently, more complex ways of band sharing have also been introduced. Due to the nature of wireless propagation and the complex protocols used in transmission and access, wireless networks often show a range of problems from simple inability to connect to the network to poor throughput performance.

Such problems are particularly evident in WiFi networks that use Carrier Sense, Multiple Access with Collision avoidance (CSMA/CA) mechanisms to regulate transmissions. Briefly, each wireless network end device detects if the medium is being used; if so, the end device waits a random amount of time before trying to transmit again. This method of contending for the medium is simple, intrinsically fair, and requires no central scheduling. However, in the case of densely deployed WiFi networks, this method of communication has a number of shortcomings, which include co-located WiFi devices contending for the medium back-off to one another, leading to wasted time when the channel is idle. Further, co-located WiFi devices that pick the same back-off time cause packets to collide over-the-air, leading to packet loss and reduced throughput. Further, end device vendors implement proprietary algorithms (e.g., for roaming) that lead to sub-optimal network performance. Further, end devices expose limited control (e.g., to schedule transmissions) for the network to optimize their performance. Further, legacy (802.11a/b/g) end devices reduce overall network throughput because they use much lower speeds and hence occupy the medium for longer time periods. Further, since WiFi uses unlicensed bands shared by other non-WiFi devices which do not follow WiFi protocols, they can cause increased contention and packet loss in WiFi networks. A number of anomalies can result in wireless networks that can be hard to detect, difficult diagnose and complex to fix. Such anomalies can range for inability to connect or reconnect, poor or intermittent throughput, which can cause a poor user experience. Poor user experience increases operations cost, poor customer or user satisfaction. Other types of wireless networks, for example, cellular networks, Zigbee networks, Bluetooth networks, infrared networks, optical communication networks, etc., are also prone to connectivity and performance failures including total breakdown (non-operation) of a network node.

Further, the location and other installation related parameters of the fixed network nodes (or at least of the antenna) such as access points and base stations need to be chosen carefully so as to maximize coverage and throughput performance of the network. This often requires in-situ measurements of radio link parameters to ascertain which installation parameter choices maximizes network performance. Since such nodes (antennas) are often located outdoors on towers, roof tops or indoors near roof ceilings, these locations are hard or hazardous to access for human operators.

It is desirable to have systems, methods and apparatuses for estimating capacity of at least one stream of a wireless link.

SUMMARY

An embodiment includes a method of estimating a capacity of at least one wireless stream of a wireless link. The method includes obtaining capabilities of a transmitter and of a receiver of the wireless link, collecting information of a wireless transmission, wherein the wireless transmission comprises at least a portion of a transmission signal with electromagnetic energy above a certain threshold within a frequency band of the wireless link, estimating transmission opportunities available for the transmitter to transmit wireless communications to the receiver based on the obtained capabilities and the collected information, estimating an achievable transmission rate by the transmitter based on the determined capabilities and the collected information, and estimating the capacity of the at least one wireless stream of the wireless link based on the estimated transmission opportunities and the estimated achievable transmission rate.

Another embodiment includes an analytics engine of a wireless network. The analytics engine is operative to obtain capabilities of a transmitter and of a receiver of a wireless link, collect information of a wireless transmission, wherein the wireless transmission comprises at least a portion of a transmission signal with electromagnetic energy above a certain threshold within a frequency band of the wireless link, estimate transmission opportunities available for the transmitter to transmit wireless communications to the receiver based on the obtained capabilities and the collected information, estimate an achievable transmission rate by the transmitter based on the determined capabilities and the collected information, and estimate a capacity of at least one wireless stream of the wireless link based on the estimated transmission opportunities and the estimated achievable transmission rate.

Another embodiment includes a wireless system. The wireless system includes a sensor, the sensor operative to sense information of a wireless transmission, wherein the wireless transmission comprises at least a portion of a transmission signal with electromagnetic energy above a certain threshold within a frequency band of a wireless link. The wireless system further includes an analytics engine.

The analytics engine operative to obtain capabilities of a transmitter and of a receiver of the wireless link, collect the information of the wireless transmission, estimate transmission opportunities available for the transmitter to transmit wireless communications to the receiver based on the obtained capabilities and the collected information, estimate an achievable transmission rate by the transmitter based on the determined capabilities and the collected information, and estimate the capacity of at least one wireless stream of the wireless link based on the estimated transmission opportunities and the estimated achievable transmission rate.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 29 is a flow chart that includes steps of a method of estimating quality of wireless links between different wireless end devices, according to an embodiment.

DETAILED DESCRIPTION

The described embodiments provide systems, methods and apparatuses for estimating a capacity of one or more streams of a wireless link between a transmitter and a receiver.

Figure 1A:
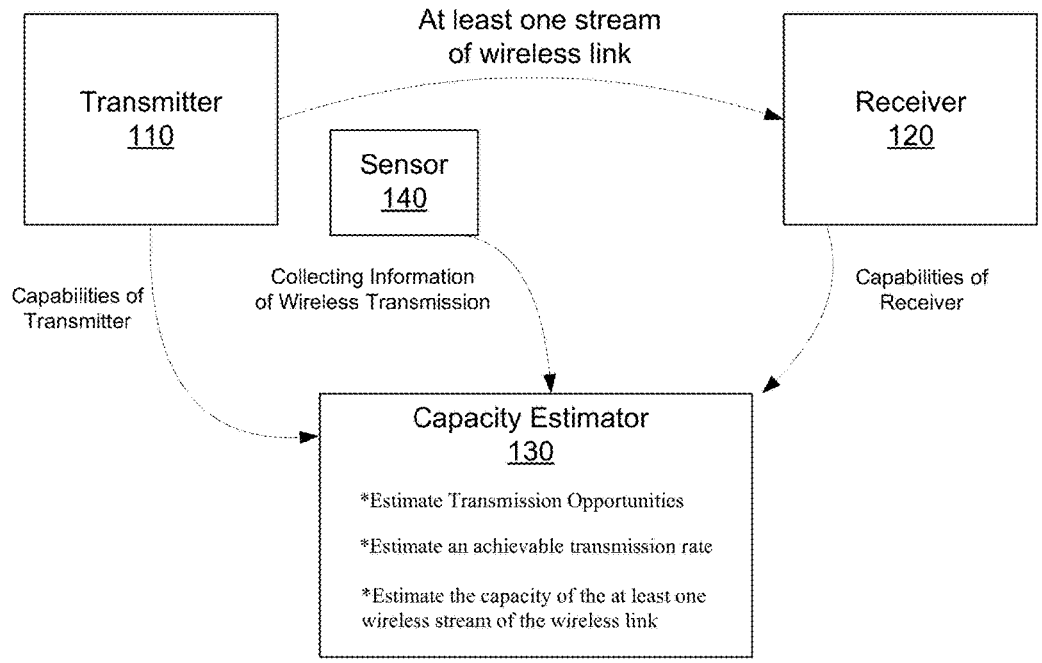
FIG. 1A shows a block diagram of a sensor and a capacity estimator estimating a capacity of at least one stream of a wireless link between a transmitter and a receiver, according to an embodiment.

FIG. 1A shows a block diagram of a sensor 140 and a capacity estimator 130 estimating a capacity of at least one stream of a wireless link between a transmitter 110 and a receiver 120, according to an embodiment. As shown, the at least one stream of wireless signals is communicated from the transmitter 110 to the receiver 120. That is, the transmitter 110 transmits the at least one stream of the wireless signals of the wireless link, and the receiver 120 receives the at least one stream of the wireless signals of the wireless link.

For an embodiment, the wireless link is established between the transmitter 110 and the receiver 120. For an embodiment, the wireless link includes multiple wireless streams of different access categories. For an embodiment, a stream includes a priority and/or a traffic type.

For at least some embodiments, a link includes a wireless connection between two wireless devices and is formed by exchange of a set of connection frames. Further, for at least some embodiments, the wireless link includes multiple logical wireless streams where each stream has a different priority to send its traffic over the wireless medium (through the wireless link). A wireless link with priority defines a wireless stream. Traffic from higher priority stream is given a preferential treatment as compared to traffic from lower priority stream.

In the context of an WiFi (IEEE 802.11) medium access control (MAC) entity, a wireless link includes a physical path consisting of one traversal of the wireless medium (WM) that is used to transfer an MAC service data unit (MSDU) between two stations (STAs or transmitters). For an embodiment, the traffic stream (TS) includes a set of medium access control (MAC) service data units (MSDUs) to be delivered subject to the quality-of-service (QoS) parameter values provided to the MAC in a particular traffic specification (TSPEC). TSs are meaningful only to MAC entities that support QoS within the MAC data service. These MAC entities determine the TSPEC applicable for delivery of MSDUs belonging to a particular TS using the priority parameter provided with those MSDUs at the MAC service access point (MAC_SAP).

For an embodiment, the capacity of the at least one stream is the potential throughput that is achievable for the at least one stream. For an embodiment, the capacity of a wireless link is the potential throughput that is achievable for the wireless link.

For at least some embodiments, the sensor 140 is operative to sense information of a wireless transmission, wherein the wireless transmission includes at least a portion of a transmission signal with electromagnetic energy above a certain threshold within a frequency band of a wireless link. For at least some embodiments, the wireless transmission is between the transmitter 110 and the receiver 120. For at least some embodiments, the wireless transmission includes electromagnetic energy of wireless transmission of different transmitters and receivers. For at least some embodiments, the wireless transmission includes electromagnetic energy from a completely different communication system. For at least some embodiments, the wireless transmission includes electromagnetic energy from separate source, such as, for example, a microwave oven.

Figure 1B:
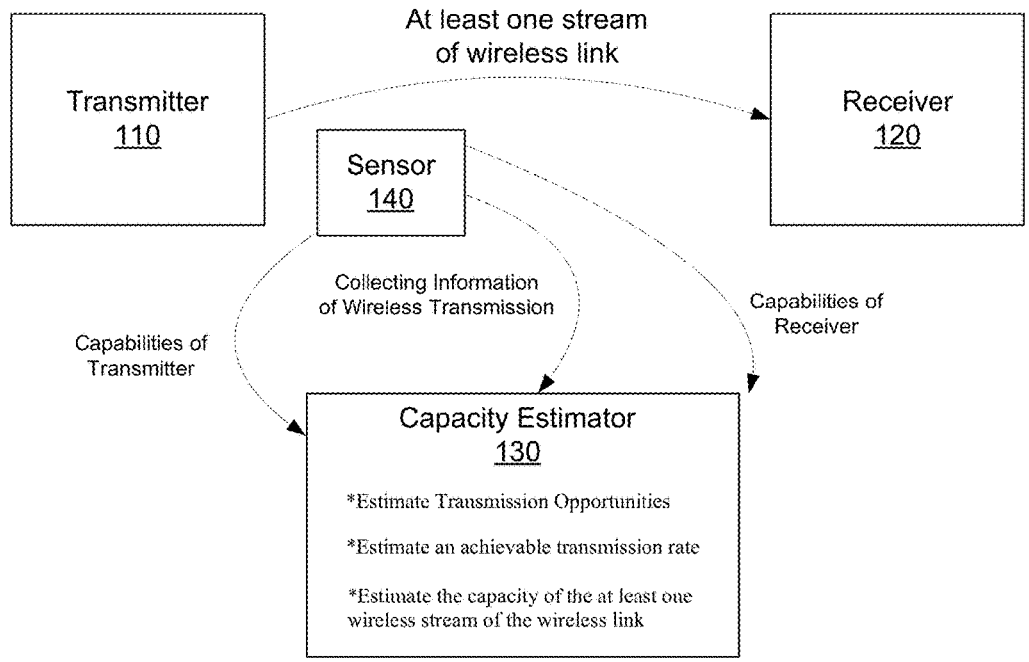
FIG. 1B shows a block diagram of a sensor and a capacity estimator estimating a capacity of at least one stream of a wireless link between a transmitter and a receiver, according to another embodiment.

For at least some embodiments, the capacity estimator is operative to obtain capabilities of a transmitter and of a receiver of the wireless link. For the embodiment of FIG. 1A, the capabilities are shown as being obtained from the transmitter 110 and the receiver 120. However, the capabilities can be obtained in many different ways. For example, FIG. 1B shows a block diagram of a sensor and a capacity estimator estimating a capacity of at least one stream of a wireless link between a transmitter and a receiver, according to another embodiment, wherein the capabilities of a transmitter and of a receiver of the wireless link are obtained from the sensor 140. For another embodiment, the capacity estimator obtains the capabilities of a transmitter and of a receiver from a database of a plurality of wireless devices of various types. For an embodiment, the database is populated based on historical capability observations per device or per device type. For an embodiment, the capabilities of a transmitter and of a receiver that are obtained by the capacity estimator include one or more of the following: Backoff/contention parameters (CWmin, CWmax, AIFSN), Rate parameters (Nss (Number of spatial streams), Bandwidth, Modulation and Coding, Guard interval), Aggregation parameters (Number of mpdus in AMPDU, length of AMPDU, MPDU size), Burst behavior (This defines how many PPDUs (PLCP Protocol Data Units) will be sent in succession on a transmit opportunity win), PER (Packet error rate is a measure of how many packets had to be transmitted multiple times before the transmitter received the acknowledgement from the receiver), Overhead (Protocol overhead, protection frames overhead, security overhead etc.).

For at least some embodiments, the capacity estimator is operative to collect the information of the wireless transmission. As shown and described, for an embodiment, the sensor 140 senses the wireless transmission. For an embodiment, the sensor 140 communicates the sensed wireless transmission to the capacity estimator 130.

For at least some embodiments, the capacity estimator 130 estimates transmission opportunities available for the transmitter to transmit wireless communications to the receiver based on the obtained capabilities and the collected information, estimates an achievable transmission rate by the transmitter based on the determined capabilities and the collected information, and estimates the capacity of at least one wireless stream of the wireless link based on the estimated transmission opportunities and the estimated achievable transmission rate.

For an embodiment, in a WiFi system, the capacity estimator 130 estimates transmission opportunities available for the transmitter to transmit wireless communications to the receiver based on the obtained capabilities and the collected information as described. For at least some embodiments, the WiFi follows CSMA/CA medium access. That is all the STAs (transmitters) sense the medium before transmission and transmit only if the medium is sensed available. If the medium is busy the STAs backoff transmission for a random duration based on some parameters. Therefore, if two WiFi STAs have the same parameters for backoff and always have traffic to transmit, in the long run the two WiFi STAs will have identical number of transmission opportunities distributed fairly among them.

For an embodiment, a transmission opportunity includes sensing the medium (wireless link) as idle after completion of the backoff period. Based on the backoff parameters for different streams, and streams usage of the transmission opportunities, how many transmission opportunities will be available for the at least one stream can be determined for doing which capacity estimation is being done. It is assumed that the stream has a constant flow of traffic available to send.

For an embodiment, determining the transmission opportunities includes executing a max-min fairness algorithm. For an embodiment, this includes all the streams using less than their fair share of transmission opportunities winning all they need and the remaining transmission opportunities are equally divided among the remaining streams. Each stream might transmit a different average amount of time for its transmission opportunities. So the average medium usage of the stream combined with its transmit opportunities usage needs to be used to determine the transmission opportunities win for the at least one stream. For example, assuming there is one stream that wins 180 transmission opportunities and transmits for 5 milliseconds each in a 1 second interval (accounting for about 10% of backoff overhead). If there is a new stream (with same priority as existing stream) that starts to contend and use the medium for 10 ms every time it wins the contention, the number of transmission opportunities will be equally divided between the existing stream and the new stream. But the time will not be, as the existing stream will use about half the time of the new stream as it transmits only half of the time of the new stream every time it wins the medium. In this case, one-contention-cycle can be computed as sum of all medium usage. In this case it will be 15 ms (10+5). Dividing 1-sec intervals into 15 msec contention cycles it can be found that about 60 cycles can be accommodated, accounting for about 10% of backoff overhead. So the existing stream will have 60 transmission opportunities and can use the wireless medium for 300 ms. The new stream will have 60 transmission opportunities and can use the wireless medium for 600 ms.

For an embodiment, the existing stream and the new stream are of different priorities. In this case the number of transmission opportunities won by the two streams will not be equal but will be higher for higher priority stream. The exact ratio can be computed based on the parameters for contention or can be looked up from a pre-determined table.

In another embodiment, the existing stream and the new stream are of different priorities and multiple levels of min-max fairness algorithm are used. The higher priority stream will win all the transmission opportunities that are required and the remaining will be distributed equally among the next priority of the streams. The multiple levels are required for multiple levels of priority. Within the same priority streams, another instance of min-max fairness can be executed favoring low stream users as explained earlier.

In the described embodiments for determining the transmission opportunities, a waiting period before each transmission can be defined. The waiting period can be divided into pre-backoff (distributed coordination function interframe space (DIFS) and arbitration interframe space (AIFS)) time and actual backoff (down-counting of actual backoff slots) time. The pre-backoff time overhead is applied for every transmit opportunity win and backoff time overhead is applied only once for a contention cycle. The idea is that the down-counting of backoff slots happens in parallel at all the transmitters.

For at least some embodiments, the capacity estimator 130 estimates an achievable transmission rate by the transmitter based on the determined capabilities and the collected information using one or more of the following methods: determining the actual rate from the PHY header of data PPDUs (PHY protocol data unit), lookup the rate information from an application running on the client or from the wireless LAN controller if it provides such information.

For at least some embodiments, the capacity estimator 130 estimates an achievable transmission rate by the transmitter based on the determined capabilities and the collected information by determining the time duration from CTS (Clear to send frame) to BA (block acknowledgment frame), or the time duration from one BA to another BA in a burst. Based on the time duration and the AMPDU length (aggregate MAC protocol data unit), the rate at which the AMPDU was sent can be approximated. The AMPDU length itself can be estimated based on BA bitmap and the known or estimated MPDU length used by the transmitter.

For at least some embodiments, the capacity estimator 130 estimates an achievable transmission rate by the transmitter based on the determined capabilities and the collected information by determining the RSSI of the link and lookup the rate that is most likely to be used at this RSSI.

For at least some embodiments, the capacity estimator 130 estimates an achievable transmission rate by the transmitter based on the determined capabilities and the collected information by using the rate from one of the previous AMPDUs assuming the rate has not changed more than a threshold.

For at least some embodiments, estimating the capacity of the at least one wireless stream of the wireless link based on the estimated transmission opportunities and the estimated achievable transmission rate includes accounting for protocol overhead. That is, account for medium resources that are used for transmitting necessary auxiliary information and are thus not available for transmitting payload information. For an embodiment, one or more of the following kinds of overhead are accounted for: Physical layer (PHY) header, Frame headers (includes MPDU header, MPDU delimiters in AMPDU, LLC (logical link control) header, Security header, AMSDU header in case of AMSDU, FCS (frame check sequence), Mandatory waiting periods before transmission due to backoff or SIFS time, TCP acknowledgements, Control frames (Protection frames such as RTS (request to send)/CTS, acknowledgement frames such as ack/blockacks).

For at least some embodiments, estimating the capacity of the at least one wireless stream of the wireless link based on the estimated transmission opportunities and the estimated achievable transmission rate includes accounting a reverse stream. For an embodiment, the reverse stream is the one where the transmitter and receiver in the original stream are swapped to become receiver and transmitter respectively. The priority of the stream may stay the same or change to some default priority such as Best Effort. That is, the reverse stream is a stream in which the roles of the transmitter and the receiver are reversed. The reverse stream impacts the achievable throughput on the stream. For example, TCP traffic entails ACK messages that travel in the reverse direction and compete for airtime with the data on the forward direction.

For at least some embodiments, estimating the capacity of the at least one wireless stream of the wireless link based on the estimated transmission opportunities and the estimated achievable transmission rate includes accounting for the packet error rate (PER) of the stream. For an embodiment, PER is observed during an observation period and assumed to remain constant. For an embodiment, the PER is looked up based on RSSI/rate. For an embodiment: the achievable transmission rate is estimated based on observing the transmission rate distribution of the transmitter.

For at least some embodiments, estimating the capacity of the at least one wireless stream of the wireless link based on the estimated transmission opportunities and the estimated achievable transmission rate includes assuming the wireless stream is part of a multi-hop network communication link, and accounting for link properties of the (wireless/wired) hops external to the at least one wireless stream of the wireless link. That is, within a multi-hop system, the wireless stream traverses more links than the present wireless link, and the capacity may be limited by characteristics of one or more of the other links, and the capacity of the present link may be limited to the capacity of the one or more other links. For at least some embodiments, the characteristics of the other link includes one or more of other hop capacity, latencies, drop rates, jitter, fragmentation, window size.

As described, at least some embodiments include collecting information of the wireless transmission. For at least some embodiments, the wireless transmission is passively collected. That is, for example, a sensor collects the information of the wireless transmission without affecting the wireless transmission. That is, the sensor "listens" in on the wireless transmission without influencing the wireless transmission.

For other embodiments, the wireless transmission is actively collected. That is, for example, the collecting includes directing one or more packets to be transmitted from the transmitter to the receiver. That is, packets are proactively directed to be transmitted from the transmitter to the receiver, and these packets aid in the collecting of information of the wireless transmission for the purpose of capacity estimation.

For at least some embodiments, a packet includes a data unit of a specified size. For an embodiment, a packet is designed specifically such that when transmitted from the transmitter to the receiver, a certain aspect of the wireless link is readily observed. For example, a packet is designed to be transmitted at a pre-specified transmission rate to determine whether this transmission rate is successfully achievable between the transmitter and the receiver at the time the packet is transmitted. For another example, a packet is part of a plurality of packets designed to allow the rate adaptation algorithm of the wireless system to reach a steady state for the wireless link between the transmitter and the receiver.

At least some embodiments include adaptively determining when to direct the one or more packets to be transmitted from the transmitter to the receiver. For an embodiment, if traffic of packets transmitted between the transmitter and the receiver is sensed to be above a threshold, then no packets or only a selected number of packets are directed to be transmitted from the transmitter to the receiver. For an embodiment, if the traffic of packets transmitted between the transmitter and the receiver is sensed to be below a threshold, then the packets are directed to be transmitted from the transmitter to the receiver.

For at least some embodiments, estimating the achievable transmission rate is based on observation of one or more packets during an observation period. For an embodiment, this includes observing at what transmission rate the transmitter decides to send the packet. For an embodiment, this includes observing the transmission rate distribution. For an embodiment, this includes observing a PHY header of a packet and inferring the transmission rate based on number of bytes and duration as encoded in the PHY header. For example, the PHY header of a transmission packet is encoded more reliably than the remainder of the packet, and can thus be decoded with a lower error probability than the remainder of the packet. Thus, decoding PHY header while disregarding the remainder of the packet will yield more evidence for the transmission rate than the alternative approach of considering only packets that are decoded successfully in their entirety. For an embodiment, this includes observing control packets and inferring the transmission rate of the data packets.

For at least some embodiments, the collected information of the wireless transmission includes a transmission rate distribution of signals of interest of the wireless link over an observation period. For an embodiment, the signal of interest is the communication signal that is intended to be sent over the wireless link.

For an embodiment, the rate distribution is represented by a frequency table of how many times each rate was seen (observed) in the last observation period. The frequency table allows lookups such as to determine the mean transmission rate, median transmission rate, or the transmission rate that will be exceeded with a pre-specified probability. The observation period is the interval of time during which information of the wireless transmission is collected.

For at least some embodiments, estimating the achievable transmission rate comprises extrapolating the achievable transmission rate from the transmission rate distribution. For an embodiment, the achievable transmission rate is assumed to be same as the observed transmission rate distribution if predicting the rate for the immediate period following the observation period. For an embodiment, the achievable transmission rate is the average data rate used during observation period or can capture the rate used majority of the times in the observation interval or some other statistical measure of the rate in observation period.

For at least some embodiments, estimating the achievable transmission rate includes decoding encoded PHY headers of packets of the wireless transmission. For high-rate packets, it might not be possible to observe the entire packet, but it may be still be possible to observe the robustly encoded PHY header, and deduce the information needed to determine the achievable transmission data rate from the from the robustly encoded PHY header.

For at least some embodiments, collecting information of the wireless transmission comprises receiving control messages of the wireless transmission, and further comprising estimating the achievable transmission rate based on the received control messages.

For an embodiment, in a WiFi system, the transmission rate is estimated based on the time difference between CTS to BA control messages, and/or the time difference between one BA message to another BA message in a burst, and/or the estimated AMPDU length, and/or the BA bitmap. Using these, the rate at which the AMPDU was sent can be approximated.

At least some embodiments further include aggregating obtained capabilities and collected information of a plurality of wireless streams, and estimating the capacity of at least one of the plurality of wireless streams based on the aggregated obtained capabilities and collected information, wherein the estimating of the capacity accounts for the interactions between the wireless streams.

For an embodiment, the estimating of the capacity includes estimating interactions between the plurality of wireless streams. This includes a plurality of streams within a single link, as well as a plurality of streams among several links. For an embodiment, the interaction occurs among multiple streams of the same link or multiple streams of multiple links. An example of former would be when a Best-Effort stream in WiFi is competing with a Video stream; both originating from the same transmitter and destined for the same receiver. An example of latter would be when two Best-Effort streams originating from two different transmitters contend for the medium.

At least some embodiments include obtaining capabilities/collecting information by one or more sensors. Some embodiments include at least one sensor close to the transmitter and the receiver of the wireless stream. Some embodiments include information collected directly from the transmitter or receiver. Some embodiments include sensors located in the vicinity of transmitters/receivers of other streams. Some embodiments include sensors located in the vicinity of wireless transmitters using a different wireless protocol.

At least some embodiments include estimating interactions between the plurality of wireless streams. For an embodiment, the interaction between the plurality of wireless streams is determined by the number of transmission opportunities available for the at least one stream for which the capacity is being estimated. To determine the transmission opportunities the max-min fairness algorithm can be executed. All the streams using less than their share of transmission opportunities will win all they need and the remaining transmission opportunities will be equally divided among the remaining streams. Each stream might transmit a different average amount of time for its transmission opportunities. So the average medium usage of the stream combined with its transmit opportunities usage needs to be used to determine how many times a transmitter wins the transmission opportunity.

For at least some embodiments, collecting the information includes estimating a quality metric of the wireless transmission transmitted by the transmitter and received by the receiver, and further includes estimating the achievable transmission rate based on the estimated quality metric. For example, for an embodiment, an RSSI (received signal strength indicator) of the wireless transmission between the transmitter and the receiver is estimated. Based on the estimated RSSI, an MCS (modulation and coding scheme) that can be supported by the transmission between the transmitter and the receiver is estimated, which determines the achievable transmission rate by the transmitter. For another example, the rank of MIMO channel matrix is estimated for the same purpose. For another example, the motion of the transmitter and/or receiver is estimated for the purpose of estimating the expected variance in the wireless channel between the transmitter and receiver.

For at least some embodiments, collecting the information includes sensing use of the frequency band of the at least one wireless stream by other wireless streams, and further includes estimating the transmission opportunities based on the sensed use of the frequency band of the at least one wireless stream by the other wireless streams.

For at least some embodiments, collecting information of a wireless transmission further includes identifying that the wireless transmission includes a different wireless protocol than a protocol of the at least one stream of the wireless link, and further includes measuring at least one property of the wireless transmission. Further, the estimating of the transmission opportunities available for the transmitter comprises accounting for the at least one measured property. For an embodiment, the other wireless protocols include wireless transmissions that occupy the same spectrum (frequency) as the at least one stream of the wireless link. For an embodiment, the other wireless protocols include wireless transmissions of non-communication systems that have spurious emissions in the same spectrum (microwave ovens). For at least some embodiments, the at least one property of the wireless transmission includes one or more of a duty cycle, a signal strength, or a signal frequency/band/bandwidth.

At least some embodiments account for different protocol wireless transmission (such as, non-WiFi) airtime, including measuring a power level of the different protocol wireless transmission, applying a threshold for the power level and consider the time for which the power is above this threshold level to compute interference from different protocol wireless transmission. For an embodiment, the total duration of different-protocol transmissions above the threshold is subtracted from the time available to the wireless stream of the wireless link. For an embodiment, in a WiFi system that is impeded by a wireless video surveillance system in the same frequency band, timeslots taken by the wireless video surveillance system will be avoided by WiFi transmitters.

For at least some embodiments, obtaining the capabilities of the transmitter and of the receiver of the wireless link further includes tracking dynamic capabilities of the at least one wireless stream, wherein the estimating of the capacity accounts for the tracked dynamic capabilities. For at least some embodiments, the tracked dynamic capabilities of the at least one wireless stream includes a subset of protocol features that the transmitter and receiver have agreed to use. For at least some embodiments, the tracking is needed because it may not be possible to directly observe the capability exchange (between the transmitter and the receiver), but rather have to infer it from ongoing transmissions. For an embodiment, in a WiFi system, the tracking dynamic capabilities includes receiving action frames in which capabilities are renegotiated, and/or observing the transmitter's behavior in order to infer updated effective capabilities. For an embodiment, dynamic capabilities include power save states at the transmitter and receiver, capability reduction due to high load, and/or capability reduction based on the presence of legacy clients.

For at least some embodiments, the estimating the capacity of the at least one wireless stream of the wireless link further includes estimating a lower and upper bound on the estimated capacity and estimating a probability of an actual capacity being within the lower and upper bound. For an embodiment, the lower and upper bound are close together and estimated probability is high when prediction period is short and temporally close to the observation period, and grows as the prediction extends further into the future. An embodiment includes a bound tightness and estimated probability depending on how well a state of the stream has been observed, how well transmitter and/or receiver of the stream are characterized/classified, and/or how many random quantities enter the computation (error propagation).

At least some embodiments includes reporting the estimated capacity of the at least one wireless stream to an analytics engine. Further, for at least some embodiments, the analytics engine uses the estimated capacity to manipulate a parameter of a wireless network. For some embodiments, the manipulation of the parameter allows for performance optimization, load balancing, monitoring, deployment planning, and/or detecting anomalous network users/behaviors.

Figure 2:
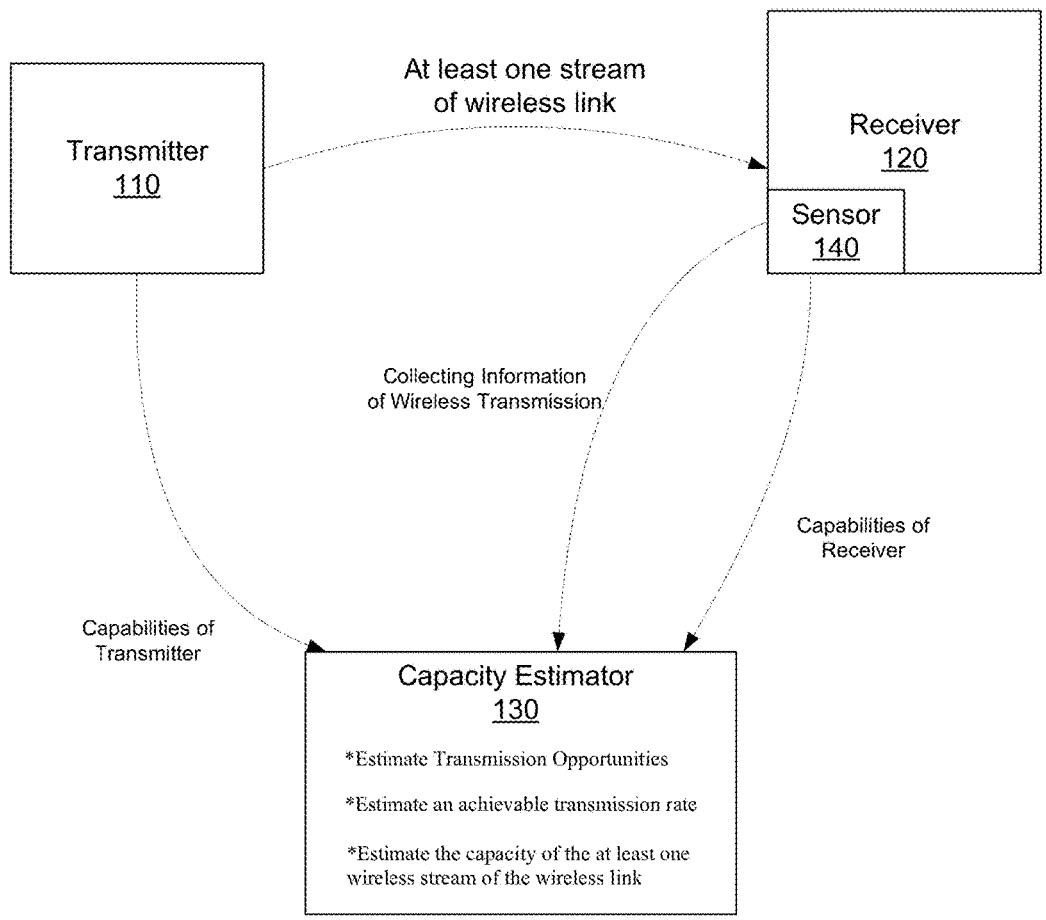
FIG. 2 shows a block diagram of a sensor and a capacity estimator estimating a capacity of at least one stream of a wireless link between a transmitter and a receiver, according to another embodiment.

FIG. 2 shows a block diagram of a sensor and a capacity estimator estimating a capacity of at least one stream of a wireless link between a transmitter and a receiver, according to another embodiment. For this embodiment, the sensor 140 is co-located with the receiver 120. For an embodiment, the sensor 140 is implemented as a software agent that runs on the receiver 120.

Figure 3:
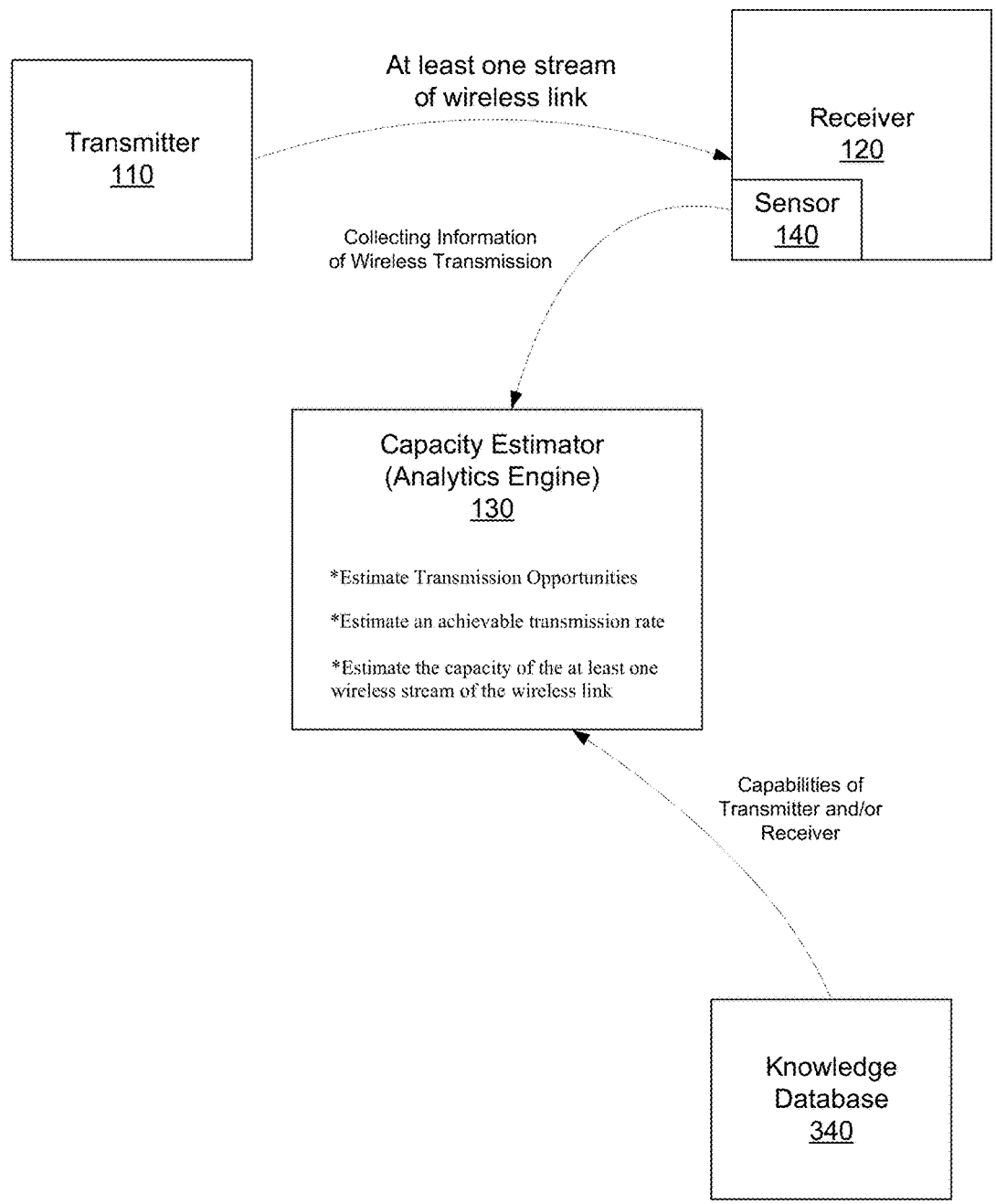
FIG. 3 shows a block diagram of a sensor and a capacity estimator estimating a capacity of at least one stream of a wireless link between a transmitter and a receiver, according to another embodiment.

FIG. 3 shows a block diagram of a sensor and a capacity estimator estimating a capacity of at least one stream of a wireless link between a transmitter and a receiver, according to another embodiment. This embodiment further includes a knowledge database 340. For at least some embodiments, the capacity estimator obtains the capabilities of the transmitter and/or the receiver from the knowledge database 340. For an embodiment, the knowledge database 340 includes capabilities for each individual transmitter and receiver, based on historical observations of the transmitter and receiver. For at least some embodiments, the knowledge database further includes capabilities of wireless transmitters and receivers categorized by device class. For example, device classes include mobile phone, handheld tablet, laptop, etc. The per-class capabilities are used to complement the per-device capabilities. For example, capacity estimation for a device whose capabilities are not known (yet) is carried out based on the expected device capability based on its device class. Capacity estimation for a device whose capabilities are previously observed (and thus known) is based on these capabilities while ignoring the per-class capabilities.

Figure 4:
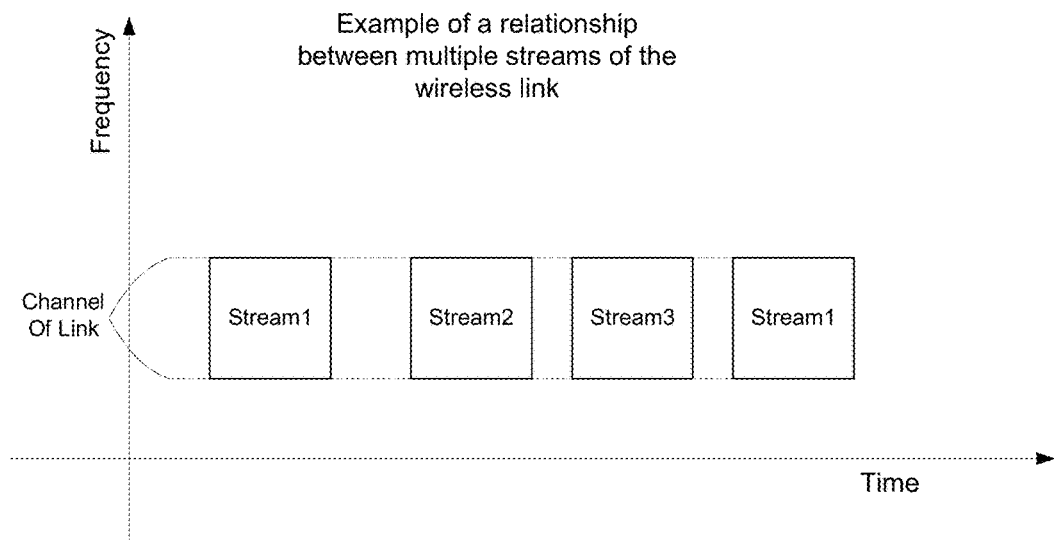
FIG. 4 shows a time line of an example of multiple streams of the wireless link, according to an embodiment.

FIG. 4 shows a time line of an example of multiple streams of the wireless link, according to an embodiment. For this embodiment, the link occupies a frequency allocation as designated by the channel of the link. Further, the different streams (Stream1, Stream2, Stream3) of the wireless link occupy different time slots of the channel of the link. The different streams are time multiplexed within the frequency allocation of the channel of the wireless link. It is to be understood that this is merely an example. The streams may alternatively or additionally be multiplexed across different subcarriers (e.g., OFDM), multiplexed across different spatial modes (spatial multiplexing), or multiplexed across different orthogonal codes (e.g., CDMA).

Figure 5:
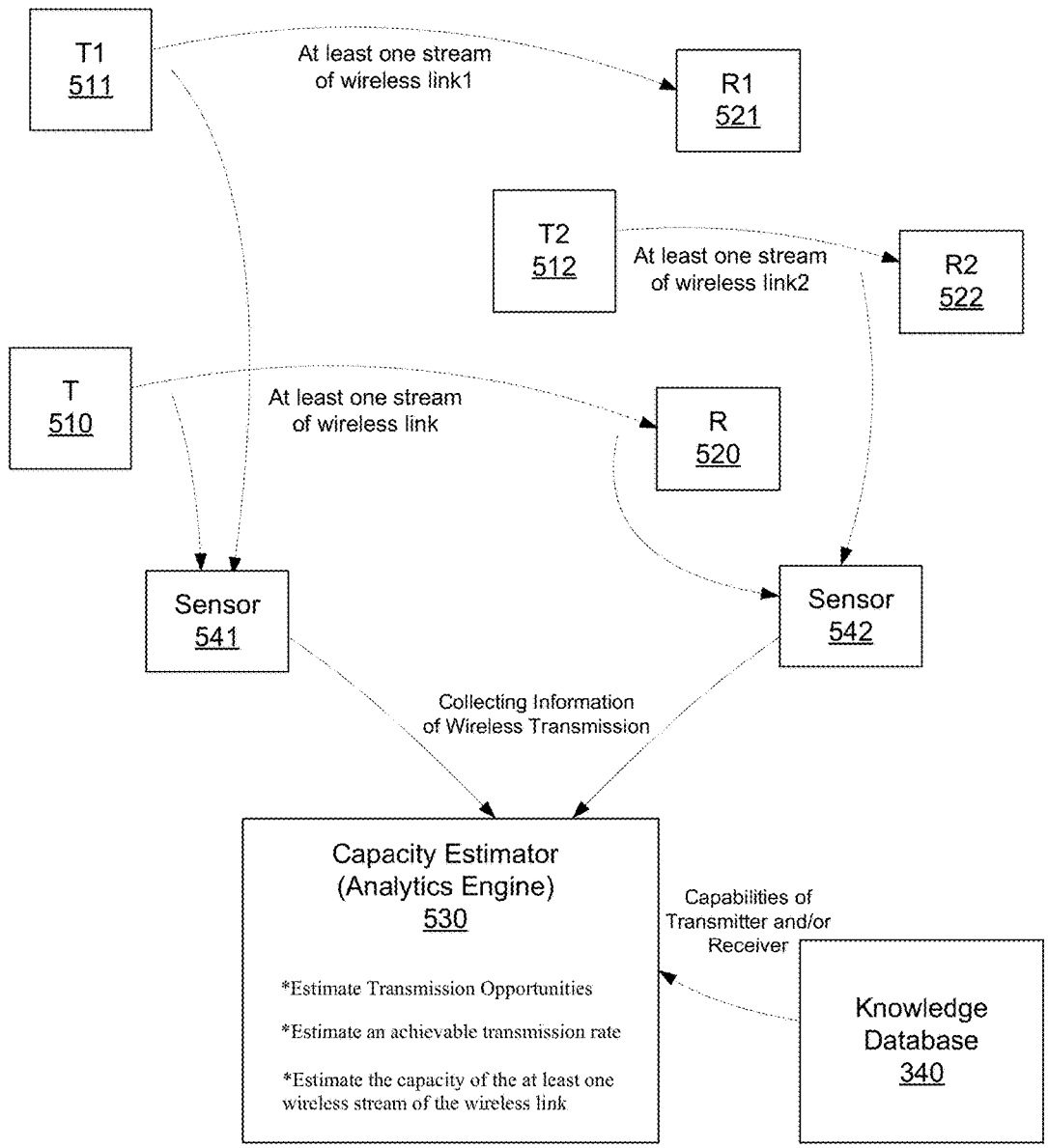
FIG. 5 shows a block diagram of multiple sensors and a capacity estimator estimating a capacity of at least one stream of a wireless link between a transmitter and a receiver, according to an embodiment.

FIG. 5 shows a block diagram of multiple sensors 541, 542, and a capacity estimator 530 estimating a capacity of at least one stream of a wireless link between a transmitter and a receiver, according to an embodiment. As shown, the sensors 541, 542 are operable to sense at least one stream of a plurality of wireless links. For example, a transceiver (T) and a receiver (R) form a first wireless link which may be sensed by both sensor 541 and sensor 542. Another transceiver (T1) and another receiver (R1) form another wireless link (link1) that may be sensed, for example, by the sensor 541. Another transceiver (T2) and another receiver (R2) form another wireless link (link2) that may be sensed, for example, by the sensor 542.

For at least some embodiments, the capabilities of each of the transmitters 510, 511, 512 and each of the receivers 520, 521, 522 are obtained, for example, by the capacity estimator 530. As previously described, the capabilities may be obtained from the transmitters and receivers themselves, from the sensors 541, 542, and/or from the knowledge database 340.

For at least some embodiments, information of wireless transmission of at least one stream of each of the wireless links is collected. As previously described, the wireless transmissions includes at least a portion of a transmission signal with electromagnetic energy above a certain threshold within a frequency band of each of the wireless links. As previously described, for an embodiment, the sensors 541, 542 collect the information of the wireless links between the transmitters 510, 511, 512 and each of the receivers 520, 521, 522, and/or of other electromagnetic sources.

Further, as previously described, at least some embodiments include estimating transmission opportunities available for each transmitter 510, 511, 512 to transmit wireless communications to the receivers 520, 521, 522 based on the obtained capabilities and the collected information.

Further, as previously described, at least some embodiments include estimating an achievable transmission rate by each transmitter 510, 511, 512 based on the determined capabilities and the collected information.

Further, as previously described, at least some embodiments include estimating the capacity of the at least one wireless stream of each wireless link based on the estimated transmission opportunities and the estimated achievable transmission rate.

Figure 6:
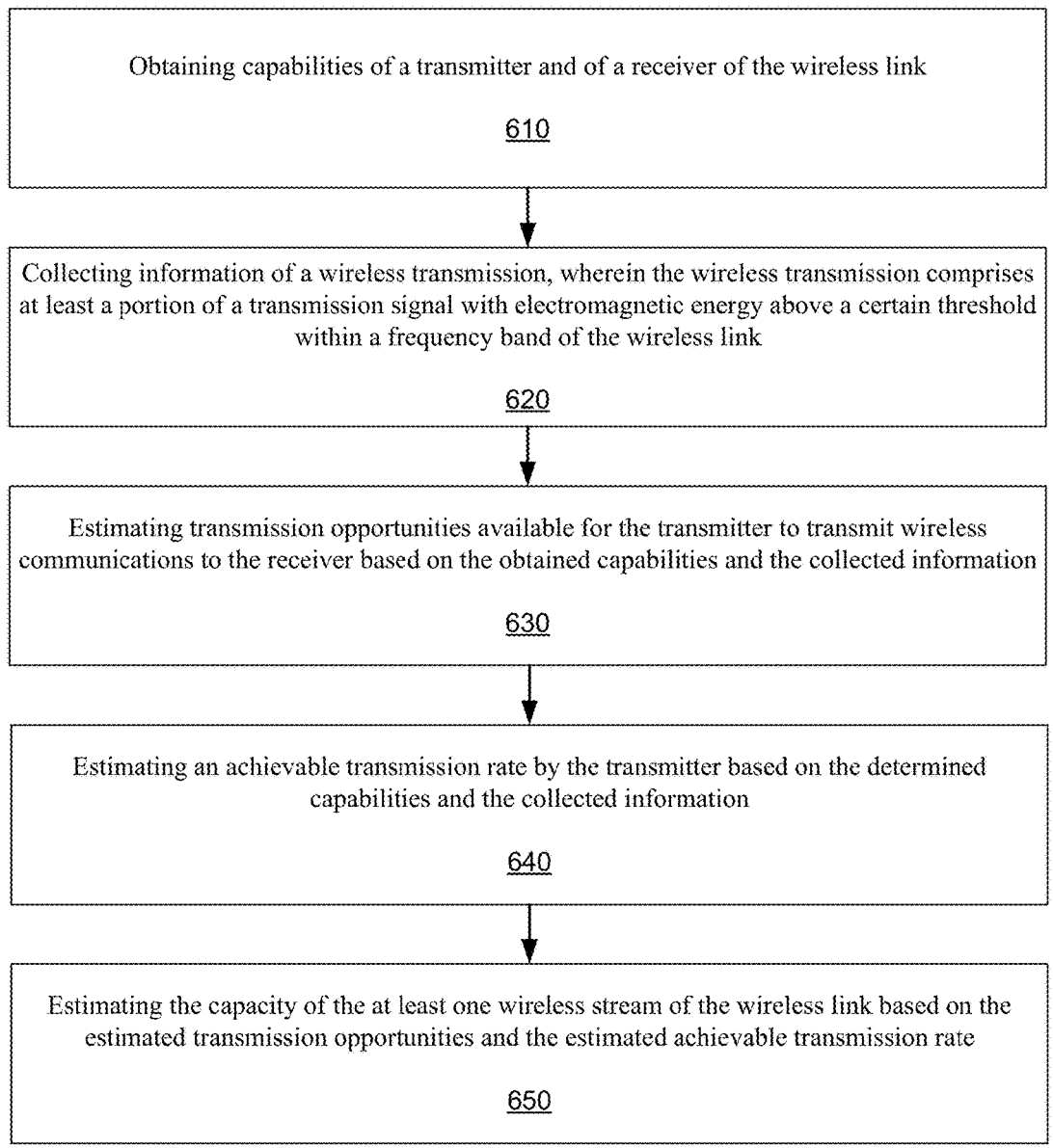
FIG. 6 is a flow chart of a method of estimating a capacity of at least one wireless stream of a wireless link, according to an embodiment.

FIG. 6 is a flow chart of a method of estimating a capacity of at least one wireless stream of a wireless link, according to an embodiment. A first step 610 includes obtaining capabilities of a transmitter and of a receiver of the wireless link. It is to be understood that for at least one embodiment, the receiver is merely a hypothetical receiver (not physically present). That is, for example, a user may query "if the user has a smart phone at this location of the user's house right now, what throughput would it be able to get?" The user would enter, for example, "iPhone" in the GUI, and the processing would assume the iPhone's capability (that is, the iPhone is the hypothetical receiver).

In one example for WiFi (802.11 WLAN) the capabilities of two wireless devices forming the link and the capability of the wireless link can be determined by looking at fields in association-request and association-response management frames. If an association-response frame is missing the AP capabilities can be obtained from a beacon as well.

In another example for WiFi, the capabilities for a hypothetical STA (transmitter) can be looked up in a database and the capability of the link can be determined from the capabilities of STA and AP.

In another example for WiFi, the capabilities of the STA (transmitter) and/or AP (access point) and/or the link can be obtained by doing a SNMP query on wireless controller, which are typically used in managed enterprise WiFi environment.

In another example for WiFi, the capabilities for a STA, an AP and for the link between STA and AP can be stored in a database. For a later connection, if any of the capability information is missing, it can be looked up from the past stored information for the device or the link.

In another example for WiFi, a subset of capabilities for a device can be obtained by looking at the actual data frames being transmitted. For e.g. if a STA transmits an 80 Mhz data frame to the AP, it is definitely 80 Mhz capable, the AP is 80 Mhz capable and the link allows 80 Mhz capability.

In another example for WiFi, if some of the capabilities are re-negotiated using other management frames, those can be determined by looking at the management frames. For e.g. operating mode field from a STA can indicate when it is moving from lower to higher channel bandwidth and vice-versa.

A second step 620 includes collecting information of a wireless transmission, wherein the wireless transmission comprises at least a portion of a transmission signal with electromagnetic energy above a certain threshold within a frequency band of the wireless link. It is to be understood that for at least some embodiments, the wireless transmission includes one or more of signals of interest of the wireless link, other wireless links in same system, other wireless links outside the system, spurious transmissions (e.g., microwave oven).

A third step 630 includes estimating transmission opportunities available for the transmitter to transmit wireless communications to the receiver based on the obtained capabilities and the collected information. For at least some embodiments, the transmission opportunities include one or more of time slots, frequency sub-channels, code slots, or a combination of the each. Further, for at least some embodiments, estimating transmission opportunities includes counting the number of opportunities out of a total, counting the fraction or a percentage.

As previously described, for an embodiment, one way to determine the transmission opportunities is to execute a max-min fairness algorithm. For an embodiment, this includes all the streams using less than their fair share of transmission opportunities winning all they need and the remaining transmission opportunities are equally divided among the remaining streams. Each stream might transmit a different average amount of time for its transmission opportunities. So the average medium usage of the stream combined with its transmit opportunities usage needs to be used to determine the transmission opportunities win for the at least one stream. For example, assuming there is one stream that wins 180 transmission opportunities and transmits for 5 milliseconds each in a 1 second interval (accounting for about 10% of backoff overhead). If there is a new stream (with same priority as existing stream) that starts to contend and use the medium for 10 ms every time it wins the contention, the number of transmission opportunities will be equally divided between the existing stream and the new stream. But the time will not be, as the existing stream will use about half the time of the new stream as it transmits only half of the time of the new stream every time it wins the medium. In this case, one-contention-cycle can be computed as sum of all medium usage. In this case it will be 15 ms (10+5). Dividing 1-sec intervals into 15 msec contention cycles it can be found that about 60 cycles can be accommodated, accounting for about 10% of backoff overhead. So the existing stream will have 60 transmission opportunities and can use the wireless medium for 300 ms. The new stream will have 60 transmission opportunities and can use the wireless medium for 600 ms.

As previously described, for an embodiment, the existing stream and the new stream are of different priorities. In this case the number of transmission opportunities won by the two streams will not be equal but will be higher for higher priority stream. The exact ratio can be computed based on the parameters for contention or can be looked up from a pre-determined table.

As previously described, for another embodiment, the existing stream and the new stream could be of different priorities and multiple levels of min-max fairness algorithm are used. The higher priority stream will win all the transmission opportunities that are required and the remaining will be distributed equally among the next priority of the streams. The multiple levels are required for multiple levels of priority. Within the same priority streams, another instance of min-max fairness can be executed favoring low stream users as explained earlier.

As previously described, for the at least embodiments, a waiting period before each transmission can be defined determining the transmission opportunities. The waiting period can be divided into pre-backoff (distributed coordination function interframe space (DIFS) and arbitration interframe space (AIFS)) time and actual backoff (down-counting of actual backoff slots) time. The pre-backoff time overhead is applied for every transmit opportunity win and backoff time overhead is applied only once for a contention cycle. The idea is that the down-counting of backoff slots happens in parallel at all the transmitters.

A fourth step 640 includes estimating an achievable transmission rate by the transmitter based on the determined capabilities and the collected information.

A fifth step 650 includes estimating the capacity of the at least one wireless stream of the wireless link based on the estimated transmission opportunities and the estimated achievable transmission rate.

As previously described, at least some embodiments include a sensor that collects the information of the wireless transmission. In an embodiment, the sensor is a specialized hardware. In another embodiment, the sensor is included in a motion-controlled mobile platform, the positioning of which is controlled to facilitate sensing. In another embodiment, the sensor is implemented as a software agent on existing network components (access points, stations, switches).

At least some of the disclosed embodiments include a motion-controlled device (such as, a robot or a drone) that is operable to sense signals (and is implemented as one of the previously described sensors) of a wireless network at multiple positionings of the motion-controlled device. At one or more of the positionings, the motion-controlled device is operable to receive wireless signals of the wireless network and support deployment or operation of the wireless network. For at least some embodiments, the sensed wireless signals provide at least a portion of the motion control of the motion-controlled device. For at least some embodiments, the motion-controlled device is activated on demand when a problem in the wireless network occurs, and senses information that is relevant to the problem.

For at least some embodiments, the motion-controlled device is operable to characterize an service area for pre-deployment analysis/planning of the wireless network. For at least some embodiments, the motion-controlled device is operable to determine how wireless signals propagate between a plurality of candidate locations for transceivers of the wireless network. For at least some embodiments, the motion-controlled device is operable to use optical sensors to determine whether a line-of-sight wireless connection is feasible between candidate locations for transceivers of the wireless network.

For at least some embodiments, the motion-controlled device is operable to characterize a deployed wireless network, and further operable to aid in diagnosing operation and/or performance of the deployed wireless network. For at least some embodiments, the motion-controlled device is operable to characterize a deployed wireless network, and further operable to aid in repairing, fixing and/or improving operation of the deployed wireless network. For at least some embodiments, the motion-controlled device is operable to monitor the wireless network continuously to detect performance and/or connectivity problems. For at least some embodiments, the motion-controlled device is operable to detect precursors of problems in the wireless network. That is, the motion-controlled device is operable to detect early warning signs of potential future problems.

Figure 7:
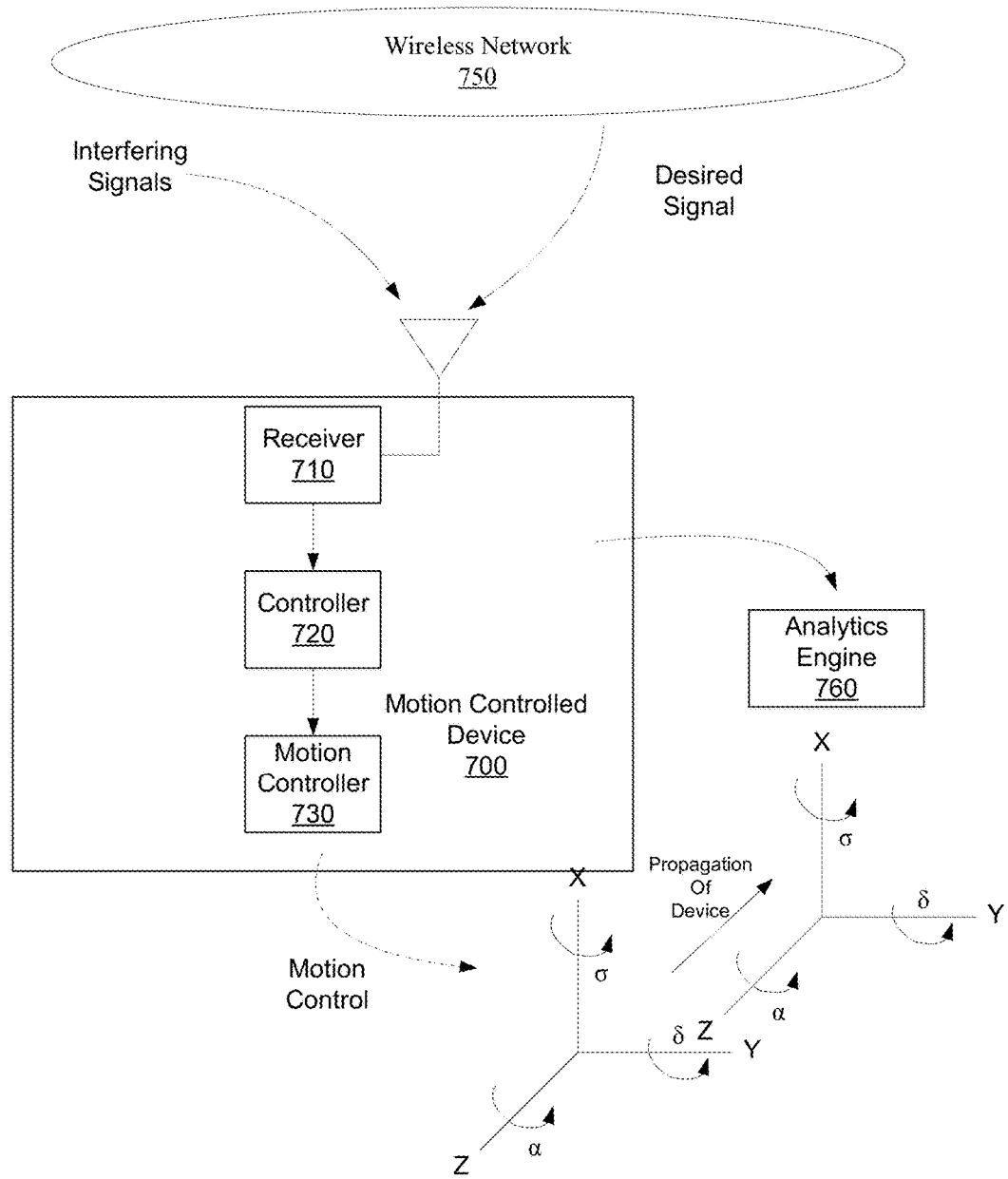
FIG. 7 shows a block diagram of a motion-controlled device that supports deployment and operation of a wireless network, according to an embodiment.

FIG. 7 shows a block diagram of a motion-controlled device that supports deployment and operation of a wireless network, according to an embodiment. The motion-controlled device 700 includes a receiver 710 operative to sense wireless communication signals of the wireless network 750 (which can be considered a target network). While depicted as a receiver 710, it is to be understood that the receiver 710 could be a part of a transceiver of the motion-controlled device 700. A motion controller 730 is operative to control a positioning of the motion-controlled device 700 in a plurality of dimensions. For an embodiment, the motion controller 730 includes a motion actuator. A controller 720 of the motion-controlled device 700 is operative to at least facilitate analysis of the sensed wireless communication signals (from the target network 750), and provide a control signal to the motion controller 720, wherein the control signal at least partially controls the positioning of the motion-controlled device 700 based on the sensed wireless communication signals.

As stated, the motion controller 730 controls positioning of the motion-controlled device 700. For at least some embodiments, the position control includes control of the location of the motion-controlled device 700. For example, the motion controller 720 can enable the motion-controlled device 700 to travel to multiple locations for receiving signals from or communicating with the wireless network 750, or communicating with other similar devices, for supporting deployment or operation of the wireless network 750. For at least some embodiments, the positioning control includes control of the orientation of the motion-controlled device 700. For example, the motion controller 720 can enable the motion-controlled device 700 to translationally and/or rotationally adjust the orientation of the motion-controlled device 700 to allow the motion-controlled device 700 to inspect and/or characterize features of the wireless network 750. For at least some embodiments, the position control includes control of the location and the orientation of the motion-controlled device 700. For at least some embodiments, the position control further includes control of positioning of a component of the motion-controlled device 700, for example an antenna or other sensors. The xyz axis of FIG. 7 shows possible adjustments in the positionings of the motion-controlled devices. That is, the positioning (which could include position or orientation of the device) can be adjusted in the x, y and z orientations, and rotated about any axis. Additionally, the x, y, z reference coordinates can change position over time. Further, a sensor or receiver of the motion-controlled device can be controlled in all of these positionings as well.

At least some embodiments of the motion controller 730 include mechanical means for controlling the positioning of the motion-controlled device 700. Many different implementations of the motion controller 730 are possible. For an embodiment, the motion controller 730 is implemented as a robot or drone that includes, for example, airborne vehicles such as helicopter, a multi-copter, a fixed-wing aircraft, or a ground-based wheeled vehicle, such as tracked or wheeled robots as well as wall or tower climbing vehicles and also water based vehicles that may operate on surface or below water.

FIG. 7 additionally includes an analytics engine 760. For an embodiment, the analytics engine 760 is included and operable within the motion-controlled device 700. For an embodiment, the analytics engine 760 is at least partially included within a server external to the motion-controlled device 700. If external, for an embodiment, at least a portion of information of the sensed communication signals is shared by the motion-controlled device 700 with the external server. That is, for an embodiment, the controller 720 is further operative to support communication with the analytics engine 760. For some embodiments, the communications link between the motion-controlled device 700 and analytics engine 760 is a separate communications link than the link supported by receiver 710 (or the transceiver 210 of FIG. 2). For some embodiments the separate communications link includes a wireless link, a wired link, and optical fiber link.

As will be described, at least some embodiments include a control loop in which the sensed communication signals are processed and used to control operation of at least some wireless devices associated with the wireless network 750. For at least some embodiments, the control loop includes the motion-controlled device 700 and/or the analytics engine 1550.

As described, the controller 720 of the motion-controlled device 700 is operative to at least facilitate analysis of the sensed wireless communication signals, and provide a control signal to the motion controller 720, wherein the control signal at least partially controls the positioning of the motion-controlled device 950 based on the sensed wireless communication signals.

For at least some embodiments, the controller 720 being operative to provide the control signal to the motion controller includes the controller determining a received signal quality parameter at the receiver 710 of a signal received from at least one terminal of the wireless network 750, and selecting the control signal to the motion controller 730 to reposition the motion-controlled device 700 to change the received signal quality parameter of the signal received from the at least one terminal of the wireless network 750. For at least some embodiments, control signal to the motion controller 730 is selected to reposition the motion-controlled device 700 to change (for an embodiment, the change increases) the received signal quality parameter of the signal received from the at least one of terminals of the wireless network 750, while maintaining a received signal quality parameter of at least one signal received from other terminals of the wireless network relative (either above or below) to a specified threshold. For an embodiment, the motion-controlled device 700 is repositioned to maximize (increase) the received signal strength of the signal (a desired signal) from one terminal of the wireless network, while ensuring that the received signal strength of the signal from another terminal (a second desired signal) remains above a specified threshold. For another embodiment, the motion-controlled device 700 is repositioned to maximize (increase) the received signal strength of the signal (a desired signal) from one terminal of the wireless network, while ensuring that the received signal strength of the signal from another terminal (an undesired interfering signal) remains below a specified threshold. For another embodiment, the motion-controlled device 700 is operative to move along the signal power gradient of a wireless signal that interferes with the wireless network, thus locating the signal source.

The motion control can be influenced by the motion-controlled device 700 a software agent operating on the motion-controlled device 700, the analytics engine 760, and/or an operator. That is, for an embodiment, motion control of the motion-controlled device 700 is at least partially controlled by the analytics engine 760. For an embodiment, motion control of the motion-controlled device 700 is at least partially controlled by an operator. For an embodiment, the operator is located in network operator control (NOC). For an embodiment, a fleet of drones is ready to be dispatched at NOC. For an embodiment, the operator is located in a vehicle, such as a van, wherein the drone is launched from the van. For an embodiment, the operator uses visual control/oversight of partially autonomous drone operation.

The sensing of the wireless signals can be influenced by the motion-controlled device 700, a software agent operating on the motion-controlled device 700, the analytics engine 760, and/or an operator. That is, for an embodiment, sensing of the wireless signals is at least partially controlled by the analytics engine. For an embodiment, sensing of the wireless signals is at least partially controlled by an operator. For an embodiment, the motion-controlled device 700 has two sensing modes: In a first mode, sensing of the wireless signals is used for maneuvering the device to a desired position with respect to the transceivers (wireless devices) of the wireless network, and comprises measuring received signal strengths. In a second mode, sensing of the wireless signals is used for diagnosing a problem in the wireless network, and comprises measuring received signal strengths, signal source identifiers, wireless protocol sequence information, wireless protocol traffic patterns. In an embodiment, the motion-controlled device switches between the two sensing modes repeatedly at the direction of the analytics engine 760. For another embodiment, the two modes of sensing are carried out simultaneously (hybrid mode).

For an embodiment, the motion-controlled device 700 is equipped with additional sensors that are activated based on previously sensed wireless signals.

For an embodiment, the sensed wireless signals include signals transmitted from a first external transceiver to a second external transceiver, wherein the analysis of the sensed wireless communication signals comprises diagnosing a problem condition associated with signals transmitted from the first external transceiver to the second external transceiver. For example, for an embodiment, the motion-controlled device determines whether the received signal strength of the signals from the first external transceiver at the location of the second external transceiver exceeds a predetermined threshold. For another embodiment, the motion-controlled device determines an estimate of the number of distinct propagation paths of the signal transmitted from a first external transceiver to a second external transceiver. For another embodiment, the motion-controlled device determines a probability, over a predetermined period of time, of the signals transmitted from the first external transceiver to the second external transceiver being impaired by external interference.

As described, for at least some embodiments, the sensed signals are communication signals of the wireless network. Further, for at least some embodiments, the sensed wireless signals include signals interfering with communication within the wireless network.

For at least some embodiments, the motion-controlled device 700 is operative to modify or update a condition of a wireless device of the wireless network. For an embodiment, the update to the condition of the wireless device includes upgrading firmware of the wireless device. For an embodiment, the update to the condition of the wireless device includes reconfiguring, including for example, connecting the wireless device to a new/different access point. For an embodiment, the update to the condition of the wireless device includes replacing at least a portion of hardware of the wireless device. For an embodiment, the update to the condition of the wireless device includes repointing or redirecting an orientation of the wireless device or an antenna of the wireless device. For an embodiment, the wireless device includes a magnetic switch, and the update to the condition of the wireless device includes turning the wireless device on or off which reboots the wireless device. As will be described, for an embodiment, the motion-controlled device 700 physically interfaces through, for example, a docking mechanism, and the updates can be performed while the motion-controlled device 700 is docked to the wireless device.

For at least some embodiments, the sensed wireless signals include signals transmitted from a first external transceiver to a second external transceiver of the wireless network. That is, the motion-controlled device eavesdrops or listens (receives) wireless communication occurring within the wireless network. Further, the analysis of the sensed wireless communication signals includes diagnosing a problem condition associated with signals transmitted from the first external transceiver to the second external transceiver.

For at least some embodiments, the motion-controlled device is operative as a relay station within the wireless network. That is, the motion-controlled device itself becomes a part of the wireless network and aid at least one device of the wireless network to maintain a connection with the wireless network.

Figure 8:
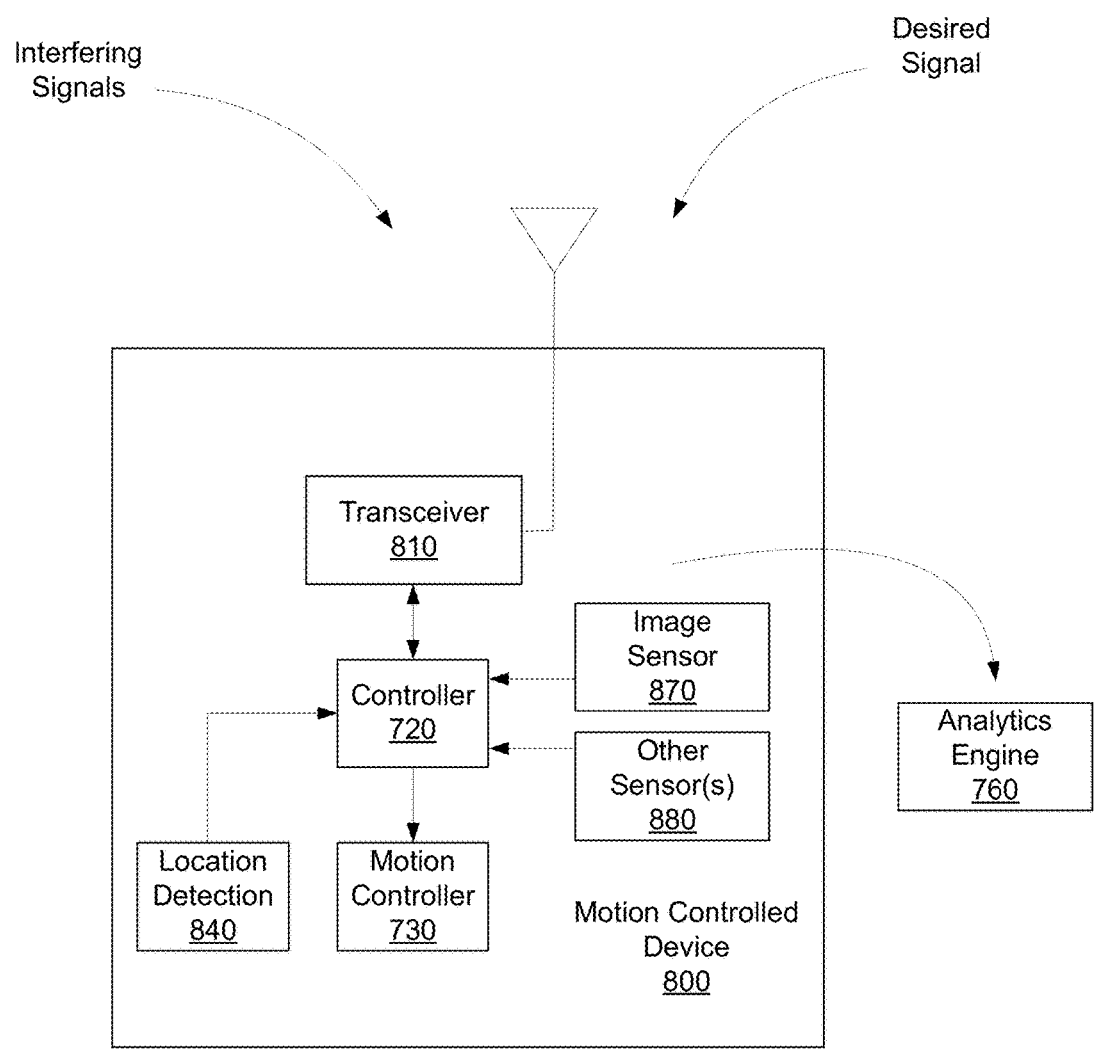
FIG. 8 shows another block diagram of a motion-controlled device that supports deployment and operation of a wireless network, according to another embodiment.

FIG. 8 shows another block diagram of a motion-controlled device 800 that supports deployment and operation of a wireless network, according to another embodiment. For this embodiment, the receiver in included within a transceiver 810. For an embodiment, the transceiver 810 allows the motion-controlled device 800 to communication with wireless devices of, for example, the wireless network 750.

For at least some embodiments, the communication with the wireless device of the wireless network is through a secondary communication channel of the wireless device. For example, the primary mode of communication within the wireless network could be an 802.11 (WiFi) wireless communication, whereas the communication between the motion-controlled device 800 and the wireless device could include cellular, Bluetooth and/or wired communication. For an embodiment, the motion-controlled device uses the secondary communication channel for its communication with the wireless device for purposes of robustness to failure of the primary mode of communication. For example, for an embodiment, the motion-controlled device determines that the primary communication channel is inoperative, and then falls back on the secondary communication channel. For another embodiment, the secondary communication channel exists for the purposes of secure communication with well-defined access control. For example, for an embodiment, the motion-controlled device determines that the first communication channel is not sufficiently secure for a particular type of information to be communicated, for example, a firmware upgrade, configuration update, etc., and then uses the secondary communication channel for this secure communication.

For another embodiment, the motion-controlled device is operable to control its positioning to maintain a distance from the wireless device that is below a predefined threshold (that is, the motion controller maintains the distance between the motion-controlled device and the wireless device to be within a threshold distance). Example secondary communication channels include near-field communication, short-distance networks, personal area networks (PAN). For example, this positioning control is implemented for the purpose of security by proximity. For another example, this positioning control is implemented for the purpose of maintaining a data transmission rate above a certain threshold via the primary or secondary communication channel. Maintenance of the distance to within the threshold distance allows for the primary or secondary channel to be established and maintained, enhances the security of the communication, and allows for a transmission data rate of communication through the primary or secondary communication channel to be greater than a threshold.

For at least some embodiments, the communication with the wireless device of the wireless network includes the motion-controlled device receiving internal state information of the wireless device. For at least some embodiments, the internal state information includes one or more of transmitted packet count, received packet count, packet failure count, packet count per modulation and coding scheme (MCS), received signal strength, history of received signal strength, rate control state, protocol state, traffic profile information, history of traffic information, interfering signal state, event logs, environmental sensor state, operating system state, file system state, firmware state, and/or hardware state.

Further, the motion-controlled device 800 includes an image sensor 870 and/or other sensors 880. An exemplary non-complete list of possible sensors includes camera, a light sensor, power detector, thermal imaging/heat sensor, humidity sensor, and/or an image sensor.

For an embodiment, the sensor includes an image sensor 870, and the controller 720 is further operative to facilitate analysis of a wireless device of the wireless network based on at least one image generated by the image sensor. For example, for an embodiment, the at least one image is utilized to detect miss-pointing of an antenna of the wireless device, detect physical antenna damage.

Further, the controller 720 is operative to determine from at least one image generated by the image sensor an approximation of a quantity related to the wireless network, determine, based on the approximation of the quantity, whether to conduct a direct measurement of the quantity related to the wireless network, perform the direct measurement of the quantity related to the wireless network, and select the control signal to the motion controller to reposition the motion-controlled device to change the quantity towards a pre-specified target value.

For at least some embodiments, the approximation of the quantity related to the wireless network includes at least one of estimates of angles, distances, obstruction, line of sight, etc. For at least some embodiments, the direct measurement of the quantity related to the wireless network includes at least one of signal strength, interference level, connectivity matrix, etc. The direct measurement of the quantity may take long (for example, 8 seconds). Using the image sensor allows a targeting of the measure only at positions that are promising.

Further, as shown in FIG. 8, the motion-controlled device 800 includes location detection 840. The location detection unit 840 allows for a determination of one or more locations of the motion-controlled device. For an embodiment, the sensed wireless communication signals of the wireless network are monitored or tracked along with the determined locations. For an embodiment, the location detection unit 840 includes at least one of a GPS receiver, a WiFi signature analysis, an accelerometer, a gyroscope a, magnetic sensor, other GPS-like triangulation systems etc.

Figure 9:
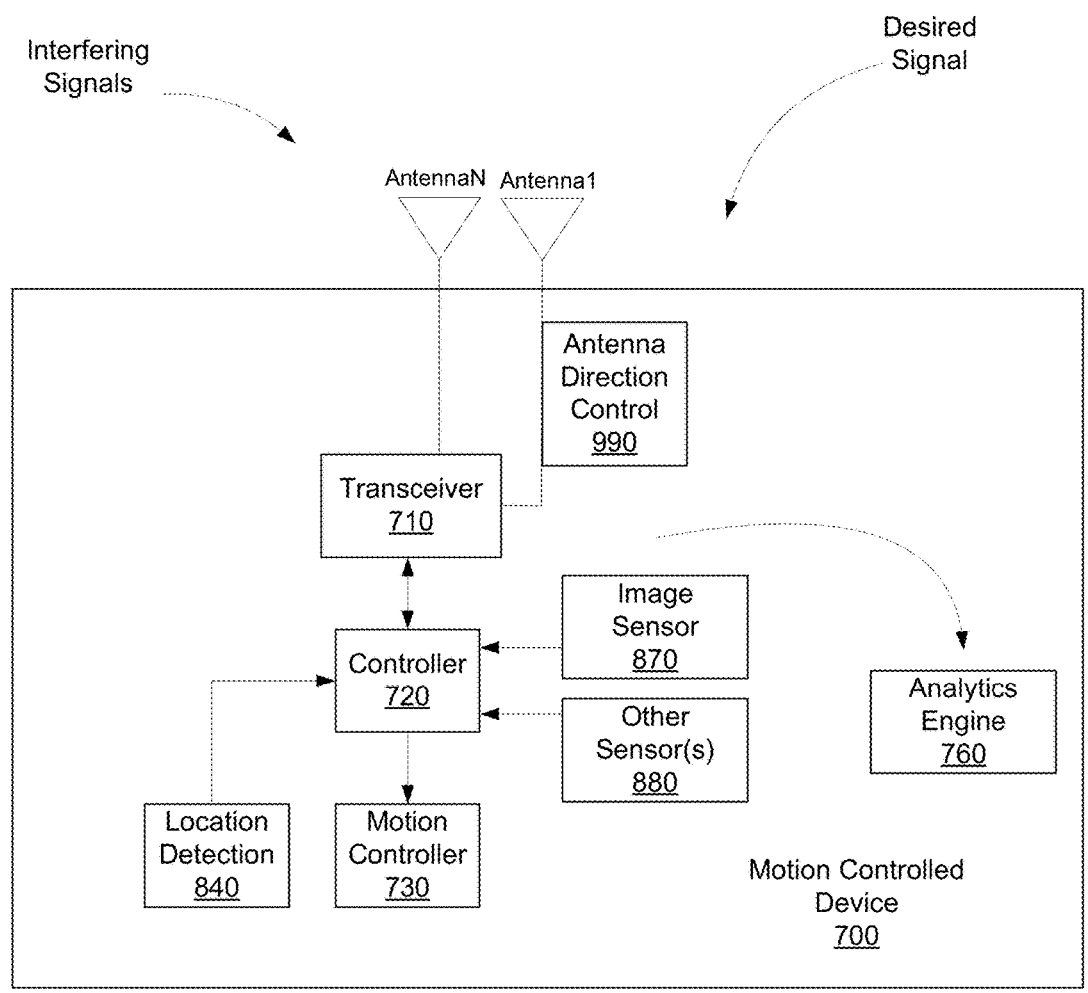
FIG. 9 shows another block diagram of a motion-controlled device that supports deployment and operation of a wireless network, according to another embodiment.

FIG. 9 shows another block diagram of a motion-controlled device that supports deployment and operation of a wireless network, according to another embodiment. This embodiment includes at least one of a directional antenna (antenna1) wherein an actuator (antenna direction control 990) controls the direction of the directional antenna, or multiple antennas (antenna1-antennaN).

For an embodiment, the actuator 990 of the directional antenna is operable to control the directional antenna in as many as three dimensions. For an embodiment, the actuator 990 of the directional antenna includes motors that move the directional antenna to point in a predetermined direction. For another embodiment, the actuator 990 of the directional antenna is operable to vary the directional gain of the antenna. For another embodiment, the actuator 990 of the directional antenna is operable to ensure the directional antenna remains pointed at a predetermined target regardless of the positioning of the motion-controlled device 700.

It is to be understood that for at least some embodiments, the actuator control can extend to other sensors of the motion-controlled device, such as image sensor 870 or other sensors 880. For an embodiment, the actuator control of the image sensor 870 can implement panoramic image acquisition. For another embodiment, multiple images taken from different image sensor positionings enable faster detection of problems in the wireless network.

As previously stated, for an embodiment, the motion-controlled device is operative to communicate with a wireless device of the wireless network. For an embodiment, based on directional pointing of the one or more antennas, the motion-controlled device is operative to determine desirable placements of to-be-deployed wireless devices of the wireless network. For an embodiment, the directional antenna includes the same design as the antenna in the to-be-deployed wireless device. For another embodiment, the directional antenna of the motion-controlled device 700 is an adaptive antenna that can be configured to behave as either one of a plurality of possible antenna designs in the to-be-deployed wireless device. In this embodiment, sensing results from the motion-controlled device 700 help in choosing one of the plurality of possible antenna designs. For another embodiment, the motion-controlled device 700 records data that helps select among a plurality of different to-be-deployed wireless device designs.

For an embodiment, the motion-controlled device is operative to indicate desirable placement of the to-be-deployed wireless device by physically marking the position. For example, a roof-top may be marked to indicate a desired placement of an access point, or an antenna of a receiving device. This can include, for example, marking chalk on a roof tile, or marking a location with (washable) ink or chalk spray.

Figure 10:
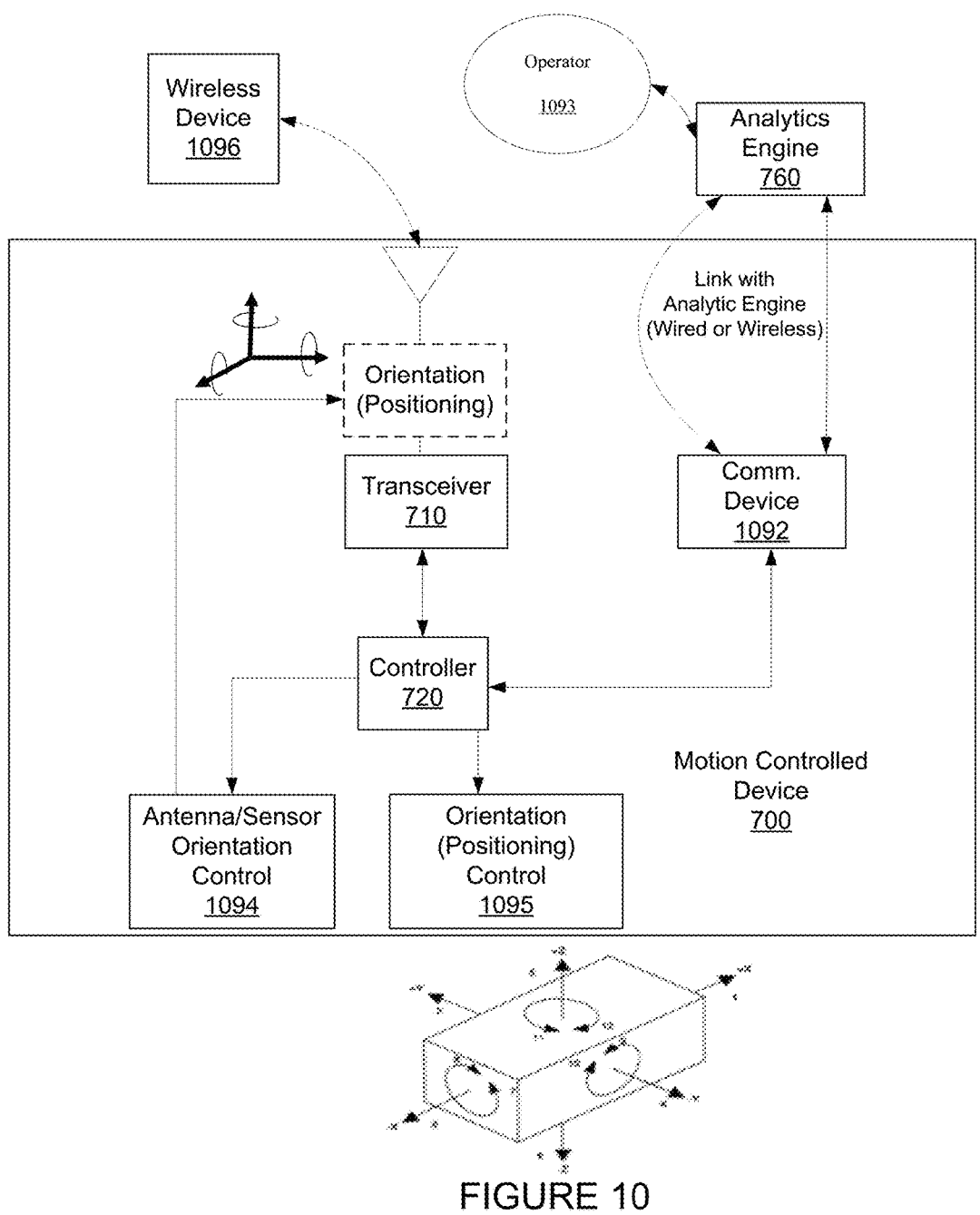
FIG. 10 shows another block diagram of a motion-controlled device that supports deployment and operation of a wireless network, according to another embodiment.

FIG. 10 shows another block diagram of a motion-controlled device 700 that supports deployment and operation of a wireless network, according to another embodiment. As previously described, this embodiment includes the orientation (positioning) control 1095 that controls a positioning of the motion-controlled device 700. As previously described, this embodiment includes the orientation (positioning) control 1094 that controls a positioning of the antenna of the motion-controlled device 700.

The embodiment of FIG. 10 further includes a communication device 1092 that supports a separate communication channel with the analytics engine 760, or at least a portion of the analytics engine 760. That is, separate from the communication channel between the motion-controlled device and the wireless device 1096 of the wireless network. As such, for an embodiment, the motion-controlled device 700 is operable to support a first communications channel with the wireless device 1096, and a second communications channel with at least a portion of the analytics engine 760. Further, for an embodiment, an operator 1093 interfaces with the analytics 760.

Figure 11:
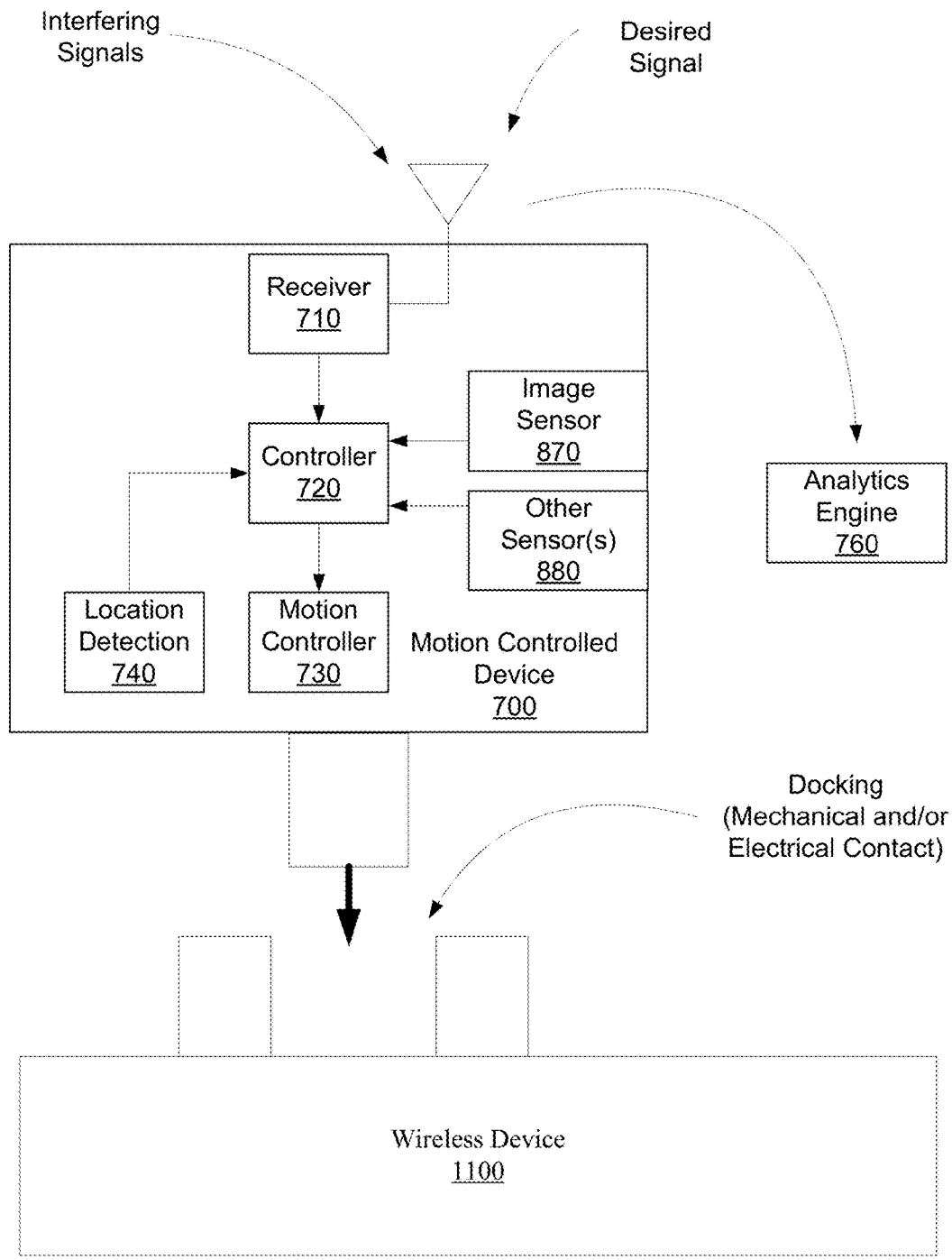
FIG. 11 shows a block diagram of a motion-controlled device that supports deployment and operation of a wireless network that includes a docking mechanism, according to an embodiment.

FIG. 11 shows a block diagram of a motion-controlled device 700 that supports deployment and operation of a wireless network that includes a docking mechanism, according to an embodiment. For an embodiment, the controller 720 and the motion controller 730 are further operative to dock the motion-controlled device 700 with a wireless device 1100 of the wireless network 750. Once physically docked with the wireless device 1100, the motion-controlled device 700 can extract at least some information from the wireless device 1100, or provide at least some information (which is secure) to the wireless device 1100. For an embodiment, once docked, the motion-controlled device 700 is operative to provide temporary replacement service (for example, drone stays in place until technician arrives). For an embodiment, once docked, the motion-controlled device 700 is operative to mechanically replace at least a part of the wireless device 1100.

For an embodiment, once docked, at least some information is communicated between the motion-controlled device and the wireless device through a mechanical/electrical connection that is established while the motion-controlled device is docked with the wireless device.

Figure 12:
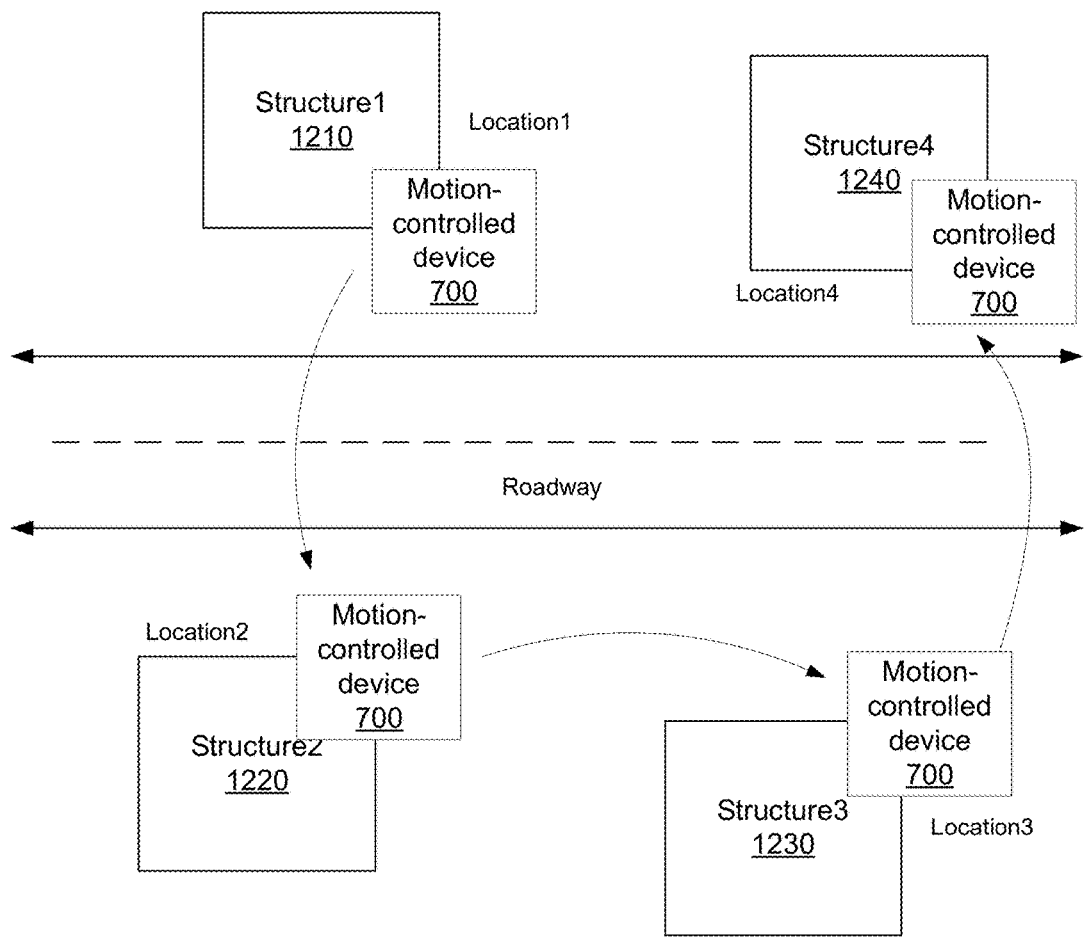
FIG. 12 shows a device at a sequence of locations of a wireless network, according to an embodiment.

FIG. 12 shows a motion controlled device 700 at a sequence of locations of a wireless network, according to an embodiment. The sequence of locations can include, for example, visits to a first structure 1210, a second structure 1220, a third structure 1230, and a fourth structure 1240. As previously described, for an embodiment, a location detection unit (such as location determination unit 740) is operative to determine one or more physical locations of the motion-controlled device 700. Further, for an embodiment, the motion-controlled device 700 is operative to visit multiple locations, determine a physical location of the motion-controlled device 700 at each of the multiple locations, and measure a quantity of interest at each of the multiple locations and/or positionings of the motion-controlled device 700.

For an embodiment, at least one of the motion-controlled device 700 or the analytics engine 760 records the locations/measured quantities of interest. For an embodiment, the motion-controlled device 700 is operative to communicate the measured quantities of interest and corresponding locations to an analytics engine. For an embodiment, the measured quantities of interest include at least one of signal strength, wireless capacity, MIMO channel characteristics, and/or interference levels.

For at least some embodiments, the analytic engine 760 generates a map of the quantity of interest. For an embodiment, the map is a 2D (two-dimension) map that includes values of the quantity of interest at, for example, longitude (x), latitude (y). For an embodiment, the map is a 3D map that includes values of the quantity of interest at, for example, longitude (x), latitude (y) and elevation (z). For an embodiment, the map is greater than a 3D map and further includes an orientation of the motion-controlled device or an orientation of an antenna or sensor of the motion-controlled device. For an embodiment, the map is greater than a 6D map that further includes an orientation of the motion-controlled device and an orientation of an antenna or sensor of the motion-controlled device.

To optimize the travel of the motion-controlled device to any particular location of the wireless network, for an embodiment, the motion-controlled device is one of a plurality of devices, wherein each device of the plurality of devices is physically stored at an optimized location when inactive, wherein each point in the wireless network can be navigated to within a predetermined time by at least one of the plurality of devices.

Further, for an embodiment, the motion-controlled device is operative to follow a predefined measurement schedule when a problem of the wireless network is detected.

Further, for an embodiment, the motion-controlled device is operative to determine desirable placements of to-be-deployed wireless devices of the wireless network.

Figure 13:
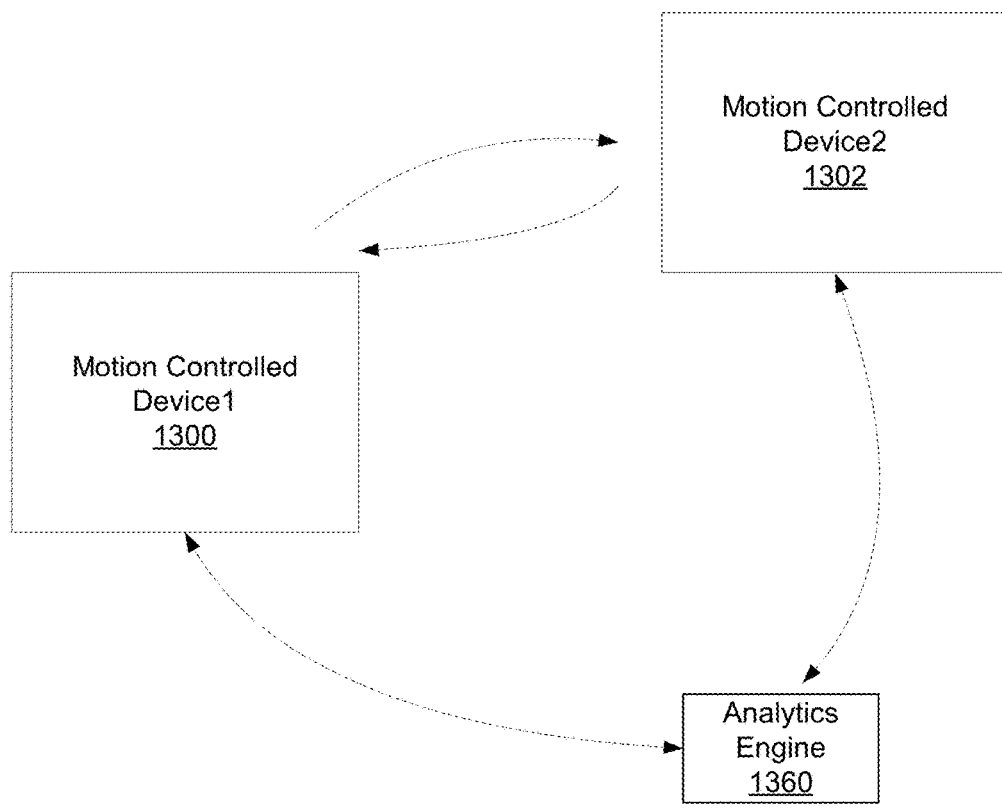
FIG. 13 shows a multiple motion-controlled devices that support deployment and operation of a wireless network, according to an embodiment.

FIG. 13 shows a multiple motion-controlled devices 1300, 1302 that support deployment and operation of a wireless network, according to an embodiment. For an embodiment, the multiple motion-controlled devices 1300, 1302 are used in conjunction to characterize the wireless network.

For an embodiment, motion between the motion-controlled devices 1300, 1302 is coordinated by an analytics engine that is communicating with each of the plurality of devices.

For an embodiment, at least some of the motion-controlled devices of the plurality of devices sensing wireless signals at overlapping time intervals. For another embodiment, a subset of motion-controlled devices of the plurality of devices are sensing wireless signals, while the remainder of the plurality is deployed as wireless network nodes in a predetermined fashion to generate a specific wireless network scenario of interest. For example, at least one motion-controlled device of the plurality of devices is configured as a network access point, while a second motion-controlled device of the plurality of devices senses the access point signal strength at various locations. If more than one motion-controlled device of the plurality of devices is configured as a network access point, this enables determining frequency reuse patterns and capacity coverage.

For another embodiment, two motion-controlled devices of the plurality of motion-controlled devices act as wireless communication partners, while a third motion-controlled device of the plurality of devices transmits a predetermined interference signal from predetermined locations.

For an embodiment, the plurality of motion-controlled devices is coordinated by the analytics engine 1360. For another embodiment, the plurality of motion-controlled devices is coordinated by a distributed algorithm that runs on this plurality. For example, for an embodiment, two drones (wherein each drone is a motion-controlled device) act as communication partners, one drone connects to AP while the other drone creates interference. One drone acts as AP (located at candidate AP location) while other drone measures AP signal strength from multiple locations.

Figure 14:
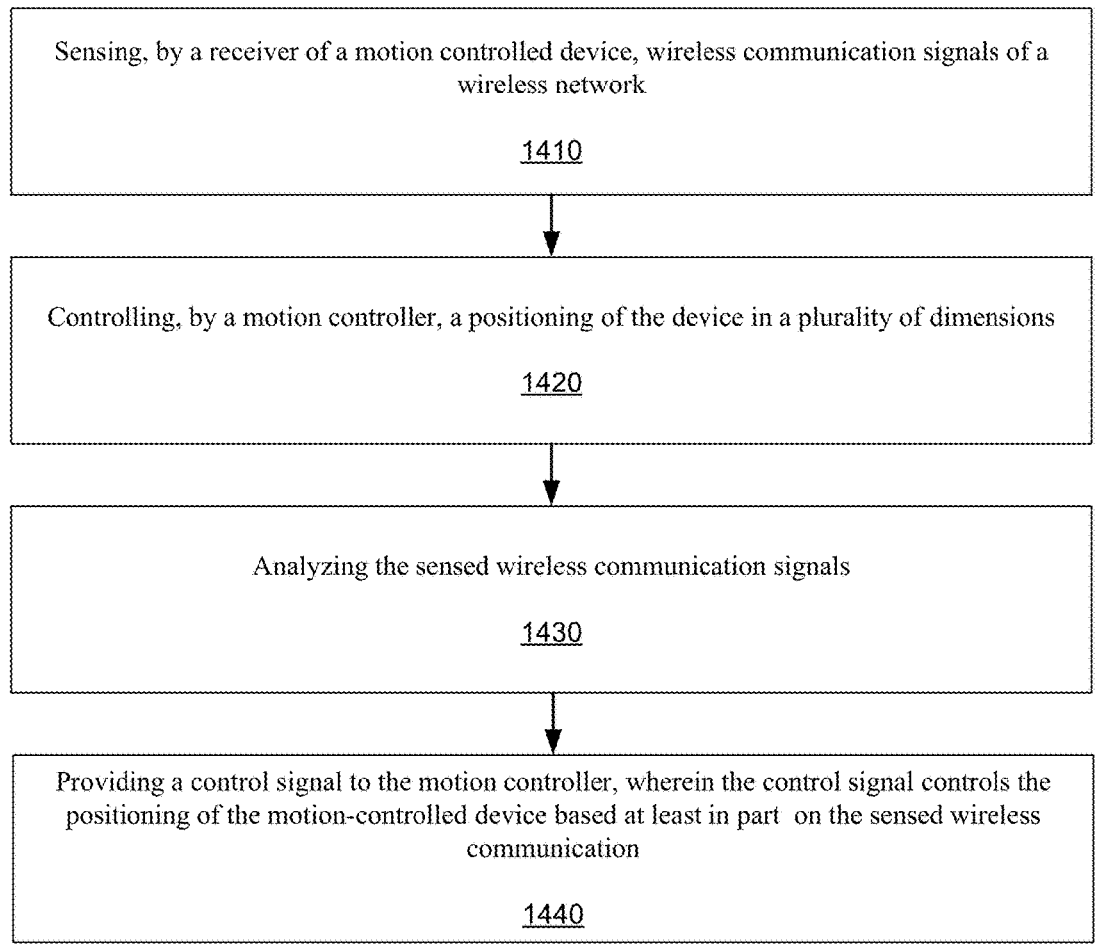
FIG. 14 is a flow chart that shows steps of a method of supporting deployment and operation of a wireless network, according to an embodiment.

FIG. 14 is a flow chart that shows steps of a method of supporting deployment and operation of a wireless network, according to an embodiment. A first step 1410 includes sensing, by a receiver of a motion-controlled device, wireless communication signals of a wireless network. A second step 1420 includes controlling, by a motion controller, a positioning of the motion-controlled device in a plurality of dimensions. A third step 1430 includes analyzing the sensed wireless communication signals. A fourth step 1440 includes providing a control signal to the motion controller, wherein the control signal controls the positioning of the motion-controlled device based at least in part on the sensed wireless communication signals.

Figure 25:
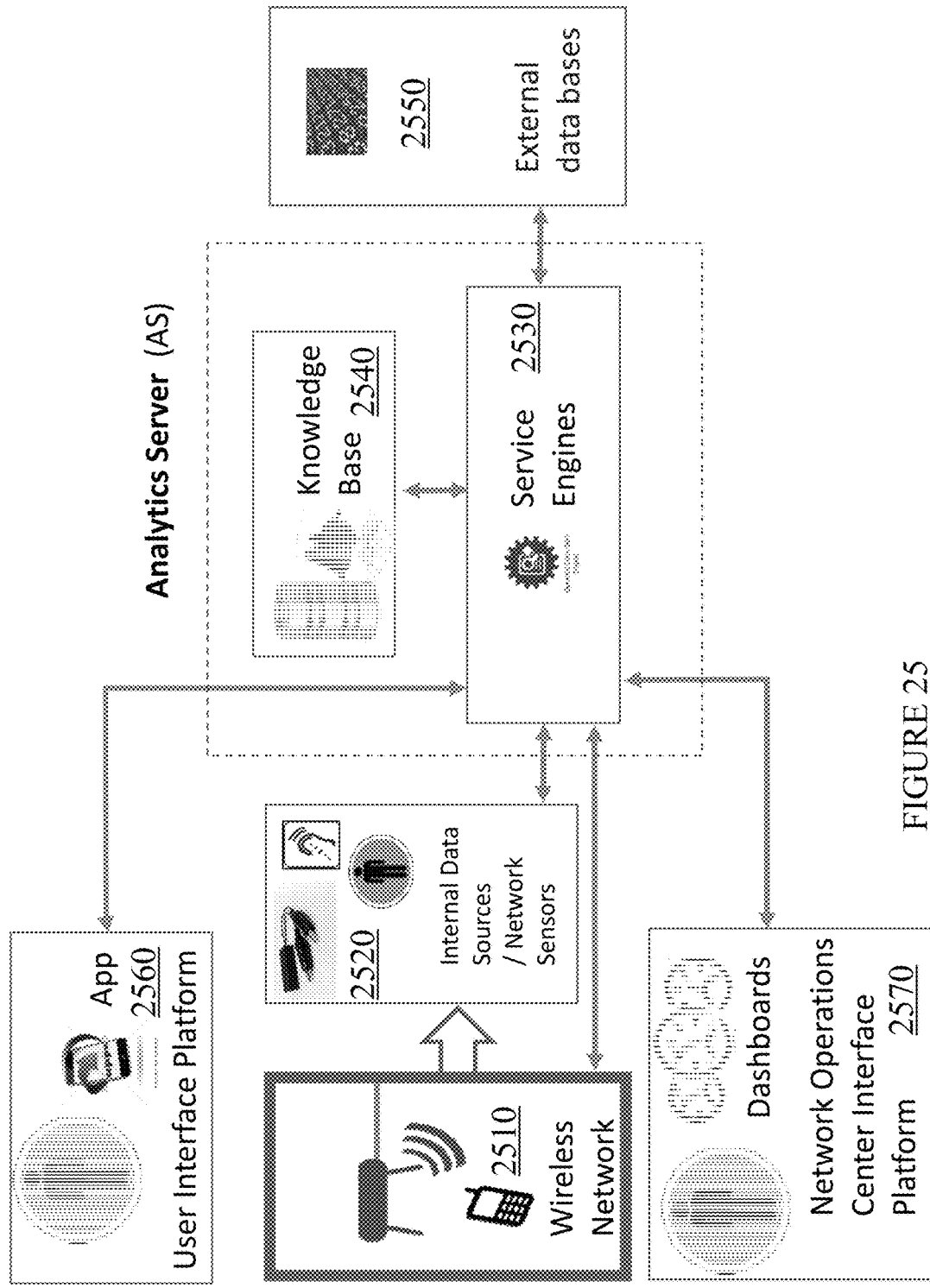
FIG. 25 shows a block diagram of a sense, model and control methodology for improving performance of a wireless network, according to an embodiment.

For the following described embodiments, the motion-controlled devices are implemented as, for example, the internal data sources and data sources 2520 of FIG. 25. Alternatively, or additionally, the motion-controlled devices are implemented as, for example, as at least a portion of the wireless network 2510. For example, for an embodiment, the motion-controlled devices operate as wireless devices or access nodes of the wireless network 2510. Alternatively, or additionally, the motion-controlled devices are implemented as, for example, as at least a portion of the service engines 2530. That is, for an embodiment, at least a portion of the service engines operate on one or more of the motion-controlled devices.

As least some embodiment includes an analytics engine that determines a problem exists by either receiving an indication that the problem exists, or by detecting that the problem exits. At least some embodiments include a "man-in-the-loop" which includes, for example, a user or a wireless network operator that provides additional input(s) and/or controls for the analytics engine. The analytics engine uses one or more of available resources to characterize the problem and provide actions for mitigating the problem.

Figure 15:
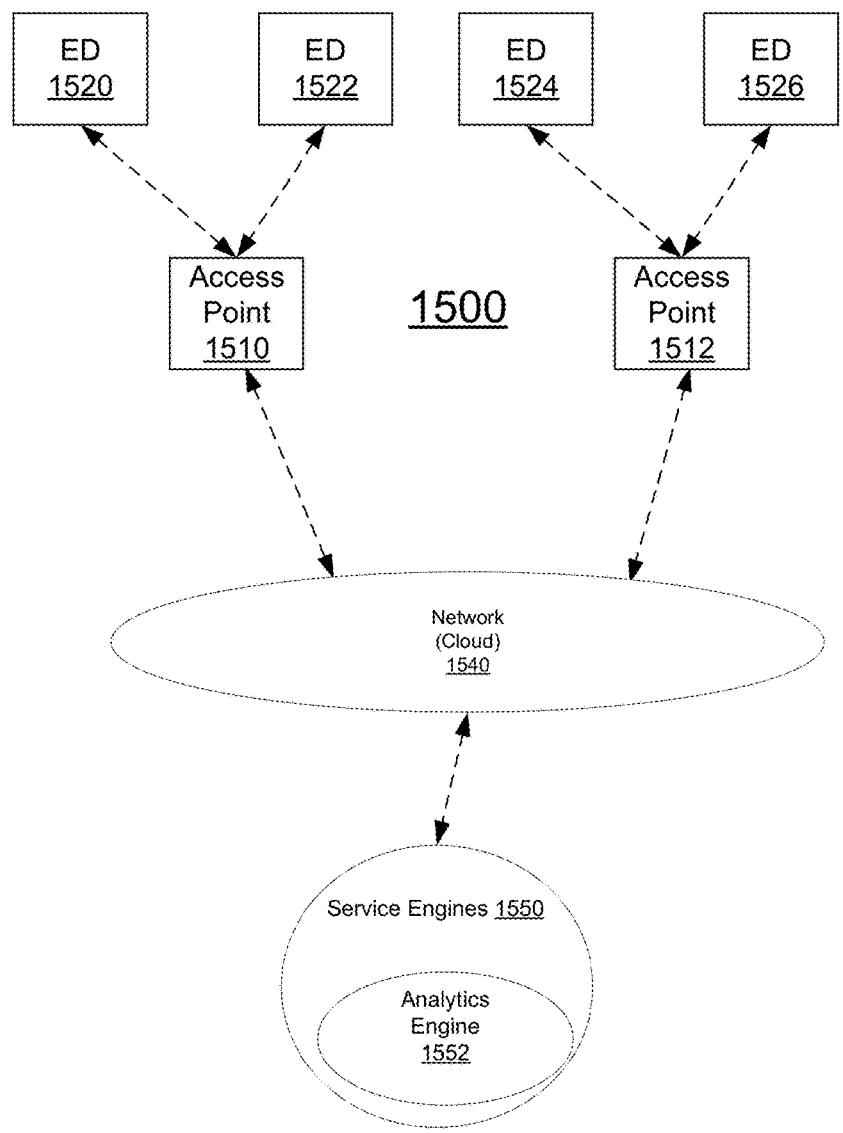
FIG. 15 shows a wireless network that includes an analytic engine operative to mitigate wireless networking problems, according to an embodiment.

FIG. 15 shows a wireless network 1500 that includes an analytic engine 1552 operative to mitigate wireless networking problems, according to an embodiment. As shown, multiple end devices (ED(s)) 1520, 1522, 1524, 1526 are connected to a network 1540 through access points 1510, 1512. For at least some embodiments, the network 1540 provides a communication channel between service engines 1550 and the ED(s) 1520, 1522, 1524, 1526 and the access points 1510, 1512. For an embodiment, the service engines 1550 include the analytics engine 1552. While depicted as a single block, it is to be understood that the service engines 1550 and the analytics engine 1552 are functionally operating units that can be distributed amongst one or more servers or computers that are connectable to the network 1540. For at least some embodiments, one of the previously describe motion-controlled devices may be operational as at least one of the ED(s) 1520, 1522, 1524, 1526 or one of the access points 1510, 1512. Further, as previously described, for at least some embodiments, one of the previously describe motion-controlled devices may be operational as at least a portion of the analytics engine.

For at least some embodiments, the analytics engine 1552 is operative as a central intelligence for detection, analyzing, classifying, root-causing, or controlling the wireless network. For an embodiment, the analytics engine 1552 mitigates a wireless networking problem of a wireless network.

For an embodiment, the analytics engine 1552 determines a problem associated with the wireless network. Exemplary wireless network problems include network performance, and/or network connectivity problems. For an embodiment, the problem associated with the wireless network is determined by the analytics engine detecting the existence of a problem based on the state information. For an embodiment, the problem associated with the wireless network is determined by the analytics engine receiving identification notification of the existence of the problem from a user of a wireless device (for example, end device 1520).

For an embodiment, the analytics engine 1552 receives collected user input(s) and state information. The collected user input(s) include, for example, answers by the user to multiple choice questions that relate to the nature of the wireless networking problem, numeric input, or binary input (for example, whether a suggested solution did indeed mitigate the problem).

The state information includes, for example, sensor information, or variables read from network elements (not originating from a physical sensor). For an embodiment, the state information includes the entirety of information available at the analytics engine about the network at a certain point of time. For an embodiment, the sensor information includes physical measurements. For an embodiment, the state information includes a protocol state, and other quantities that are not specifically measured, but already present in memory.

For an embodiment, the analytics engine 1552 maps a problem signature of the user input and the sensor information to at least one of a number of possible problem network conditions. While the term "signature" is used in the described embodiments, it is to be understood that this term can be generally interpreted as one or more variables (sensed measurements, user inputs) that are related to the problem.

For an embodiment, the problem signature includes at least one of a wireless device type, a type of access point that the wireless device is connected or attempting to connect to, or a network type. For an embodiment, the problem signature includes the wireless network topology. For an embodiment, the problem signature includes configuration data of the access point.

For an embodiment, the problem signature includes a data traffic type. For an embodiment, the problem signature includes measured data traffic transmission rates.

For an embodiment, the problem signature includes at least one of a deployment type, or applications that are currently in use in the network. For an embodiment, the problem signature includes a list of applications obtained from end device.

For at least some embodiments, mapping a problem signature of the user input and the sensor information with at least one of a number of possible problem network conditions includes comparing features of the problem signature with problem characterizations stored in the knowledge database. As previously described, the term "signature" is to be understood generally as one or more variables (sensed measurements, user inputs) that are related to the problem.

For at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks, wherein one of the plurality of networks is wireless network.

For an embodiment, the mapping, decision models and/or partitions are constructed by an optimization that enhances the probability of successful problem mitigation.

For an embodiment, the analytics engine 1552 determines instructions for alleviating the problem based on the mapping of the problem signature.

For an embodiment, the analytics engine provides the instructions. For an embodiment, the instructions includes actions that can be taken to mitigate of eliminate the effects of the problem. For at least some embodiments, the instructions in include one or more of device action, operator action, user action, operator action, and/or equipment update. Exemplary device action includes a transmission channel change, a modification of a wireless transmission parameter, setting modulation and coding, and/or setting a MIMO (multiple-input, multiple-output) mode. Exemplary user action includes changing a device location, changing an application setting and/or executing a test. Exemplary operator action includes changing a device configuration, changing a network configuration, and/or rebooting a network component. Exemplary equipment modification and update include adding an additional access point and/or repositioning an access point. It is to be understood that these list are exemplary and that many other such actions may be utilized.

Figure 16:
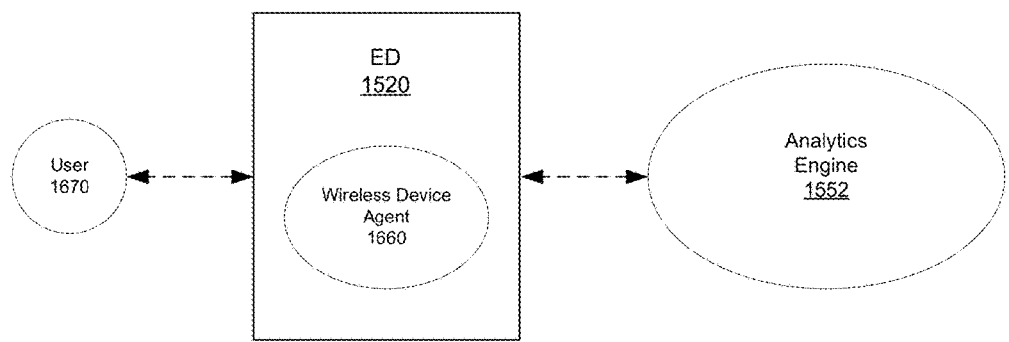
FIG. 16 shows an analytics engine interfaced with a wireless device agent of an end device, according to an embodiment.

FIG. 16 shows an analytics engine 1552 interfaced with a wireless device agent 1660 of an end device 1520, according to an embodiment. For at least some embodiments, the analytics engine 1552 activates the wireless device agent 1660 of the end (wireless) device 1520. For at least some embodiments a communication channel is established between the wireless device agent 1660 and the analytics engine 1552, and wherein the wireless device agent 1660 is operative to interpret commands of a user 1670 of the wireless device 1520, display information to the user 1670, and interface with hardware operations of the wireless device 1520. Further, the wireless device agent 1660 collects the user inputs. Further, for at least some embodiments, the wireless device agent 1660 collects sensor information of the wireless device 1520. The user inputs and the collected sensor information is feedback to the analytics engine 1552, and can be used to diagnose and provide actions for mitigating the problem.

For at least some embodiments, the analytics engine 1552 provides the instructions to the wireless device agent 1660, and further the wireless device agent 1660 applies the instruction to mitigate the detected problem.

For at least some embodiments, the analytics engine 1552 provides the instructions to the wireless device agent 1660, and further the wireless device agent 1660 initiates an action based on the instruction, thereby enabling additional analysis of the problem. That is, the information (user inputs and sensed information) can be used to generate instructions. The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

At least some embodiments include the wireless device agent 1660 communicating the instruction to a user of the wireless device 1520, thereby allowing the user to implement the instruction. Further, for at least some embodiments, the analytics engine provides the instructions to the wireless device agent, and further comprising the wireless device agent 1660 communicating an action to be performed by the user, thereby enabling additional analysis of the problem.

In at least some embodiments, the wireless device agent 1660 is an application that runs on the end device 1520. In at least some embodiments, the wireless device agent 1660 runs in a web browser. In at least some embodiments, the wireless device agent 1660 is part of device driver in the end device 1520. In at least some embodiments, the wireless device agent 1660 is part of the operating system of the end device 1520.

Figure 17:
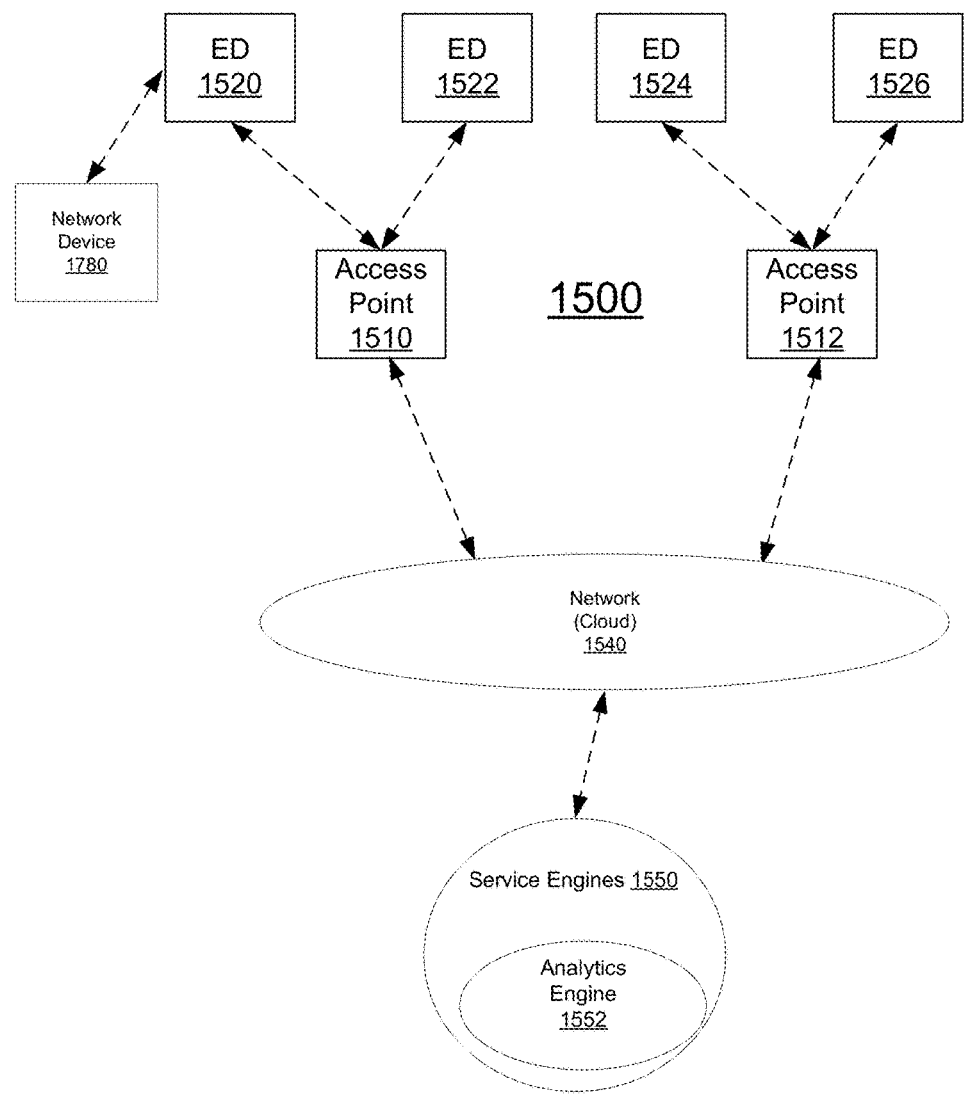
FIG. 17 shows a wireless network that includes an analytic engine and a network device operative to mitigate wireless networking problems, according to an embodiment.

FIG. 17 shows a wireless network that includes an analytic engine 1552 and a network device 1780 operative to assist mitigation of wireless networking problems, according to an embodiment. For at least some embodiments, the network device includes a separate device that provides additional information that can be used for determining the existence of the problem and for diagnosing the problem. Further, network device can be utilized for mitigating the effects of the problem. For an embodiment, the network device 1780 includes at least one of the previously described motion-controlled devices.

An embodiment includes the analytics engine 1552 receiving information from the network device 1780. As shown in FIG. 17, the analytics engine 1552 receives information from the network device 1780 through the wireless device agent. That is, the network device 1780 is connected to the end device 1520. The end device 1520 includes a wireless device agent that communicates the information of the network device 1780 to the analytics engine 1552 through, for example, the access point 1510 and the network 1540. That is, for an embodiment, the wireless device agent receives inputs or sense information from the network device 1780, which is communicated to the analytics engine 1552.

For an embodiment, a network device agent of the network device 1780 is operative to interpret commands of a user of the wireless device (ED 1520). For an embodiment, the network device agent of the network device 1780 is operative to convey information to the user, for example through a display or a visual indicator located on the network device 1780.

Figure 18:
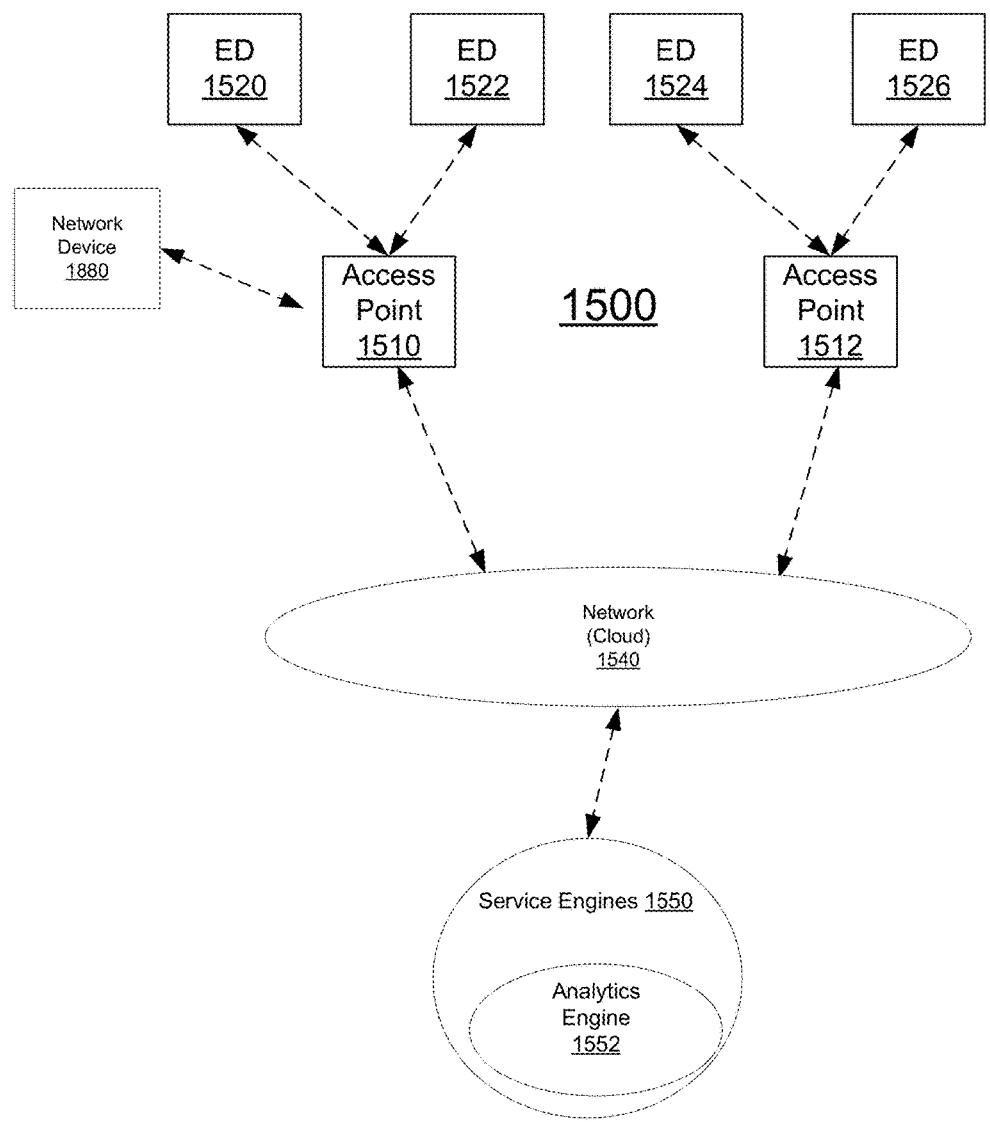
FIG. 18 shows a wireless network that includes an analytic engine and a network device operative to mitigate wireless networking problems, according to another embodiment.

FIG. 18 shows a wireless network that includes an analytic engine 1552 and a network device 1880 operative to assist mitigation of wireless networking problems, according to another embodiment. While the network device 1180 of FIG. 11 communicated with the wireless device agent of the end device 1520, the network device 1880 communicates directly with the network 1540 through, for example, the access point 1510. For an embodiment, the network device 1880 includes at least one of the previously described motion-controlled devices.

For an embodiment, the network device 1880 is a device that is operative to collect sensor information about the wireless network and transmit the sensor information to the analytics engine 1552 for inclusion in the problem signature.

For at least some embodiments, the network device 1880 is embedded in existing components of the network, for example access points, access point controllers, routers, or switches.

For an embodiment, the network device 1880 is operable to assist in determining whether a determined problem is located between the end device 1520 and the access point 1510, or between the access point 1510 and the network 1540. That is, the network device 1880 is operable to bisect the problem located between the wireless device (ED 1520) and the network 1540. That is, is the problem located between the wireless device (ED 1520) and the access point 1510, or between the access point 1510 and the network 1540.

For at least some embodiments, the bisection is performed by temporarily providing a secondary channel between the end device 1520 and the network 1540 via the network device 1880. If the secondary channel between the end device 1520 and the network 1540 is operative, it can be concluded that the original problem is located between the end device 1520 and the access point 1510, as opposed to between the access point 1510 and the network 1540. If it is not operative, it can be concluded that the original problem is located between the access point 1510 and the network 1540.

Figure 19:
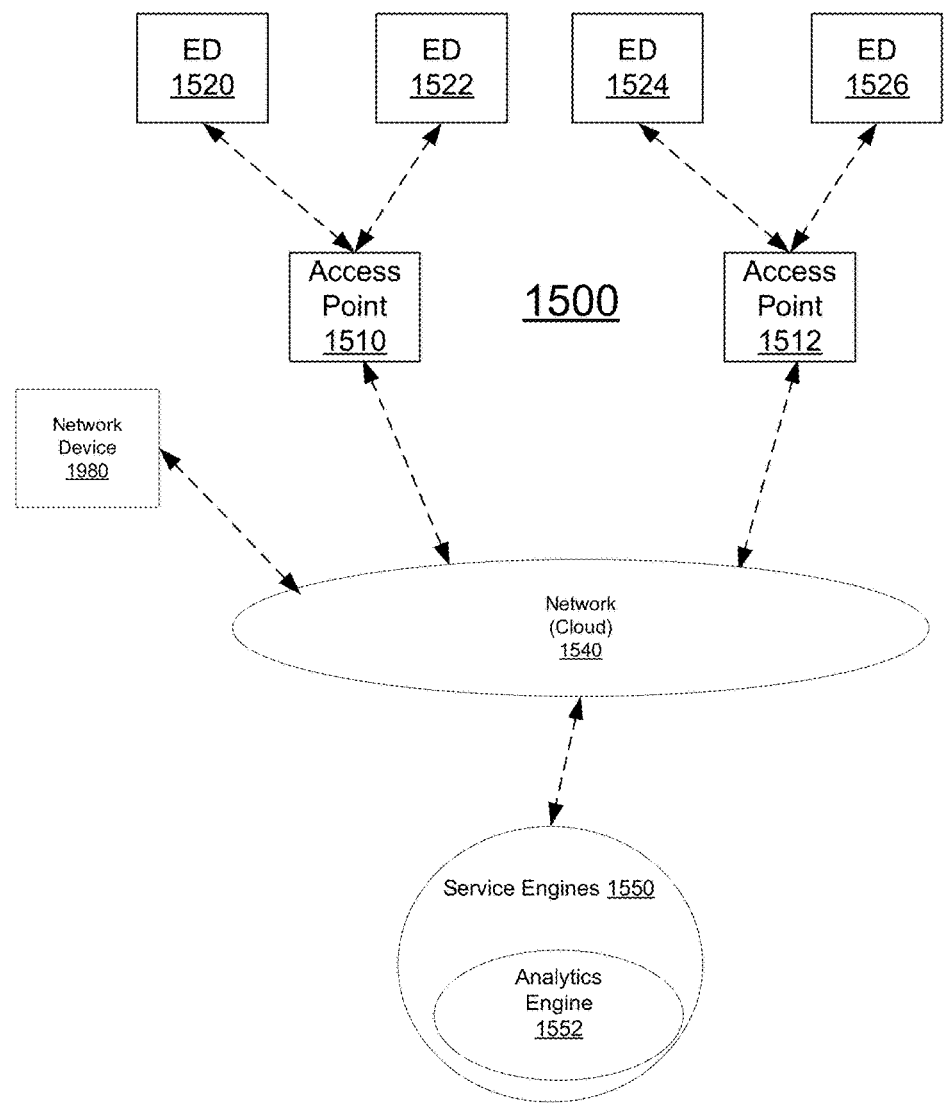
FIG. 19 shows a wireless network that includes an analytic engine and a network device operative to mitigate wireless networking problems, according to another embodiment.

FIG. 19 shows a wireless network that includes an analytic engine 1552 and a network device 1980 operative to assist in mitigating wireless networking problems, according to another embodiment. An embodiment includes activating a network device agent of the network device 1980. For an embodiment, the network device agent of the network device 1980 is operative to interpret commands of a user and display information to the user, wherein the user can be a network operator. For an embodiment, a communication channel is established between the network device agent and the analytics engine 1552. For an embodiment, the network device 1980 includes at least one of the previously described motion-controlled devices.

For at least some embodiments, the network device agent of the network device 1980 is operative to collect the user inputs, select a wireless device from the wireless network based on the previously determined problem in the wireless network, and collect state information that includes information from the wireless device. In an embodiment, the selection is based on one or more of the problem, the structure the wireless network, and other state information. In an embodiment, the wireless device is selected because the wireless device is affected by the problem.

For an embodiment, the state information includes information of the wireless device. For an embodiment, the state information includes information of other devices that are at least one of within a proximate vicinity of the wireless device or includes at least a threshold number of common characteristics. For an embodiment, the state information includes inputs of a user of the wireless device. For an embodiment, the state information includes global knowledge of a Network Operations Center (NOC). For an embodiment, the state information includes inputs collected from a second user. For an embodiment, the state information includes collected network state information from other sources than the wireless device (from other devices in the vicinity, of similar type).

For at least some embodiments, the analytics engine 1552 provides the instructions to the network device agent of the network device 1980. Further, for an embodiment, the network device agent applies the instruction to mitigate the detected problem. For an embodiment, the network device agent initiates an action based on the instruction, thereby enabling additional analysis of the problem. For an embodiment, the network device agent communicates an action to be performed by the user (network operator), thereby enabling additional analysis of the problem. The result of taking action in a previous iteration will inform the instructions for problem mitigation in subsequent iterations.

While each of the network device 1780, 1880, 1980 is similarly designated as a "network device", it is to be understood that each may operate similarly or differently than the others.

Figure 20:
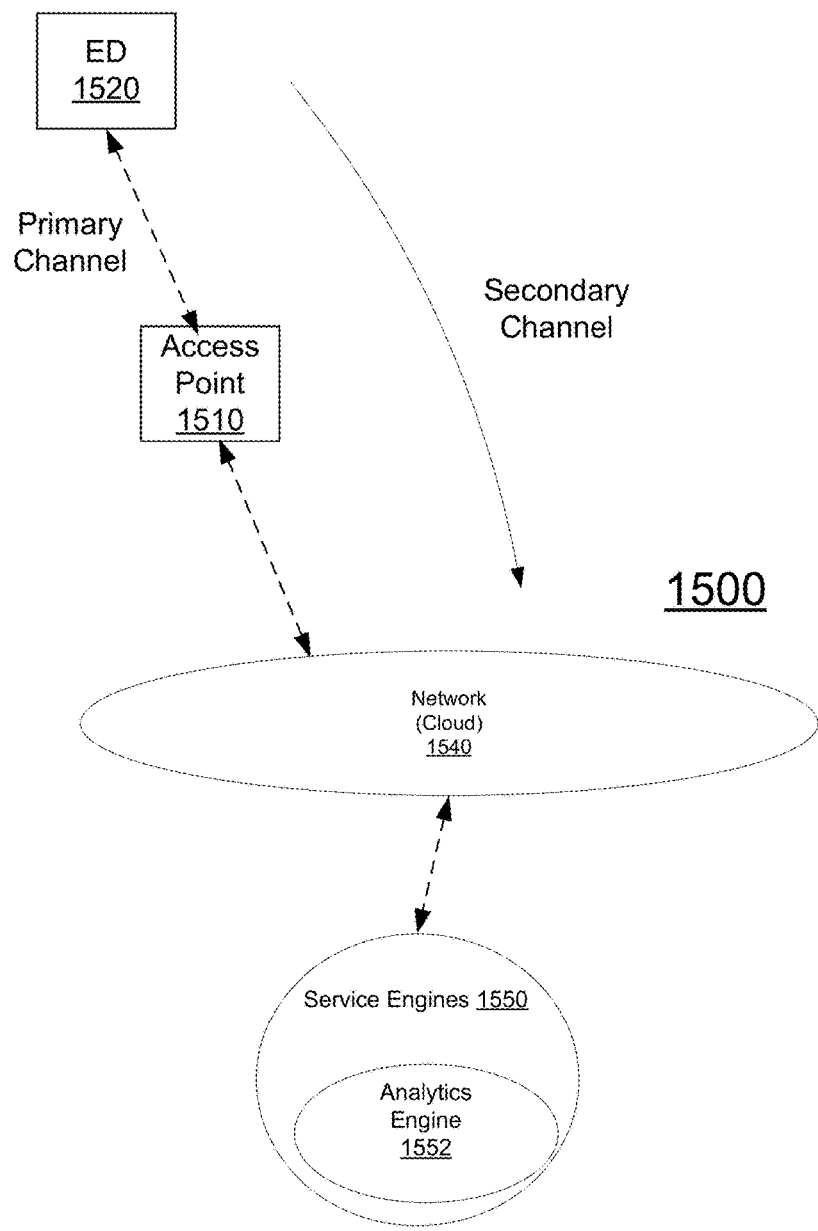
FIG. 20 shows an end device that is interfaced with a network through primary channel and a secondary channel, according to an embodiment.

FIG. 20 shows an end device that is interfaced with a network through primary channel and a secondary channel, according to an embodiment. The secondary channel provides the analytics engine 1552 a way to communicate with the wireless device agent if the primary channel is inoperative, compromised, operating below a predetermined threshold, or undesirable for some other reason. For example, the secondary channel can be used by the wireless device agent to indicate to the analytics engine that the wireless device cannot communicate through the primary channel. For an embodiment, the secondary channel is provided by a separate network. More specifically, for an embodiment, the primary channel is provided by a WiFi network, while the secondary channel is provided by a cellular wireless network.

For an embodiment, the primary channel is operative to support an application of the user, while the secondary channel is operative to aid diagnosis of the problem. That is, for example, if the primary channel is currently used for an application that the user is running, a diagnosis function of the analytics engine will use secondary channel so as not to further impair the primary channel.

Figure 21:
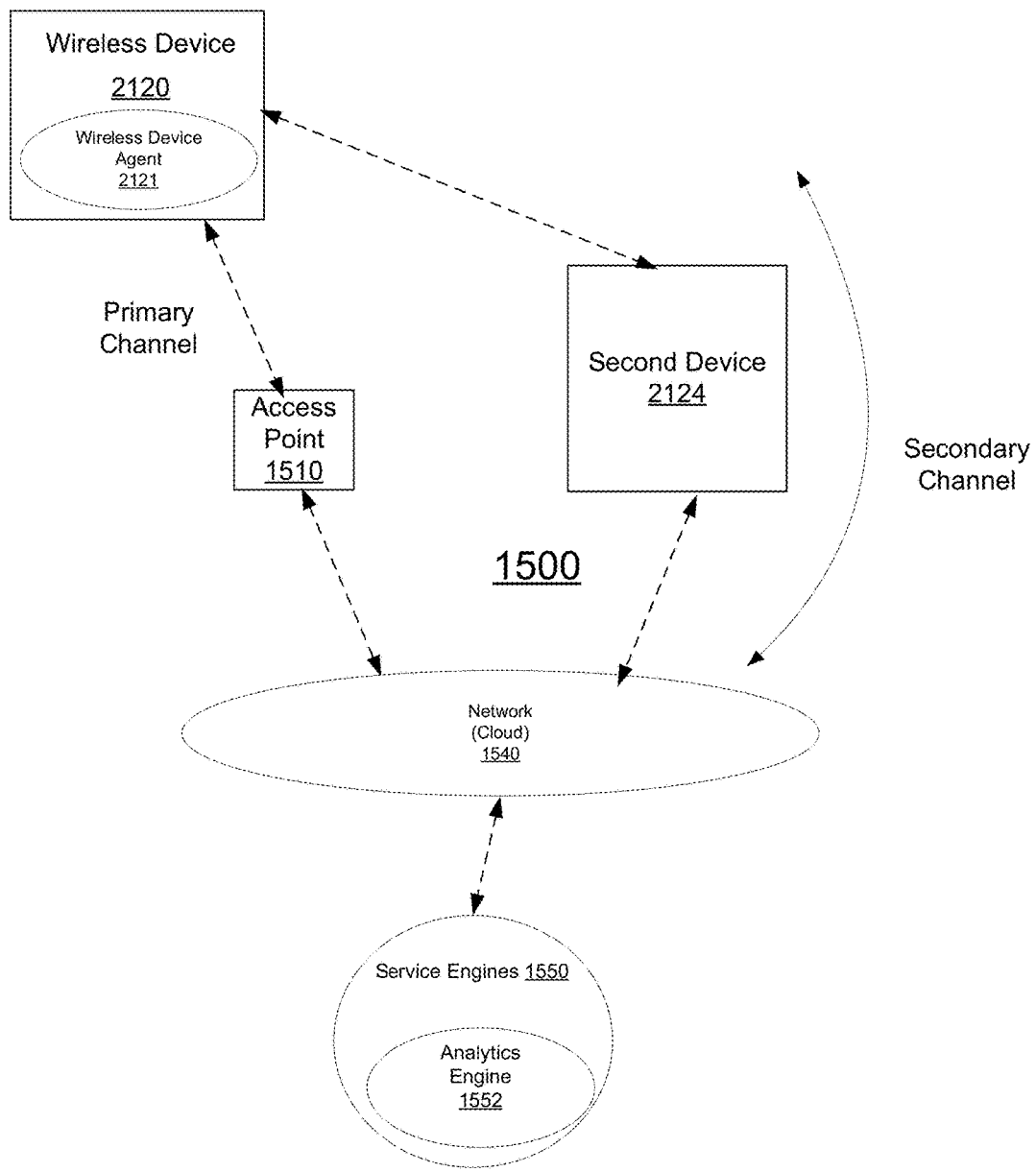
FIG. 21 shows a wireless device that is interfaced with a network through a primary channel, and through a secondary channel provided by a second device, according to an embodiment.

FIG. 21 shows a wireless device 2120 that is interfaced with a network 1540 through a primary channel, and through a secondary channel provided by a second device 2124, according to an embodiment. The embodiment of FIG. 21 is similar to the embodiment of FIG. 20, wherein the second device 2124 provides the secondary channel. The wireless device 2120 includes a wireless device agent 2121 that operative in conjunction with the analytics engine 1552 to mitigate the effects of identified wireless networking problems. For an embodiment, the network device 2120 includes at least one of the previously described motion-controlled devices.

Figure 22:
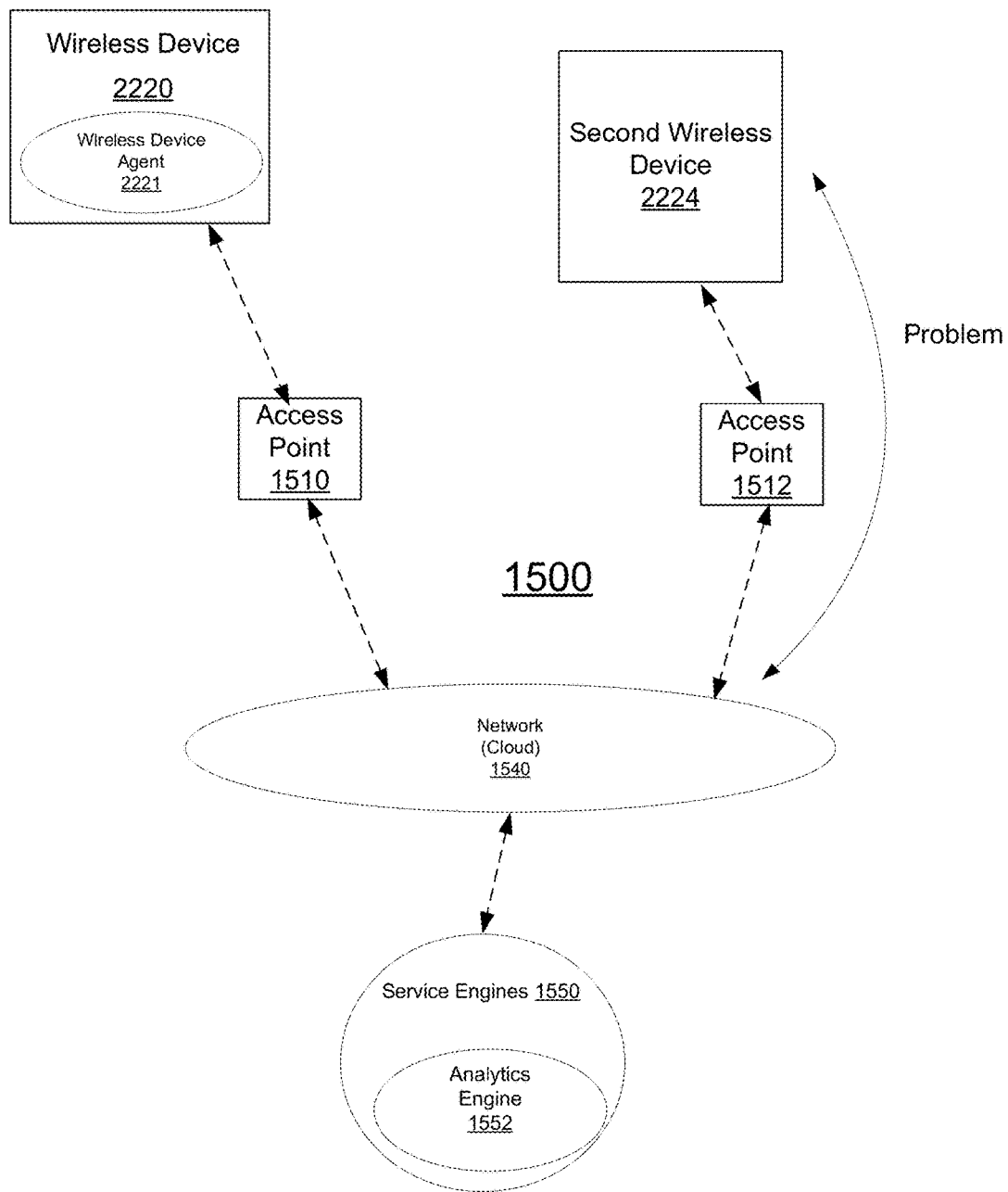
FIG. 22 shows an analytics engine operative to allow a wireless device to facilitate mitigating a wireless network problem of a second wireless device, according to an embodiment.

FIG. 22 shows an analytics engine 1552 operative to allow a wireless device 2220 to facilitate mitigating a wireless network problem of a second wireless device 2224, according to an embodiment. That is, for an embodiment, the problem includes a network problem between the second wireless device 2224 and the network 1540, and the second wireless device 2224 has the problem to be diagnosed, and hopefully mitigated. For example, the second wireless device 2224 may include a printer that has a connection problem, and the wireless device 2220 is a mobile phone of the user that is being used to diagnose the connection problem of the second device 2224 (the printer). For an embodiment, the wireless device 2220 (and wireless device agent) is a diagnosis device used by a field technician. For an embodiment, the network device 2220 includes at least one of the previously described motion-controlled devices.

Figure 23:
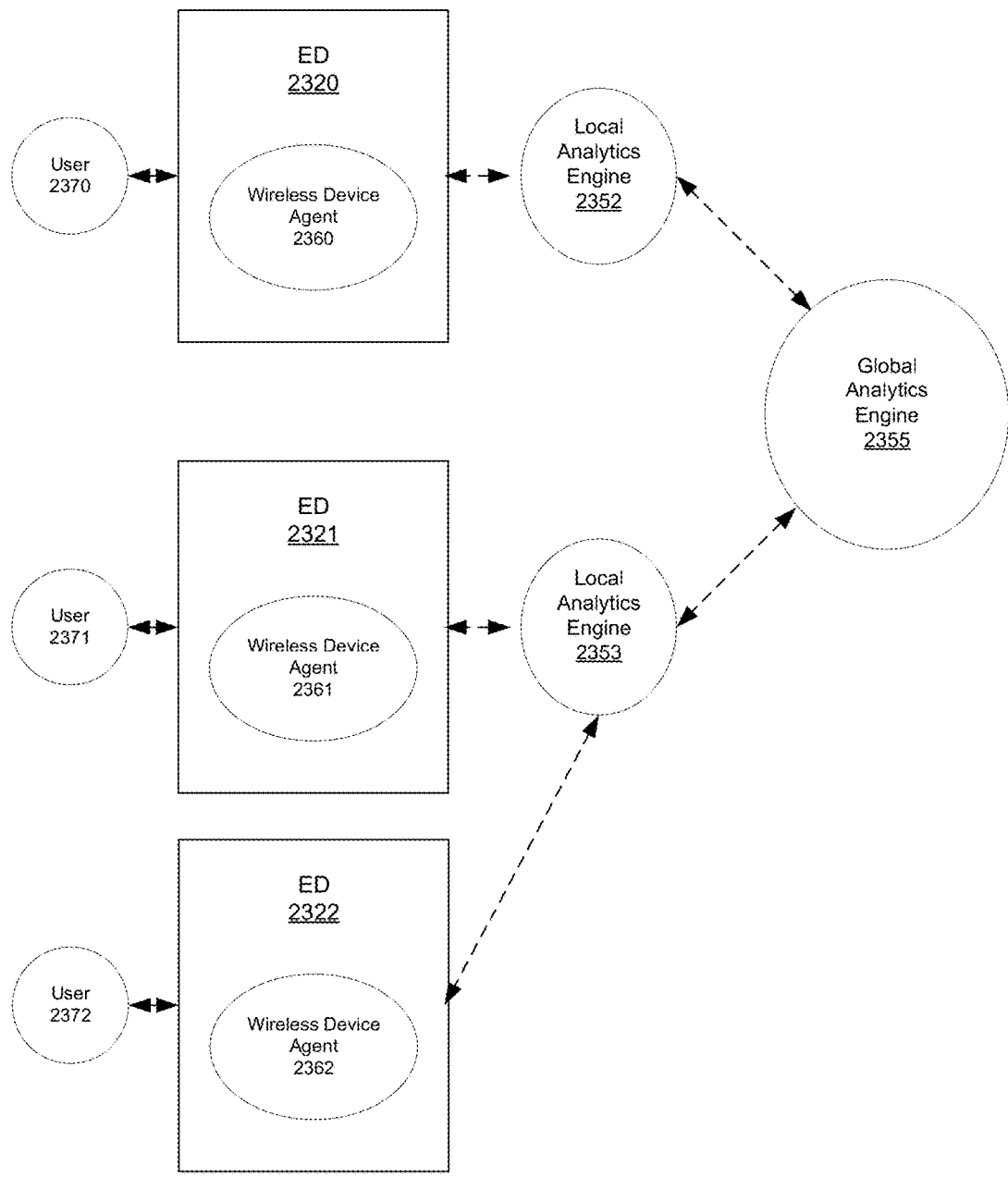
FIG. 23 shows multiple wireless devices that are interfaced with corresponding local analytics engines and a global analytics engine, according to an embodiment.

FIG. 23 shows multiple wireless devices 2320, 2321, 2322 (that include wireless device agents 2360, 2361, 2362) that are interfaced with corresponding local analytic engines 2352, 2353 and a global analytic engine 2355, according to an embodiment. For an embodiment, the local analytics engines 2352, 2353 are operable to process all of the collected user input (from users 2370, 2371, 2372) and the state information. This information can include sensitive information that user(s) may want control for privacy reasons. As shown, the local analytics engine 2353 is operable to server multiple wireless devices 2321, 2322 and multiple users 2371, 2372. For example, the local analytics engine 2352 may be running on the end device 2320 while the local analytics engine 2353 may be running on an on-premises computer. For at least some embodiments, at least one of the wireless devices 2320, 2321, 2322 includes a previously described motion-controlled device.

For an embodiment, the global analytics engine 2355 is operable to process a subset of the collected user input and the state information. The subset includes, for example, non-secure information, while not including privacy-sensitive information. While the global analytics engine 2355 works with a subset of information, the global analytics engine 2355 has the benefit of having access to information from multiple sources (from, for example, multiple wireless device agents). Therefore, the global analytics engine 2355 can make inferences across different networks. In an embodiment, each local analytics engine 2352, 2353 is located in a customer's network. For at least some embodiments, the global analytics engine 2355 provides inference across customers, wherein a local analytics engine is associated with each of the customers.

For at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

Figure 24:
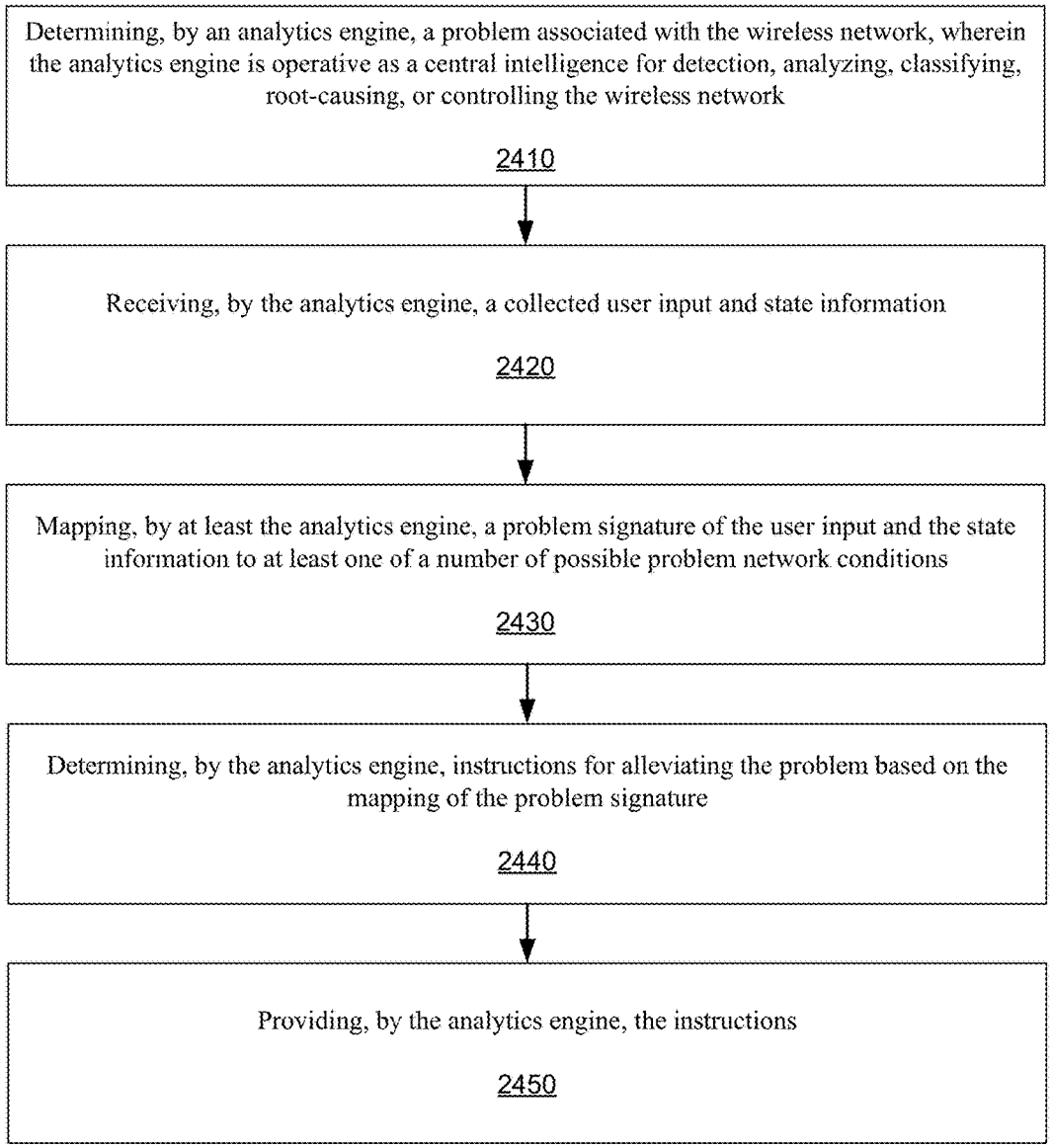
FIG. 24 is a flow chart that includes steps of a method of mitigating a problem of a wireless mesh network, according to an embodiment.

FIG. 24 is a flow chart that includes steps of a method of mitigating a problem of a wireless mesh network, according to an embodiment. A first step 2410 includes determining, by an analytics engine, a problem associated with the wireless network, wherein the analytics engine is operative as a central intelligence for detection, analyzing, classifying, root-causing, or controlling the wireless network. A second step 2420 includes receiving, by the analytics engine, a collected user input and state information. A third step 2430 includes mapping, by at least the analytics engine, a problem signature of the user input and the state information to at least one of a number of possible problem network conditions. A fourth step 2440 includes determining, by the analytics engine, instructions for alleviating the problem based on the mapping of the problem signature. A fifth step 2450 includes providing, by the analytics engine, the instructions.

As previously described, for at least some embodiments, the collected user input(s) include, for example, answers to multiple choice questions that relate to the nature of the wireless networking problem, numeric input, or binary input (for example, whether a suggested solution did indeed mitigate the problem).

As previously described, for at least some embodiments, the state information includes the entirety of information available at the analytics engine about the network at a certain point of time. For an embodiment, the state information includes sensor information. For an embodiment, the sensor information includes physical measurements. For an embodiment, the state information includes a protocol state, other things that are not specifically measured, but already present in memory.

As previously described, at least some embodiments further include activating an wireless device agent of a wireless device, wherein a communication channel is established between the wireless device agent and the analytics engine, and wherein the wireless device agent is operative to interpret commands of a user of the wireless device, display information to the user, interface with hardware operations of the wireless device. The wireless device agent is operative to collect the user inputs and at least a portion of the state information of the wireless device.

As previously described, for an embodiment, the analytics engine provides the instructions to the wireless device agent, and further the wireless device agent applies the instruction to mitigate the detected problem. For an embodiment, the agent initiates an action based on the instruction, thereby enabling additional analysis of the problem.

As previously described, for an embodiment, the wireless device agent communicates the instruction to a user of the wireless device, thereby allowing the user to implement the instruction. For an embodiment, the analytics engine provides the instructions to the wireless device agent, and the wireless device agent communicates an action to be performed by the user, thereby enabling additional analysis of the problem.

The instructions can include actions for mitigating the problem, or for providing additional information for diagnosing the problem. That is, mitigating the problem can include an iterative process of analyzing collected and sensed information, taking action, collecting information after taking action, and then preforming further analysis. The result of taking action in a previous iteration is used in the generation of the instructions for problem mitigation in subsequent iterations.

As previously described, for an embodiment, the communication channel includes a primary channel and a secondary channel, and wherein the wireless device agent communicates with the analytics engine through the secondary channel when the primary channel is operating below a predetermined threshold, or undesirable for other reason.

As previously described, for an embodiment, the communication channel includes a primary channel and a secondary channel, wherein the primary channel is operative to support an application of the user, while the secondary channel is operative to aid diagnosis of the problem. For example, the primary channel may be currently used for an application that the user is running, and the diagnosis function of the analytics engine will use secondary channel so as not to further impair the primary channel.

As previously described, for an embodiment, the analytics engine receives information from a network device, and the wireless device agent receives inputs or sense information from the network device. For an embodiment, network device communicates with the wireless device agent only, but not to the analytics engine. For an embodiment, the analytics engine may still receive information from the network device, but only through the wireless device agent. As previously described, the network device can assist in bisecting the problem located between the wireless device and the network. That is, whether the problem located between the wireless device and an access node, or between the access node and the network.

For an embodiment, the network device is operational to provide the communication channel between the wireless device and the analytics engine. That is, the network device acts as a relay for the linking between the wireless device agent and analytics engine. Further, for an embodiment, the network device helps in diagnosing the problem. For example, the network device may be a wireless probe or another access point. Further, for an embodiment, the network device is second device is polled in by the wireless device agent or by the analytic engine.

As previously described, at least some embodiments further include activating a network device agent of a network device, wherein a communication channel is established between the network device agent and the analytics engine, and wherein the network device agent is operative to interpret commands of a user of the network device and display information to the user. Further, these embodiments further include collecting, by the network device agent, the user inputs, selecting a wireless device from the wireless network based on the previously determined problem in the wireless network, and collecting, by the network device agent, at least a portion of the state information that includes information from the wireless device. As previously described, for an embodiment, the selection is based on one or more of the problem, the structure the wireless network, and other state information. In an embodiment, the wireless device is selected because it is affected by the problem.

As previously described, for an embodiment, the state information includes information of the wireless device.

As previously described, for an embodiment, the state information includes information of other devices that are at least one of within a proximate vicinity of the wireless device or includes at least a threshold number of common characteristics.

As previously described, for an embodiment, the state information includes inputs of a user of the wireless device.

As previously described, for an embodiment, the state information includes global knowledge of the NOC.

As previously described, for an embodiment, the analytics engine provides the instructions to the network device agent, and further comprising the network device agent applying the instruction to mitigate the detected problem. For an embodiment, the network device agent initiates an action based on the instruction, thereby enabling additional analysis of the problem. For an embodiment, the network device agent communicates an action to be performed by the user, thereby enabling additional analysis of the problem.

As previously described, for an embodiment the problem includes a network problem between a second wireless device and the network. That is, for example, the second device has the problem to be diagnosed and mitigated. For example, the second wireless device may be a printer that has a connection problem, and the wireless device is a mobile phone of the user that is being used to diagnose the connection problem of the second device (the printer).

As previously described, for an embodiment, the second device receives the instructions from the from the analytics engine.

As previously described, for an embodiment the second device acts as relay for wireless device.

As previously described, for an embodiment the problem signature includes at least one of a wireless device type, a type of access point that the wireless device is connected or attempting to connect to, a network type. For an embodiment, the problem signature includes the wireless network topology. For an embodiment, the problem signature includes configuration data of the access point.

As previously described, for an embodiment the problem signature includes a data traffic type. For an embodiment, the problem signature includes measured data traffic transmission rates.

As previously described, for an embodiment the problem signature includes at least one of a deployment type, or applications that are currently in use in the network. For an embodiment, the problem signature includes a list of applications obtained from end device.

As previously described, for an embodiment mapping the problem signature of the user input and the sensor information with at least one of a number of possible problem network conditions includes comparing features of the problem signature with problem characterizations stored in a knowledge database. As previously described, the term "signature" is to be understood generally as one or more variables (sensed measurements, user inputs) that are related to the problem.

As previously described, for at least some embodiments, the mapping implements an inference, where the nature of the problem is inferred from the problem signature. For an embodiment, the mapping includes applying one or more decision models to the problem signature. For an embodiment, the decision models are constructed based on multiple previously observed problem signatures and the instructions that led to successful mitigation of the problems of the previously observed problem signatures. For an embodiment, the decision models include one or more partitions of the set of possible problem signatures to a finite number of subsets, wherein each of the subsets maps to a particular instruction.

For an embodiment, the one or more partitions are specified by one or more of decision trees, closest neighbor mapping, table lookups, expert systems, probabilistic models of cause and effect.

For an embodiment, the mapping, decision models and/or partitions are constructed from multiple previously observed problem signatures and the instructions that led to their successful mitigation. For an embodiment, the previously observed problem signatures and the instructions that led to their successful mitigation originate from the same wireless network. For another embodiment, the previously observed problem signatures and the instructions that led to their successful mitigation originate from a plurality of wireless networks that includes the same wireless network.

For an embodiment, the mapping, decision models and/or partitions are constructed by an optimization that enhances the probability of successful problem mitigation.

For at least some embodiments, the analytics engine receives second state information from a network device, and wherein matching the problem signature additionally includes matching the second state information received from the network device.

As previously described, for an embodiment the analytics engine includes a local analytics engine and a global analytics engine, wherein the local analytics engine is operable to process all of the collected user input and the state information, and wherein the global analytics engine is operable to process a subset of the collected user input and the state information.

For at least some embodiments, while the global analytics engine works with a subset of information, the global analytics engine has the benefit of having access to information from multiple sources (multiple local analytics engines). Therefore, the global analytics engine can make inferences across different networks. In an embodiment, each local analytics engine is located in a customer's network. For at least some embodiments, the global analytics engine provides inference across customers, wherein a local analytics engine is associated with each of the customers.

As previously described, for at least some embodiments, the analytics engine includes a plurality of local analytics engines and a global analytics engine, wherein each of the plurality of local analytics engines is operable to process the collected user input and the state information corresponding to its associated devices, and wherein the global analytics engine is operable to process a subset of the collected user input and the state information of each local analytics engine, jointly across all local analytics engines.

At least some embodiments for addressing problems in wireless network include sensing a variety of information directly or indirectly related to the wireless network, building comprehensive models of the wireless network, and then exploiting these models to derive anomaly reports, problem diagnosis and recommended changes to network settings. Implemented through automatic control or through man-in-the-loop interventions, these outcomes can be used to improve both user experience and operator costs.

For at least some embodiments, the sensing function is broad and includes wireless sensors that work in-band to the target network, wired sensors that tap data at various end points in the wired segments of network and other sensors such as imaging sensor, occupancy sensor, audio sensor, other radio sensor, light sensor etc. to support comprehensive model building.

For at least some embodiments, the modeling of the wireless network and the related radio environment captures the complex interactions of the elements in the wireless network including path losses, channel condition, as well as the other in-band networks or interferers. Such network models held in databases may also include user locations, user movement, application being used, characteristics of the user device, user presence/location occupancy, user identity and profile etc. For at least some embodiments, the model techniques include multi-category models, lists, if then rules and other techniques, and formats. The modeling function not only depends on internally sensed data but also on data obtained from external databases.

For at least some embodiments, the controlling or output function includes automatic (direct) control of network parameters, or man-in-the-loop interventions including interactive diagnostic support or recommendations to network operators or to end users who can take corrective action. These control or output function are generated by various Service Engines that interact with various entities such as internal data sources/sensors, end devices with associated users, NOC (Network Operations Center) with associated operators, and knowledge databases.

While the modeling function gathers and organizes data to support improvement of user experience or operator costs, such data may also be useful to outside entities or data bases for purposes of coordinating or understanding network or user behavior. Suitable external interface need to be defined for this purpose.

The net result of such a sense-model-control/interact overlay to wireless network is improved user experience and lower operator costs.

Definitions

For the described embodiments, a network end device or end device is generally defined as a device that terminates a wireless link, and could be a Station/STA or terminal (user end)) or access point or base station or relay node (network end). Further, a station/STA is generally defined as an end device that is associated with a user end of link. An access point (AP) is generally defined as an end device associated with network end of the link. A sensor is generally defined as any device that can sense the environment of a wire or a device. The sensor can be active or passive, and can also be a radio, acoustic, optical, IR etc. Further, the sensor can read data off a wire or register. A wireless sensor is generally defined as a sensor that senses the radio environment to listens to signals, analyses the signals or decode/demodulate the signals.

As mentioned, at least some of the described provide systems, methods and apparatuses for sensing, modeling and controlling a wireless network, providing improved user experience and lower operator costs. At least some of the described embodiments improved abilities to understand and solve connectivity problems such as wireless STA being unable to connect or to re-connect with network. Further, at least some of the described embodiments improved abilities to understand, anticipate and solve performance problems such mutual interference, or interference from non-WiFi devices, poor throughput, poor coverage, etc. Further, at least some of the described embodiments involve improved abilities of wireless end devices to support improved or augmented data collection, sensing and reporting functions. Likewise, at least some of the described embodiments also involve end devices that are augmented to improve performance based on accepting additional control inputs.

Further, at least some of the described embodiments provide interactions with external data entities to aid network modeling or knowledge database development.

Further, at least some of the described embodiments include providing data from the knowledge database or sensor outputs to external entities for improved third party data analytics.

FIG. 25 shows a block diagram of a sense, model and control system for improving performance of a wireless network 2510, according to an embodiment.

Wireless Network

The wireless network 2510 may be any type of network using wireless radio transmission in any electromagnetic frequency, spanning global area, wide area, local area and personal area. The wireless network 2510 can be long range to very short range. The wireless network 2510 can serve end users or machines (no human user). The wireless network 2510 can involve any wireless standard from Iridium like LEO satellite communications, mobile networks like 3G and 4G, to WiFi networks to Bluetooth and 802.14 networks.

For at least some embodiments, the wireless network 2510 includes STAs and APs. In one embodiment, the wireless network consists of one or more STAs and one or more APs. In another embodiment, the wireless network consists of two or more wireless stations (STAs). The STAs and the APs may include, for example, the previously described access points 1510, 1512, and/or the previously described end point devices 1522, 1524, 1526. Further, the STAs and the APs may include, for example, the previously describe motion-controlled devices.

Network Sensors/Internal Data Sources

FIG. 25 shows internal data sources (including network sensors) 2520 that represent the various network sensors that are the sources of monitoring data about the wireless network 2510. The network sensors 2520 sense the state of the wireless network 2510, which can then be used to model and eventually control the wireless network 2510 to improve user experience and lower operator costs. For at least some embodiments, the network sensors 2520 are, for example, the previously described network devices 1780, 1880, 1980. For at least some embodiments, the previously described motion-controlled devices are operational as the network sensors 2520, and/or the network devices 1780, 1880, 1980.

For at least some embodiments, multiple of the depicted network sensors are a single motion-controlled device that is operable to move or locate itself to different points or locations within the wireless network 2510. That is, while shown as multiple network sensors in the described embodiments, the multiple network sensors are actually a single motion-controlled device that is moving to different positions or locations, thereby virtually operating a multiple network sensors. That is, the motion-controlled device (virtually operational as multiple network sensors) can function in any physically feasible position (location universality). Owing to the motion control of the motion-controlled device, the motion-controlled device provides convenience of positioning an opposed to requiring a human being to position the network sensor, thereby providing convenience, and providing safety to the user, and saving costs. For an embodiment, the motion-controlled device is operable to automatically position itself (using, for example, received signal strength) which provides for faster automated positioning versus requiring manual positioning of the network sensor. Further, even if the motion-controlled device is itself statically positioned, the sensors (sensors or antenna) are operable to control their positioning which is useful.

For at least some embodiments, the network sensors 2520 include one or more of multiple sensing modalities, such as wireless sensing covering licensed and unlicensed bands; wired network sensors that listen to traffic on the wired segments or read internal registers inside network elements such as routers, controllers, APs, STAs, switches; cameras or imaging devices in multiple spectrum bands, motion detectors, light detectors. Sensing can also extend to humans-in-loop providing specific data or inputs on network state or fault condition. The list of possible functions of the network sensors 2520 is not limited.

For at least some embodiments, the network sensors 2520 form their own parallel (overlay) network to the primary wireless network 2510.

For at least some embodiments, the network sensors 2520 include wireless probes or sensors that are placed at different points within the wireless network 2510. For one embodiment, at least a portion of the network wireless sensors 2520 are embedded within one or more APs or one of more STAs For another embodiment, at least a portion of the network sensors 2520 are independent of APs or STAs and may be housed in independent boxes.

For at least some embodiments, network sensors 2520 listen on wired connections as data exit or enter components of the wireless network 2510 such as APs, switch, AP controller, AP manager to extract data from their communication behavior.

For at least some embodiments, network sensors include software agents that run on components of the wireless network 2510 such as APs, switch, AP controller, AP manager to extract data from their internal operation.

For at least some embodiments, the network sensors 2520 are configurable. As previously stated, for at least some embodiments, the network sensors 2520 are controllable by service engine 2530.

As stated, for at least some embodiments, the network sensors 2520 sense conditions of the network 2510. Moreover, for at least some embodiments, the network sensors 2520 include receiving manual (man-in-the-loop) inputs from a user device such as, user interface platform 2560 or NOC interface platform 2570.

For at least some embodiments, the network sensors 2520 receive wireless packets transmitted from one wireless device to another wireless node of the wireless network 2510. That is, the network sensors 2520 include a receiver that is operable to receive wireless packets that are intended for reception by the other wireless node of the wireless network. For an embodiment, the network sensors 2520 passively "over hear" the wireless packets. Characteristics of the overheard wireless packets can be used to characterize performance of the wireless network 2510.

For at least some embodiments, the network sensors 2520 include functionality that allows for more optimal network sensor placement using the sensed data.

Further, at least some embodiments include orchestration of data collection to reduce data bandwidth (to, for example, the knowledge database).

Further, at least some embodiments include real time control of data collection and transmission.

Further, at least some embodiments include multiple levels of probes that accommodate trade-offs between cost and function.

Further, at least some embodiments, the network sensors can act as relays for main network.

Further, at least some embodiments include the network sensors are embedded into powered appliances (such as, Light bulbs, USB charging points, coffee pots)

For at least some embodiments, the data collected by the sensors may be sensitive involving security and or privacy concerns. Therefore the data collection, data transmission and data editing/compression must be employ security policies that are in force or agreed upon.

For at least some embodiments, the network sensors are configured based on a demand basis or anomaly basis.

For at least some embodiments, the multiple network sensors are orchestrated to fuse sensed data and improve the quality of the sensed data.

For at least some embodiments, the sensed data of the multiple network sensors is compressed to reduce bandwidth needed to transmit such data to the sensor service engine and knowledge database.

Service Engines

For at least some embodiments, service engine 2530 refers to a collection of different engines, one each for a specific function. The list of service engines provided is only representative and not limited. For an embodiment, the service engine 2530 includes the service engines 2550 and the analytics engine 1552.

Sensor Service Engine

For at least some embodiments, the sensor service engine of the service engines 2530 receives data from internal data sources, and for at least some embodiments, provides at least some control over the internal data sources (1920). Further, for at least some embodiments, the sensor service engines both update and store wireless network information in a knowledge database 2540, and as well as accesses previously stored wireless network information to determine what additional sensing is needed or how sensors should be configured.

Further, for at least some embodiments, the sensor service engine process data received from the network sensors 2520.

At least some embodiments include sensor service engines that control data collection, compression, orchestration, configuration of sensors guided by the knowledge database 2540, for example status and anomaly detects reported by an anomaly service engine.

External Service Engine

For an embodiment, an external service engine of the service engines 2530 interacts with external databases 2550 to send data from knowledge database 2540 or from internal data sources 2520. Further, the external service engine fetches data on as needed basis from external data bases and sends them to knowledge database/network modeling entity.

User Service Engine

For an embodiment, a user service engine of the service engines 2530 interacts with the end user with an end device (user interface platform) 2560, and for at least some embodiments, the user service engine interacts with a user via application interfaces running on the user device (user interface platform) 2560. Further, for at least some embodiments, the user service engine provides information to the user device (user interface platform) 2560, and additionally receives information from the user device (user interface platform) 2560. For an embodiment, the user device 2560 is the previously described end point device 1520.

Network Operations Center (NOC) Service Engine

For an embodiment, an NOC service engine of the service engines 2530 interacts with the NOC interface platform 2570 that is used by operators to monitor the condition of the wireless network 2510. Further, for at least some embodiments, the NOC service engine interacts with a NOC staff via application interfaces such as dashboards running on the NOC servers. Further, for at least some embodiments, for at least some embodiments, the NOC service engine provides information to the NOC interface platform 2570 and additionally receives information from the NOC interface platform 2570. For an embodiment, the NOC interface platform 2570 is the previously described network device 1980.

Control Service Engine

For an embodiment, a control service engine of the service engines 2530 interacts with the network 2510 and the end devices such as APs and STAs as well as controllers and routers to change settings on these devices. For an embodiment, the control service engine is guided by an inference service engine which determines how network settings should be altered.

Anomaly Service Engine

For an embodiment, an anomaly service engine of the service engines 2530 interacts with the other service engines and the knowledge database 2540 to detect network anomalies. The anomaly detection is used by other service engines to take specific actions that result in final diagnosis and solution of the anomaly.

Inference Service Engine

For an embodiment, an inference service engine of the service engines 2530 is triggered by the anomaly detection and it uses the data form the knowledge database and other information from user interface platform 2560, NOC interface platform 2570 and sensor data 2520 to diagnose the network problem as well as find a solution to the anomaly. Solutions may be in terms of recommendations to the user interface platform interface 2560 or NOC interface platform 2570 or direct control of parameters of the network via the control service engine.

Network Models/Knowledge Database

For at least some embodiments, the Network model/knowledge database 2540 includes a repository of all knowledge needed to provide services. For at least some embodiments, the knowledge database 2540 includes different information segments each of which is relevant only to a single wireless network 2510. For at least some embodiments, the knowledge database 2540 contains information segments that are globally relevant and is shared across multiple wireless networks.

For at least some embodiments, the knowledge database 2540 is operable with different formats. Such formats include, for example, relational databases, network, lists, association rules, graphical models, neural networks, decision trees, or probabilistic models.

For at least some embodiments, the knowledge database 2540 includes dynamic (real-time) and/or persistent (historical) data.

For at least some embodiments, the knowledge database 2540 includes different knowledge representations that are unique to WiFi or other specific networks.

For at least some embodiments, the knowledge database 2540 includes black lists and white lists.

For at least some embodiments, the knowledge database 2540 includes geographic (map) representation of data—STA location, inter device interference, Non-WiFi interference maps.

For at least some embodiments, the knowledge database 2540 includes information that is global. That is information obtained from one wireless network is utilized at one or more different wireless networks.

For at least some embodiments, the knowledge database 2540 is integrated with other entities. The other entities include, for example, calendar/event data base, STA location from GPS, home security database (for example, information on whether a user is in or out of house or office).

External Databases

For at least some embodiments, the external databases 2550 include data inputs from third parties. The data input include, for example, end point characteristics, floor plans, AP location, firmware status of STA and APs or routers.

For at least some embodiments, the external databases 2550 are interactive, and include, for example, a query response. For an embodiment, the query response includes sending captured network packets and receiving a classification result as to what application the packets belong to (Netflix, Skype, etc.).

For at least some embodiments, the external databases 2550 include data outputs for third analytics, and include co-ordination with other networks to jointly improve user experience and lower operator costs.

For at least some embodiments, the external databases 2550 is connectable with other entities—calendar/event database, home security data bases (for example, information on whether a user is in or out of house or office), visit patterns, visit locations.

For at least some embodiments, the external databases 2550 are connectable with external service entities like—what applications is this user using (packet inspection), what are known problems about this device (from MAC address).

User Interface Platform

For an embodiment, the user interface platform 2560 includes a user device wherein an application is running on the user device. For at least some embodiments, the user interface platform 2560 is utilized for improving the performance of the wireless network. For an alternate embodiment, the user interface platform 2560 includes an application running on a separate device, including, for example, a web server, or a network sensor with built-in UI.

For an embodiment, the user interface platform 2560 is utilized as a "man in the loop". Essentially, a human operator (user) of the user device is utilized to monitor, interact and correct network problems. As stated, the user interface 2560 can include the user device (STA), a client and/or an application running on the user device, and/or an application running on a separate device.

For at least some embodiments, the user interface platform 2560 monitors the status of the wireless network and raises alerts to the user service engines 2530.

For at least some embodiments, the user interface platform 2560 changes network settings.

For at least some embodiments, the user interface platform 2560 interacts with service engines 2530 to localize problems.

Network Operations Center (NOC) Interface Platform

For an embodiment, the NOC interface platform 2570 includes an operator that interacts with the NOC services engine to provide the NOC operator with diagnostic information and suggestions for interventions in the network.

For an embodiment, the NOC services engine interacts with the NOC interface platform 2570 through the use of alerts, messages, application interfaces.

At least some embodiments allow the operator to observe status of the multiple wireless networks. Further, for at least some embodiments, the operator at the NOC interface platform 2570 is able to control settings or configurations of the wireless network 2510.

For at least some embodiments, the NOC interface platform 2570 includes displaying, monitoring, interacting and correcting network problems. For an embodiment, the operator (a human) is included within the control loop for solving problems associated with the wireless network 2510.

Figure 26:
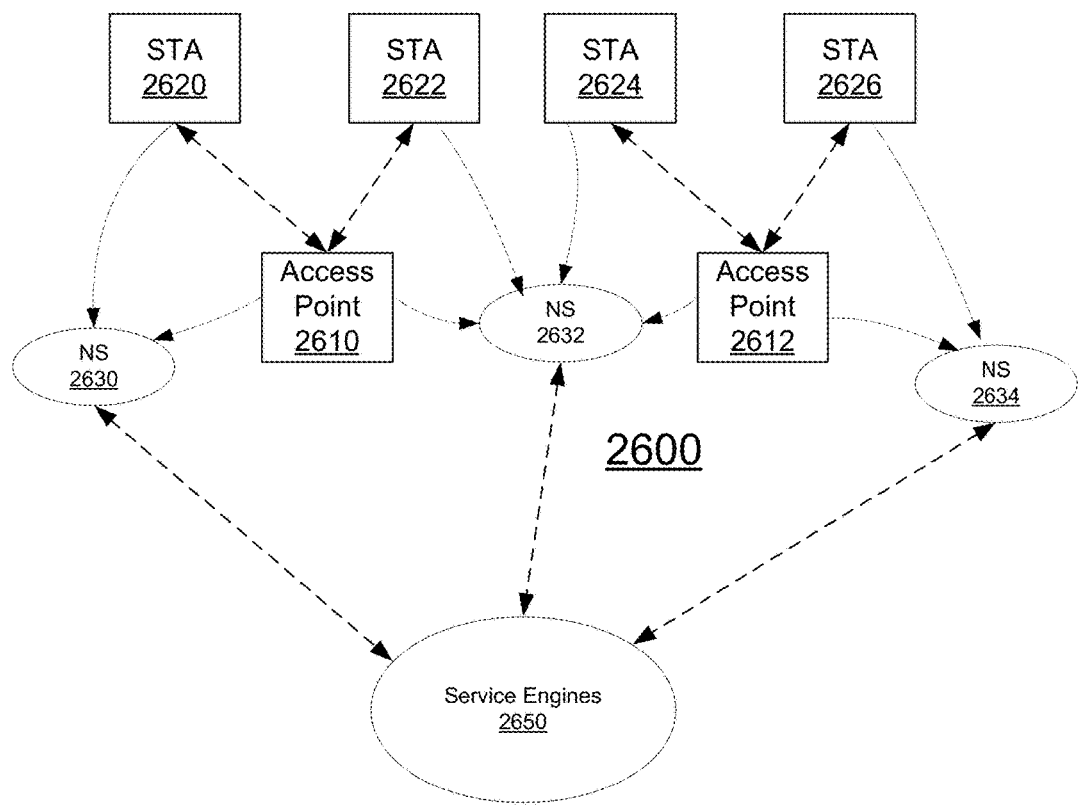
FIG. 26 shows a wireless network that includes multiple wireless sensors, according to an embodiment.

FIG. 26 shows a wireless network 2600 that includes multiple network sensor devices, according to an embodiment. The wireless network 2600 includes multiple wireless network nodes including access points 2610, 2612 (which could be previously described access points 1510, 1512) and stations (STA) 2620, 2622, 2624, 2626 (which could be previously described end point devices 1520, 1522, 1524, 1526). Further, network sensors 2630, 2632, 2634 (which could be the previously described network devices 1780, 1880, 1980) overlay the wireless network 2600.

The network sensors 2630, 2632, 2634 are operative to sample the state or conditions of the wireless network 2600. While only three network sensors are shown in FIG. 26, it is to be understood that a large number of network sensors may be utilized. Further, with a large number of network sensor continuously sampling conditions of the wireless network 2600, the amount of sample data collected can be substantial. Accordingly, the disclosed embodiments provide for subsampling of the collected data to reduce system requirements, such as, backhaul requirements needed to support the network sensors. For an embodiment, the subsampling maintains only a predetermined percentage of the packets. For an embodiment, the predetermined percentage is 10%.

For an embodiment, the network sensors 2630, 2632, 2634 receive packets transmitted from one wireless device, and intended for another wireless device. That is, for an embodiment, the network sensors 2630, 2632, 2634 form a second network that overlays the wireless network 2600. For example, network sensor 2630 may be physically placed within the wireless network 2600 so that the network sensor 2630 is able to receive packets being transmitted between a user device 2620 and an access point 2610. Further, the network sensor 2632 may be physically placed within the wireless network 2600 that the network sensor 2632 is able to receive packets being transmitted between a user device 2622 and the access point 2610. Network sensor 2632 may similarly receive wireless signals from the user device 2624 and the access point 2612, and network sensor 2634 may receive wireless signals from the user device 2626 and the access point 2612.

As wireless communication between the wireless devices of the wireless network 2600 typically includes large numbers of packets, for at least some embodiments, the network sensor 2630 intelligently determines which of the received packets to retransmit (either wired or wirelessly) to a service engine 2650. Further, in at least some embodiments, the wireless network sensor transmits only a descriptor of the received packet to further reduce backhaul usage. For at least some embodiments, the wireless network sensor transmits a representation of the received packet. For at least some embodiments, the service engine 2650 utilizes the packets, the descriptors of the packets, or the representations of the packets to identify conditions or anomalies of the wireless network for improving user experience and lower operator cost of the wireless network.

Figure 27:
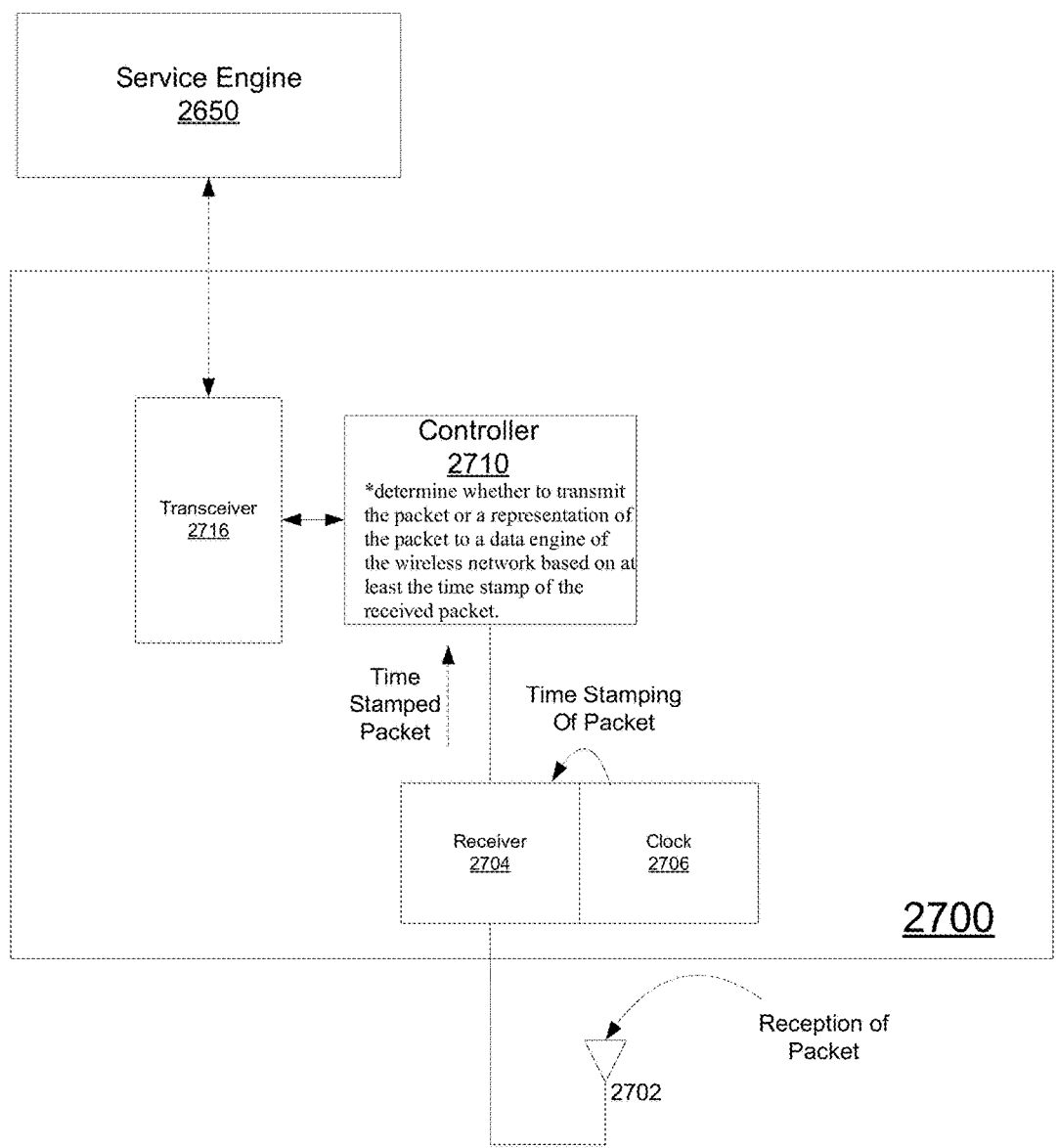
FIG. 27 shows a wireless sensor, according to an embodiment.

FIG. 27 shows a network sensor 2700 (which could be the previously describe network devices 1780, 1880, 1980, or the previously described motion-controlled devices (without the motion control being shown), according to an embodiment. For an embodiment, the network sensor 2700 includes an antenna 2702 and a receiver 2704 for receiving wirelessly transmitted packets. The network sensor 2700 includes a clock 2706 which is used to time-stamp packets as the packets are received by the receiver 2704. For an embodiment, the timestamp is based on the internal clock 2706 of the network sensor.

A controller 2710 of the network sensor 2700 determines if the received packets that have been time-stamped, are to be transmitted by the network sensor 2700 to the service engine 2650. It is to be understood that transmitting the packets to the service engine 2650 includes transmitting at least a representation of the packets. For example, for various embodiments, the representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets. Various parameters can be used to make the determination. Essentially, the network sensor 2700 functions as a gate for determining which of received packets or representation of the packets are further transmitted to the service engine 2650 through, for example, transceiver 2716. The gating provides for orchestration between multiple of similar network sensors. The coordination results in sub sampling of the packets, which reduces the impact of the packets on, for example, a backhaul of the network sensors.

For an embodiment, algorithms operating on the controller 2710 within the network sensor attempt to synchronize the internal clock 2706 to internal clocks of other network sensors. For an embodiment, time stamp rules are received by the network sensor 2700 from one or more external devices.

For an embodiment, the time-stamp of a packet is used to aid in the determination of whether to transmit the packet to the service engine 2650.

For an embodiment, an absolute timestamp is determined on real-time clock hardware in the network sensor. For at least some embodiments, algorithms are operable within the network sensor that keeps these timestamps (roughly) synchronized between different sensors. For an embodiment, the rule that is applied to the timestamp is programmed into the sensor by service engine 2650.

For an embodiment, a packet header or packet content of the packet is additionally or alternatively used in the determination of whether to transmit the packet to the service engine 2650.

For an embodiment, an internal state of the network sensor is additionally or alternatively used in the determination of whether to transmit the packet to the service engine 2650. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (for example, packet rates, data rates) over one or more past observation windows.

As stated, the network sensor 2700 selectively transmits packet to the service engine 2650. However, for at least some embodiments, the network server 2700 also receives information from the service engine 2650. The information received from the service engine 2650 can include, for example, rules and control messages. The rules can influence whether a packet is transmitted to the service engine 2650. The control messages can provide control of the network sensor 2700, including, for example, selecting one or more wireless channels for receiver 2704, the receiver bandwidth, selecting the type of data to be recorded, resetting the clock 2114.

Figure 28:
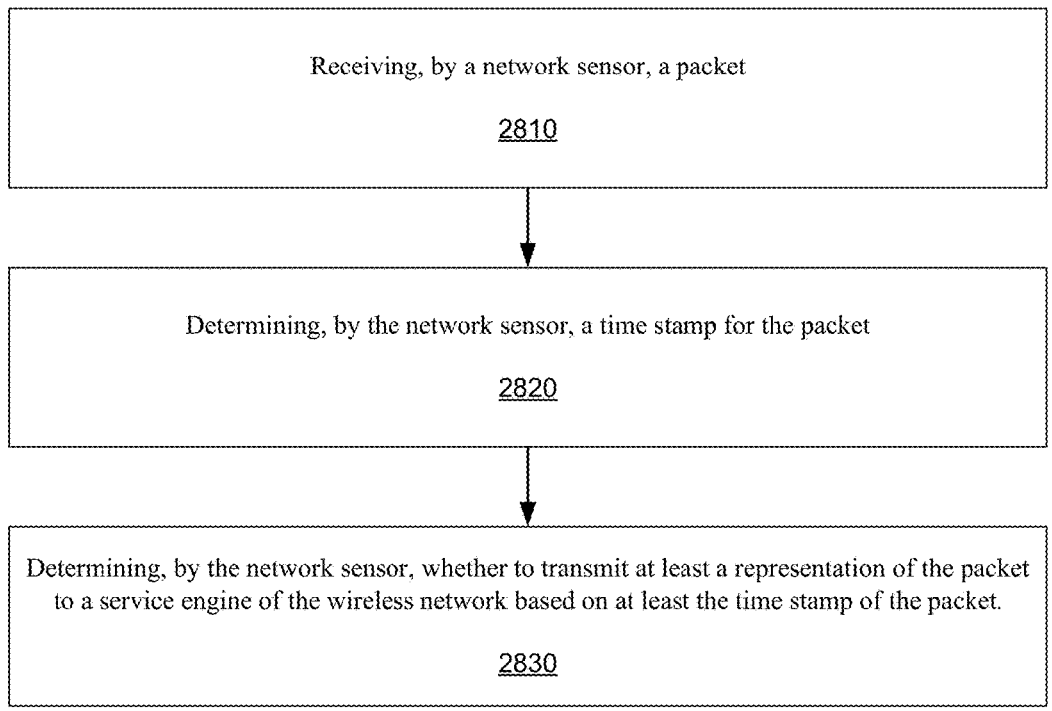
FIG. 28 is a flow chart that includes steps of a method of operating a wireless sensor, according to an embodiment.

FIG. 28 is a flow chart that includes steps of a method of sensing conditions of a wireless network, according to an embodiment. A first step 2810 includes receiving, by a network sensor, a packet. A second step 2820 includes determining, by the network sensor, a time stamp for the packet. A third step 2830 includes determining, by the network sensor, whether to transmit at least a representation of the packet to a service engine of the wireless network based on at least the time stamp of the packet. The network sensors transmits the at least the representation of the packet after determining to transmit the at least the representation of the packet.

For at least some embodiments, the at least a representation of the packet includes at least one of the packet, a portion of the packet, a header of the packet, at least a portion of the header of the packet, and/or a descriptor of the packet. For at least some embodiments, the at least a representation of the packet includes a joint representation of an aggregation of representations of multiple packets, wherein the representation of multiple packets includes representation of the present packet and representation of other packets.

For at least some embodiments, the packet is a data packet, a management packet, or a control packet.

For at least some embodiments, determining whether to transmit the at least the representation of the packet is additionally or alternatively based on at least one of a packet header or packet content. For at least some embodiments, the packet header information includes one or more of transmit addresses, a destination addresses, packet data rate, packet priority, packet type (management, control, data), packet flags, a packet size, and/or other packet meta information. Further, for at least some embodiments, the packet content information include one or more of transmit and destination IP addresses, higher protocol content (for example, DHCP messages, ARP (address resolution protocol) messages), control message in application-level protocols. For example, flow control messages of the control message may precede data rate changes (for example, Netflix resolution changes, Skype adding another caller etc.). For encrypted packet content, at least some embodiments include the packet content information being surrogated by payload length, or sequencing information.

For at least some embodiments, determining whether to transmit the at least the representation of the packet is additionally or alternatively based on an internal state of the network sensor. For an embodiment, the internal state includes at least a data structure that stores list of previously seen transmitter addresses. For an embodiment, the data structure represents the list of transmitter addresses that were active in the wireless network during one or more past observation windows. For an embodiment, the data structure represents traffic patterns (packet rates, data rates) over one or more past observation windows. For an embodiment, the internal state includes probabilistic data structures that reduce a memory footprint at the cost of slightly reduced decision accuracy (for example, approximate membership tests, such as Bloom filters, quotient filters).

For at least some embodiments, determining whether to transmit the at least the representation of the packet is additionally or alternatively based on an external state of the network sensor, wherein the external state comprises non-wireless observations of the sensor or non-wireless events. This includes, for example, presence detection and/or motion detection (that is, determining whether there are people in the room). For an embodiment, the sensed conditions do not relate to the wireless aspect of the wireless network. For an embodiment, the external state includes sensing non-wireless observations of the network sensor, such as non-wireless events. For an embodiment, this includes additional sensing modalities (motion sensor, temperature sensor, etc.). For an embodiment, the external state includes receiving instruction from a user or operator.

For at least some embodiments, determining whether to transmit the at least the representation of the packet is additionally based on an internal state of the network sensor, and based on at least one of a packet header or packet content.

For at least some embodiments, determining whether to transmit the at least the representation of the packet is additionally based on a decision rule received by the sensor from an external device. That is, the decision or the decision rule is provided to the network sensor from an external source. For example, the service engine provides the decision based on event detection. For example, for an embodiment, the service engine observes and event on at least one of a plurality of sensors, and once observed, the service engine changes the decision rule on another sensors to "zoom in" on this event in more detail. For an embodiment, zooming in includes modifying the decision rule in a way that transmits a larger number of packets or representations of packets.

For at least some embodiments, determining whether to transmit the at least the representation of the packet is additionally based on an at least pseudo randomization rule that results in at least pseudo random transmission of a plurality of packets by the network sensor. For an embodiment, the transmission of the plurality is random. The transmission of the at least the representation of the packet is based on the pseudo randomization rule in that the rule that uses above inputs (timestamp, packet header, packet content, internal state, external state) to make determination of whether to transmit the at least the representation of the packet or not. For at least some embodiments, the at least pseudo randomization rule includes a seed, wherein the seed is received from an external device (for example, service engine).

As previously stated, for an embodiment, the subsampling maintains only a predetermined percentage of the packets. For an embodiment, the predetermined percentage is 10%.

For at least some embodiments, to transmit the at least the representation of the packet is additionally based on a periodic rule that results in periodic transmission of a plurality of packets by the network sensor.

As shown and described, the network sensor is typically used as one of many network sensor of the wireless network. Further, for at least some embodiments, the generation of packets or representations of packets amongst the network sensors is coordinated. That is, for at least some embodiments, each of the plurality of coordination sensors receive a corresponding packet, determine a corresponding time stamp for the corresponding packet, and determine whether to transmit at least a representation of the corresponding packet to the service engine of the wireless network based on at least the time stamp of the received corresponding packet. For an embodiment, corresponding packets mean observations of the same transmitted packet received by different network sensors. The observations can potentially be differently corrupted by the wireless channel. In this embodiment, the plurality of network sensors provides diversity for receiving the same packet.

For at least some embodiments, the plurality of coordinated network sensors are coordinated in their transmission of the at least a representation of the corresponding packet due to the described processes (embodiments) of receiving joint or shared or common, rules, commands, seeds, time synchronization.

For at least some embodiments, the coordination includes each of the multiple network sensors deriving their local timestamps from a common source (for example, the service engine), receiving their rules from common source, or receiving parts of the input for rule from common source (for example, the seed of the pseudorandom function). For at least some embodiments, if the decision rule is purely based on receive timestamp and packet header or content, and the timestamps between each of the plurality of sensors are synchronized, all of the plurality of sensors will make the same decisions on whether to transmit the at least the representation of the packet.

For at least some embodiments, the plurality of coordination network sensors is adaptively selected. For an embodiment, the plurality of coordinated network sensors are adaptively selected based on proximity of the network sensors. For an embodiment, the plurality of network sensor is selected based on an ability of the network sensors to wirelessly communicate with each other. For at least some embodiments, the plurality of network sensors is selected bases on a logical grouping, a tenant, an SSID, and/or a communications channel band.

For an embodiment, determining whether to transmit the at least the representation of the packet includes determining a function of a quantized time of the time stamp, the packet content, and a seed that generates random sampling. When the network sensor is one of many network sensor that are all randomizing (or pseudo random) their packet transmission according to the same rule, the upstream device (such as, the services engine) receives the representation of the packets from the many network sensors. Each packet is either received from all or a subset of the plurality of sensors, or from none at all. For a more specific embodiment, determining whether to transmit the at least the representation of the packet includes determining whether a hash function applied to quantized time of the time stamp, the packet content, and the seed modulo n results in a number no larger than m, wherein the quantized time of the time stamp represents a rounded version of the timestamp, the seed is a pre-agreed number (for example generated from a service engine) amongst a plurality of sensor, and wherein n and m are preselected integers.

The quantized time of the time stamp exists because the timestamp synchronization error between sensors is not below a threshold. For at least some embodiments, a quantization level is chosen given the quality of time synchronization or a threshold error between the plurality of sensors.

For at least some embodiments, the seed, and the integers n and m are chosen by an external device, located, for example, in the cloud (for example a service engine). The integers n and m determine the amount of data reduction (sampling rate). Their values individually do not matter, but together they determine the subsampling rate as their ratio m/n.

For at least some embodiments, determining whether to transmit the at least the representation of the packet is additionally based on a confidence interval of time synchronization between the plurality of coordinated network sensors. For at least some embodiments, multiple network sensors receive a common time synchronization signal from a common source (for example, from a services engine), but due to network delays the synchronization is only to a certain accuracy of +-delta. For an embodiment, the confidence interval is the maximum value that delta can take on.

For an embodiment, determining whether to transmit the at least the representation of the packet includes determining whether a hash function applied to quantized time of the time stamp minus (or plus) the confidence interval, the packet content, and the seed modulo n results in a number no larger than m, and/or whether a hash function applied to quantized time of the time stamp plus the confidence interval, the packet content, and the seed modulo n results in a number no larger than m, wherein the quantized time of the time stamp represents a rounded version of the timestamp, the confidence interval is an upper bound on the time synchronization error, the seed is a pre-agreed number amongst a plurality of sensor (for example received from a service engine), and wherein n and m are preselected integers.

For this embodiment, for a plurality of network sensors, packets transmitted by the plurality of sensors are subsampled at a rate higher than m/n. If the timestamps of the plurality of sensors are synchronized to within plus or minus delta time between all the plurality of sensors, all of the plurality of sensors will make the same decisions on whether to transmit the at least the representation of the packet.

For at least some embodiments, the internal state of the network sensor and/or determining whether to transmit the at least the representation of the packet includes determining whether (a) a transmitter address of the packet is different than any transmitter address of any other packet evaluated or received within a last T1 seconds, or (b) the transmitter address of the packet matches a transmitter address of another packet that satisfied (a), within the last T2 seconds.

As previously shown and described, at least some embodiments includes a plurality of the described network sensors placed proximate to the wireless network, wherein a service engine receives a plurality of packets from the plurality of network sensors. Further, as described, the service engine(s) identify conditions of the wireless network based on the received plurality of packets. Such conditions include, but are not limited to, network events, network alerts, network anomalies, network performance problems, and/or protocol deadlocks.

FIG. 29 is a flow chart that includes steps of method of estimating qualities of links between devices of a wireless network, according to an embodiment. A first step 2910 includes obtaining, by a service engine, a plurality of link quality signatures, wherein each of the plurality of link quality signatures includes link qualities between a network node and a plurality of network sensors. A second step 2920 includes estimating, by the service engine, link qualities between a plurality of network nodes based on the plurality of link quality signatures and a estimation model.

As previously described, for an embodiment, the plurality of network sensors form an overlay network that overlays an existing wireless network that includes at least the plurality of network nodes. For at least some embodiments, the nodes of the existing wireless network provide limited RF information and/or feedback to service engine or to their own access network. The described embodiments provide augmenting information about these nodes to the wireless network 2510. For at least some embodiments, these nodes provide limited RF information to their own access network and overlay network extracts additional information which can be provided to the wireless network 2510.

For at least some embodiments, the link qualities of the signatures include at least one of RSSI, path loss, MIMO (multiple input, multiple output channel) order, capacity, and/or interference information. For at least some embodiments, the link qualities between a plurality of network nodes includes at least one of RSSI, path loss, MIMO order, modulation schemes, coding schemes, propagation characteristics (LOS, NLOS), capacity, interference information. For an embodiment, the plurality of network nodes includes two network nodes. That is, link qualities are estimated between a pair of nodes based on the plurality of link quality signatures and the estimation model.

At least some embodiments include generating a coverage map by computing (estimating) the link qualities for each Access point and a plurality of access nodes in the coverage map. At least some embodiments include building a graph/map that represents the wireless network by repeating the estimation of link qualities between pluralities of network nodes among many network nodes or locations of the wireless network. For example, the link qualities can be estimated for pairs of nodes within the wireless network. The estimated link qualities can be presented as a graph or map which depicts the link qualities between each of the nodes of the wireless network.

For at least some embodiments, the network service engine obtains a stream of pluralities of link quality signatures. This is, for an embodiment, a continual flow (stream) of link quality signatures are generated over time. For an embodiment, a continual flow (stream) of link quality signatures is generated over space. For an embodiment, a continual flow (stream) of link quality signatures is generated over time and space. For an embodiment, the continual flow (stream) of link quality signatures is received by the service engine. At least some embodiments include averaging multiple of the stream of pluralities of link quality signatures. For an embodiment, the averaging is performed at the network service engine. For an embodiment, the averaging is performed by the network sensors before being received by the service engine. That is, the service engine received a stream of link quality signatures that have been averaged over time.

For at least some embodiments, each signature is based on a single packet received by the plurality of network sensors from the single network node. That is, the single packet was transmitted by the single network node, and received by the plurality of network sensors.

For at least some embodiments, obtaining the plurality of link quality signatures includes receiving a packet descriptor from each of a plurality of network sensors, and comparing the packet descriptors to determine which packets were commonly received from the single network node by multiple of the network sensors. For at least some embodiments, the packet descriptor includes a packet transmitter address. For at least some embodiments, the packet descriptor includes a timestamp of when the packet was received by a network sensor of the plurality of network sensors.

At least some embodiments include determining the estimation model. For an embodiment, this includes characterizing wireless propagation with physical equations. For an embodiment, the determining the estimation model includes characterizing wireless propagation based on training measurements of link quality signatures from a second plurality of network sensors and corresponding training measurements of link quality from a second plurality of network nodes. For an embodiment, the second plurality of network sensors and/or network nodes is used for training the estimation model. In an embodiment the prior measurements are designed such that they cover possible relative locations of network sensors and/or network nodes. In another embodiment, the second plurality of network sensors is identical to the plurality of network sensors being utilized in link quality estimation based on the estimation model.

For an embodiment, the determining the estimation model includes determining the estimation model comprising characterizing wireless propagation with physical equations and characterizing wireless propagation based on prior measurements of link quality signatures and corresponding link quality between nodes. For at least some embodiments, determining the estimation model includes assigning different weights to different cases of the training measurements. For an embodiment, the weights are determined based on a function of the measured link quality between nodes. For example, during construction of the estimation model, cases in which the link quality is low are given additional weighting. Specifically, for example, an objective function used in model optimization is chosen such that errors at low link qualities are penalized more than errors at high link quality. For example, link quality estimation is used to monitor rate control algorithms. The critical cases for these algorithms are when the link quality is below a threshold, hence these cases are weighted more. For an embodiment, the training data is measured in a geometric. For an embodiment, the weights are used to rebalance the training data in order to match it better to the application case, thus (partially) compensating the mismatch.

At least some embodiments include determining the estimation model by modeling network sensor operation before deployment of the network sensors.

For at least some embodiments, an estimation model is precomputed for each of a plurality of different scenarios (for example, office, campus, residential, etc.), and one of the estimation models is selected for each actual deployment. Further, for an embodiment, the estimation model is based on physical equations of wireless propagation. During deployment of the network sensors, the sensor locations are recorded. These sensor locations can be used to determine the sensor distances, which together with the physical equations, can be used to determine the model.

For at least some embodiments, determining the estimation model includes modeling network sensor operation after deployment of the network sensors. Further, for at least some embodiments, the estimation model is initialized before deployment, and adapted to the deployment site based on a set of measurements performed by the plurality of network sensors. Further, for at least some embodiments, the estimation model continually adapts to additional measurements that become available while deployed.

For at least some embodiments, estimating the link qualities between the plurality of network nodes is further based on link quality signatures between the plurality network sensors. For an embodiment, the link quality signatures between the plurality of network sensors is further based on a subset of the plurality of network sensors transmitting packets and other network sensors of the plurality of network sensors receiving and estimating a link quality between the plurality of network sensors. Specifically, for an embodiment, this includes the network sensors determining link strengths between each other by transmitting sounding packets, and supplementing the estimation model with the link strengths determined between the network sensors.

As will be described, for at least some embodiments a processing engine uses sensor-to-sensor link strengths as additional model inputs. That is, along with the plurality of link quality signatures between a network node and a plurality of network sensors, the sensor-to-sensor link strengths are as additional model inputs into the network estimation model.

For an embodiment, the sounding packets are constructed in a way as not to interfere with regular operation of wireless network. For example, for an embodiment, the sounding packets are only transmitted and utilized during periods of low-use of the wireless network, such as at night when a business that utilizes the wireless network is not very active, or active below a threshold level. For an embodiment, the sounding packets are transmitted when activity of the wireless network is sensed to be low or below a threshold. By only transmitting and utilizing the sounding packets during low-use times, the impact of the sounding packets on the network can be minimized.

For at least some embodiments, the link quality signatures between the network sensors are determined upon sensing a motion of one or more of the network nodes of greater than a threshold.

For at least some embodiments, the link quality signatures between the network sensors are determined periodically, wherein periodically could be regularly or within a max period of elapsed time or within a time interval.

At least some embodiments further includes preprocessing each of the plurality of link quality signatures before estimating the link qualities, and estimating the link qualities between the pair of network nodes based on the plurality of preprocessed link quality signatures and the network estimation model. For at least some embodiments, the estimation model is based on one or more of a node type, a node capability, a node transmission power level, a node receiver sensitivity, a node receiver gain, a modulation/coding scheme, or a number of active transmitters.

For at least some embodiments, preprocessing each of the link qualities of each signature of each network sensor includes determining a ratio of the link quality between the network sensor and the network node and a link quality between a selected network sensor and the network node, thereby accounting for variations in transmit power of the network node over time.

Figure 30:
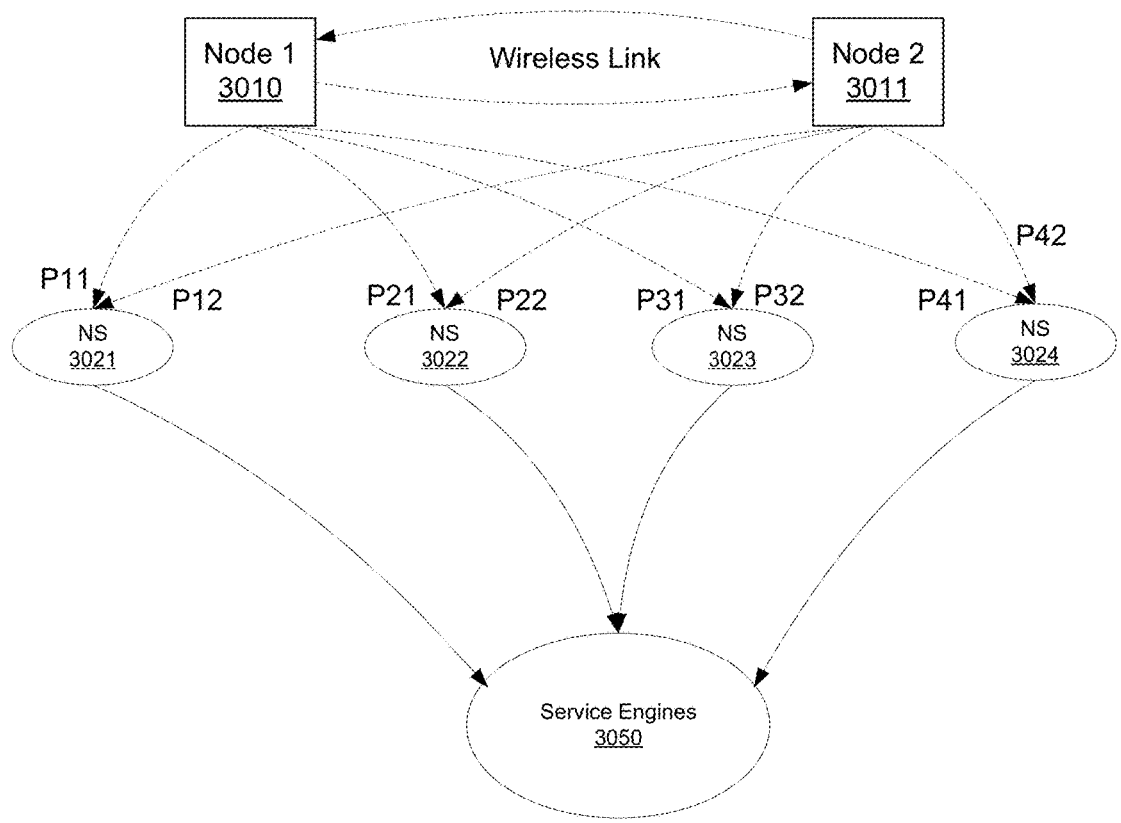
FIG. 30 shows a pair of wireless end devices and wireless sensors, according to an embodiment.

FIG. 30 shows a pair of network nodes 3010, 3011 and network sensors 3021,3022, 3023, 3024 (for example, the previously described network devices 1180, 1280), according to an embodiment. The network nodes 3010, 3011 represent two nodes of a wireless network that are communicating with each other. The network sensors 3021, 3022, 3023, 3024 are operable to "overhear" the wireless communication between the network nodes 3010, 3020. Based on the overheard wireless communication, the quality of the wireless link between the wireless access nodes 3010, 3020 is estimated. As previously described, for an embodiment, one or more of the network sensor is included within one of the previously described motion-controlled devices.

For an embodiment, a services engine 3050 receives representations of the wireless signals received by each of the wireless network sensors 3021, 3022, 3023, 3024. As described, for an embodiment, the network service engine 3050 is operable to obtain a plurality of link quality signatures, wherein each signature includes link qualities between a network node (such as, wireless node 3010 or wireless node 3011) and a plurality of network sensors (such as, wireless network sensors 3021, 3022, 3023, 3024), and estimate link qualities between the pair of network nodes (3010, 3011) based on the plurality of link quality signatures and a network estimation model.

Exemplary Steps for Constructing the Estimation Model

For at least some embodiments, the use of the estimation model begins with:

Selecting a Parameterizable model, namely a function $y_{est} = f(x_1, x_2, x_3, \ldots, x_p, c_1, c_2, c_3, \ldots, c_k)$, where f is the estimator function, and $y_{est}$ is the output of the estimator.

For at least some of the embodiments described, the estimated link quality ($y_{est}$) is, for example, between node 3010 and node 3011, and $x_1, x_2, x_3, \ldots, x_p$ are predictor variables (the inputs of the estimator). For at least some of the embodiments described, $x_1, x_2, x_3, \ldots, x_p$ are the link quality signatures for node 3010 and node 3011 (each consisting of link quality numbers as observed by sensors 3021, 3022, 3023, 3024). In other words, p=8 numbers.

For at least some of the described embodiments, these inputs additionally include pairwise link quality signatures between sensors 3021, 3022, 3023, 3024. In other words, an additional 6 numbers for a total of p=14.

Further, $c_1, c_2, c_3, \ldots, c_k$ are parameters of the estimator. For at least some embodiments, the values of these parameters are learned during a training phase.

A training dataset, namely n examples of the form $(y^{(i)}, x_1^{(i)}, x_2^{(i)}, x_3^{(i)}, \ldots, x_p^{(i)})$ for i=1 to n, where $y^{(i)}$ is the link quality between nodes 3010 and 3011 for the ith training example $x_1^{(i)}, x_2^{(i)}, x_3^{(i)}, \ldots, x_p^{(i)}$ are the values of the predictor variables for the ith training example.

Estimation Model Construction (Training):

For at least some embodiments, training of the estimation model includes:

1. First, the parameters of the estimator are initialized, using one of

Set $c_1, c_2, c_3, \ldots, c_k$ to random numbers in a predefined range, or

Set $c_1, c_2, c_3, \ldots, c_k$ to predefined fixed numbers, or

Set $c_1, c_2, c_3, \ldots, c_k$ to numbers derived from the training data set with a predefined computation rule, or Set $c_1, c_2, c_3, \ldots, c_k$ to numbers derived from a physical equations of wireless signal propagation.

2. Next, for j in 1, 2, 3, . . . .

For i in 1, 2, 3, . . . , n, consider example i from the training dataset

Compute estimate $y_{est}^{(i)} = f(x_1^{(i)}, x_2^{(i)}, x_3^{(i)}, \ldots, x_p^{(i)}, c_1, c_2, c_3, \ldots, c_k)$ based on the current parameters of the estimator Compute the current estimation error $e^{(i)} = y^{(i)} - y_{est}^{(i)}$ Based on a predefined rule that depends on the estimate $y_{est}^{(i)}$, the true value $y^{(i)}$, and the current parameters of the estimator $c_1, c_2, c_3, \ldots, c_k$, compute new parameters of the estimator (to reduce the estimation error of the current example)

3. Stop the loop over j in step 2 based on one or more of the following stopping criteria Estimation error $e^{(i)}$, averaged over all n examples in the training set, did not change significantly as compared to the previous run of the loop (previous value of j)

Parameters of the estimator $c_1, c_2, c_3, c_k$ did not change significantly as compared to the previous run of the loop (previous value of j)

4. Store the final values of the parameters of the estimator $c_1, c_2, c_3, \ldots, c_k$. They specify the estimation model.

At least some embodiments include variations on the method above:

weighting the training set:

Assign a weight to each example in the training dataset. In the method above, the implicit weight for the ith example is the equal weight $w_i = 1/n$. More generally, the weight can be computed based on the true link quality $y^{(i)}$, the predictor values $x_1^{(i)}, x_2^{(i)}, x_3^{(i)}, \ldots, x_p^{(i)}$, or on a combination of the two Instead of visiting all examples i=1, . . . , n in equal proportion (in the inner loop of step 2), visit each example at a frequency proportional to its weight in each loop over j, use a random subset of the training dataset instead of the entire dataset (to save computation)

construct multiple estimation models (with different random starting conditions, or different random subsets of the training set, or different parameterizable estimator function f), and combine the estimates with a combining function . . . (there are a lot of variations: online learning, cross-validation, . . . )

Some exemplary specific examples of parameterizable models f:
- Neural networks
- Support vector regression
- Generalized linear models
- Regression trees Model Application:

For at least some embodiments, application of the estimation model includes:
1. Picking two nodes between which the wireless link quality is to be estimated;
2. Obtaining values of the predictor variables $x_1, x_2, x_3, \ldots, x_p$ for the chosen nodes;
3. Load parameters of the estimator $c_1, c_2, c_3, \ldots, c_k$ as computed during model construction;
4. Compute the estimated link quality $y_{est}=f(x_1, x_2, x_3, \ldots, x_p, c_1, c_2, c_3, \ldots, c_k)$;
5. Output the estimated link quality $y_{est}$.

The steps can be repeatedly executed;
- for the same pair of nodes, if the predictor variables change over time.
- for all pairs among a set of at least two nodes, in order to obtain a connectivity graph between the nodes.

Although specific embodiments have been described and illustrated, the embodiments are not to be limited to the specific forms or arrangements of parts so described and illustrated.

What is claimed:

1. A method of estimating a capacity of at least one wireless stream of a wireless link, comprising:
   obtaining capabilities of a transmitter and of a receiver of the wireless link;
   collecting information of a wireless transmission, wherein the wireless transmission comprises at least a portion of a transmission signal with electromagnetic energy above a certain threshold within a frequency band of the wireless link;
   estimating transmission opportunities available for the transmitter to transmit wireless communications to the receiver based on the obtained capabilities and the collected information;
   estimating an achievable transmission rate by the transmitter based on the determined capabilities and the collected information; and
   estimating, based on the estimated transmission opportunities and the estimated achievable transmission rate, the capacity corresponding to a throughput estimate of the at least one wireless stream of the wireless link at the time a packet of the at least one wireless stream is transmitted over the wireless link;
   reporting the estimated capacity of the at least one wireless stream of the wireless link to an analytic engine; and
   dividing transmission opportunities wherein a plurality wireless streams that use less than assigned transmission opportunities maintain a portion of the transmission opportunities and remaining transmission opportunities are equally divided among remaining streams.

2. The method of claim 1, wherein a sensor collects the information of the wireless transmission.

3. The method of claim 1, further comprising directing one or more packets to be transmitted from the transmitter to the receiver.

4. The method of claim 3, further comprising determining when to direct the one or more packets to be transmitted from the transmitter to the receiver.

5. The method of claim 1, wherein estimating the achievable transmission rate is based on observation of one or more packets during an observation period.

6. The method of claim 5, wherein estimating the achievable transmission rate comprises decoding encoded PHY (Physical Layer) headers of packets of the wireless transmission.

7. The method of claim 5, wherein collecting information of the wireless transmission comprises receiving control messages of the wireless transmission, and further comprising estimating the achievable transmission rate based on the received control messages.

8. The method of claim 1, wherein collecting the information includes estimating a quality metric of the wireless transmission transmitted by the transmitter and received by the receiver, and further comprising estimating the achievable transmission rate based on the estimated quality metric.

9. The method of claim 1, further comprising aggregating obtained capabilities and collected information of the plurality of wireless streams, and estimating the capacity of at least one of the plurality of wireless streams based on the aggregated obtained capabilities and collected information, wherein the estimating of the capacity accounts for the interactions between the wireless streams.

10. The method of claim 1, wherein collecting the information comprises sensing use of the frequency band of the at least one wireless stream by other wireless streams, and further comprising estimating the transmission opportunities based on the sensed use of the frequency band of the at least one wireless stream by the other wireless streams.

11. The method of claim 1, wherein collecting information of a wireless transmission further comprises identifying that the wireless transmission includes a different wireless protocol than a protocol of the at least one stream of the wireless link, and further comprising:
   measuring at least one property of the wireless transmission; and wherein
   the estimating of the transmission opportunities available for the transmitter comprises accounting for the at least one measured property.

12. The method of claim 1, wherein the obtaining of the capabilities of the transmitter and of the receiver of the wireless link further comprises tracking dynamic capabilities of the at least one wireless stream; and
   wherein the estimating of the capacity accounts for the tracked dynamic capabilities.

13. The method of claim 1, wherein the estimating the capacity of the at least one wireless stream of the wireless link further comprises estimating a lower and upper bound on the estimated capacity and estimating a probability of an actual capacity being within the lower and upper bound.

14. The method of claim 1, further comprising
   reporting the estimated capacity of the at least one wireless stream to the analytics engine; wherein
   the analytics engine uses the estimated capacity to manipulate a parameter of a wireless network.

15. An analytics engine of a wireless network, operative to:
   obtain capabilities of a transmitter and of a receiver of a wireless link;
   collect information of a wireless transmission, wherein the wireless transmission comprises at least a portion of a transmission signal with electromagnetic energy above a certain threshold within a frequency band of the wireless link;

estimate transmission opportunities available for the transmitter to transmit wireless communications to the receiver based on the obtained capabilities and the collected information;

estimate an achievable transmission rate by the transmitter based on the determined capabilities and the collected information;

estimate, based on the estimated transmission opportunities and the estimated achievable transmission rate, a capacity corresponding to a throughput estimate of at least one wireless stream of the wireless link at the time a packet of the at least one wireless stream is transmitted over the wireless link;

manipulate, using the estimated capacity, a parameter of a wireless network; and divide transmission opportunities wherein a plurality of wireless streams that use less than assigned transmission opportunities maintain a portion of the transmission opportunities and remaining transmission opportunities are equally divided among remaining streams.

16. The analytics engine of claim 15, wherein the analytics engine receives collected information of the wireless transmission from a sensor.

17. The analytics engine of claim 15, wherein the analytics engine is further operative to direct one or more packets to be transmitted from the transmitter to the receiver.

18. The analytics engine of claim 17, wherein the analytics engine is further operative to determine when to direct the one or more packets to be transmitted from the transmitter to the receiver.

19. The analytics engine of claim 15, wherein estimating the achievable transmission rate is based on observation of one or more packets during an observation period.

20. The analytics engine of claim 15, wherein the analytics engine is further operative to aggregate obtained capabilities and collected information of the plurality of wireless streams, and estimating the capacity of at least one of the plurality of wireless streams based on the aggregated obtained capabilities and collected information, wherein the estimating of the capacity accounts for the interactions between the wireless streams.

21. The analytics engine of claim 15, wherein collecting information of a wireless transmission further comprises identifying that the wireless transmission includes a different wireless protocol than a protocol of the at least one stream of the wireless link, and further comprising measuring at least one property of the wireless transmission; and wherein the estimating of the transmission opportunities available for the transmitter comprises accounting for the at least one measured property.

22. The analytics engine of claim 15, wherein estimating the capacity of the at least one wireless stream of the wireless link further comprises estimating a lower and upper bound on the estimated capacity and estimating a probability of an actual capacity being within the lower and upper bound.

23. A wireless system, comprising:
a sensor, the sensor operative to sense information of a wireless transmission, wherein the wireless transmission comprises at least a portion of a transmission signal with electromagnetic energy above a certain threshold within a frequency band of a wireless link; and an analytics engine, the analytics engine operative to:
obtain capabilities of a transmitter and of a receiver of the wireless link;
collect the information of the wireless transmission;
estimate transmission opportunities available for the transmitter to transmit wireless communications to the receiver based on the obtained capabilities and the collected information;
estimate an achievable transmission rate by the transmitter based on the determined capabilities and the collected information;
estimate, based on the estimated transmission opportunities and the estimated achievable transmission rate, the capacity corresponding to a throughput estimate of at least one wireless stream of the wireless link at the time a packet of the at least one wireless stream is transmitted over the wireless link;
manipulate, using the estimated capacity, a parameter of a wireless network; and
divide transmission opportunities wherein a plurality of wireless streams that use less than assigned transmission opportunities maintain a portion of the transmission opportunities and remaining transmission opportunities are equally divided among remaining streams.

24. The wireless system of claim 23, wherein at least one of the analytics engine and the sensor are operative to direct one or more packets to be transmitted from the transmitter to the receiver.

25. The wireless system of claim 24, wherein at least one of the analytics engine and the sensor are operative to determine when to direct the one or more packets to be transmitted from the transmitter to the receiver.

26. The wireless system of claim 23, wherein estimating the achievable transmission rate is based on observation of one or more packets during an observation period.

27. The wireless system of claim 23, wherein the analytics engine is operative to facilitate aggregating obtained capabilities and collected information of the plurality of wireless streams, and estimating the capacity of at least one of the plurality of wireless streams based on the aggregated obtained capabilities and collected information, wherein the estimating of the capacity accounts for the interactions between the wireless streams.

28. The wireless system of claim 23, wherein collecting information of a wireless transmission further comprises identifying that the wireless transmission includes a different wireless protocol than a protocol of the at least one stream of the wireless link, and wherein the sensor is operative to measure at least one property of the wireless transmission; and wherein at least one of the analytics engine or the sensor is operative to estimate the transmission opportunities available for the transmitter based on the at least one measured property.

29. The wireless system of claim 23, wherein the estimating the capacity of the at least one wireless stream of the wireless link further comprises estimating a lower and upper bound on the estimated capacity and estimating a probability of an actual capacity being within the lower and upper bound.

* * * * *